United States Patent [19]

Buckley

[11] Patent Number: 5,161,203

[45] Date of Patent: Nov. 3, 1992

[54] SELF-ORGANIZING CIRCUITS

[76] Inventor: B. Shawn Buckley, 7067 Via Blanca, San Jose, Calif. 95139

[21] Appl. No.: 647,645

[22] Filed: Jan. 28, 1991

Related U.S. Application Data

[63] Continuation-in-part of Ser. No. 215,583, Jul. 6, 1988, Pat. No. 4,989,256, which is a continuation-in-part of Ser. No. 911,144, Sep. 24, 1986, Pat. No. 4,774,677, which is a continuation-in-part of Ser. No. 290,784, Aug. 6, 1981, Pat. No. 4,479,241.

[51] Int. Cl.$^5$ .............................................. G06K 9/62
[52] U.S. Cl. ........................................ 382/15; 382/14; 395/20
[58] Field of Search ................... 382/14, 15, 16, 33, 382/35–37, 49; 364/148; 395/1, 2, 11, 20, 27, 50

[56] References Cited

U.S. PATENT DOCUMENTS

| | | | |
|---|---|---|---|
| 4,479,241 | 10/1984 | Buckley | 382/15 |
| 4,774,677 | 9/1988 | Buckley | 382/15 |
| 4,989,256 | 1/1991 | Buckley | 382/15 |

*Primary Examiner*—Jose Couso
*Attorney, Agent, or Firm*—William B. Ritchie

[57] ABSTRACT

Self-organizing circuits to receive input signals from transducers and the like and operable, under guidance from modifying inputs thereto, operate in a learning mode and systems embodying such self-organizing circuits. The circuits include mechanisms to change the modifying inputs based upon Boolean functions and further mechanisms to change the modifying inputs based upon competition among the input signals. Burst, bias, clipping and share circuits have been added to the system for the purpose of improving the "teaching" of the system. The present invention incorporates burst function circuits which amplify the influence of sub-circuits which fire in short bursts or randomly. Bias circuits ensure that sub-circuits fire consistently by specifying the number of other sub-circuits input that will be required to cause the biased sub-circuit to fire. Clipping circuits provide a method by which a sub-circuit will not fire if too many other sub-circuits influence it. Share is a method by like-signed influences on a sub-circuit grow at more nearly uniform rates.

16 Claims, 17 Drawing Sheets

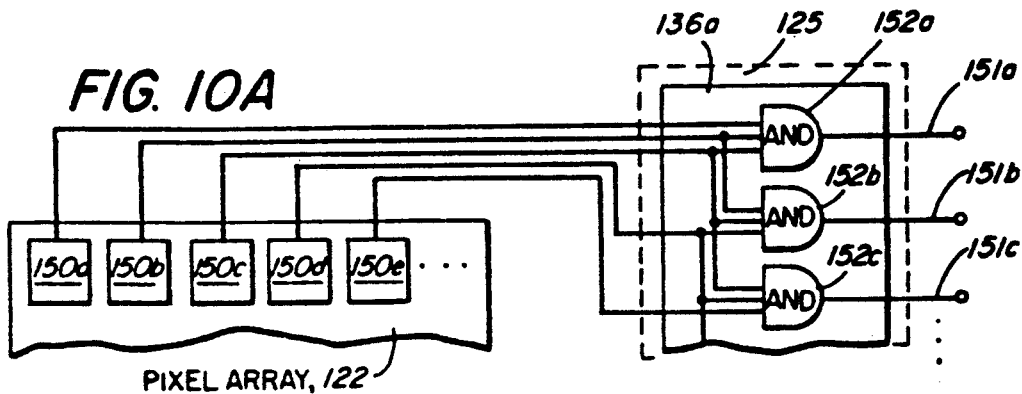
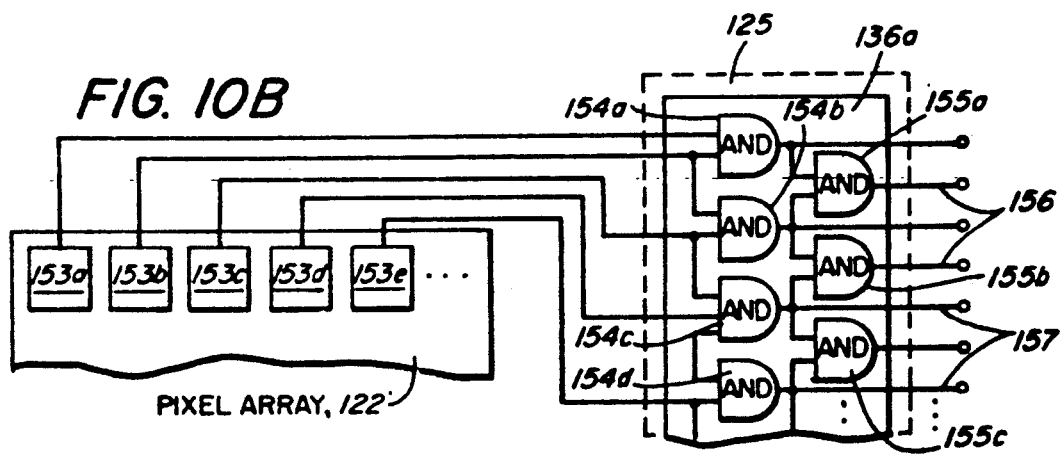
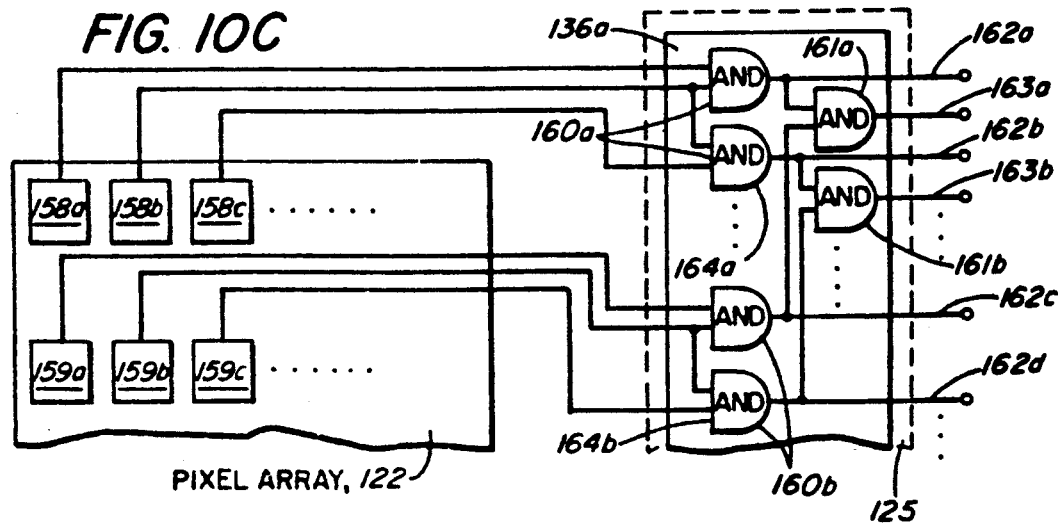

SELF-ORGANIZING CIRCUITS

This application is a continuation-in-part of application Ser. No. 07/215,583, filed Jul. 6, 1988, now U.S. Pat. No. 4,989,256, issued Jan. 29, 1991, which is a continuation-in-part of application Ser. No. 06/911,144, filed Sep. 24, 1986, now U.S. Pat. No. 4,774,677, issued Sep. 27, 1988, which is a continuation-in-part of application Ser. No. 06/290,784, filed Aug. 6, 1981, now U.S. Pat. No. 4,479,241, issued Oct. 23, 1984.

BACKGROUND OF THE INVENTION

The present invention relates to systems that include mechanisms operable to receive information and to analyze that information on the basis of a learning mode of operation. The present invention adds improvements to the prior inventions of the present inventor as referenced above. While this prior invention provides adequate self-organizing circuit features, improved performance and reduction in costs can be achieved by the additions disclosed herein. The improvements are of two basic types: those that apply to improved circuit design and those that apply to improved "teaching" of the circuit.

Improved circuit design first includes a method to better allow the circuit elements of a self-organizing circuit to learn new patterns quickly, secondly includes a mechanism by which serial or sequential information can be learned, and thirdly includes mechanisms by which the circuits can be simplified by reducing the number of interconnections within the circuit.

Improved teaching of the circuit includes ways by which the self-organizing circuit can be quickly taught new patterns. First by making each input to a subcircuit compete against the many other inputs to that subcircuit, by weighting each input according to simple Boolean functions, and lastly by incorporating a method by which information can be added to the circuit after the circuit has already learned some information. The circuit makes better distinctions between patterns by incorporating modified subcircuits which are change-sensitive and by making the subcircuit competition be sensitive to change. Pattern recognition includes the ability of a circuit to detect a pattern among variables despite the fact that the pattern is not precisely the same pattern as was previously learned. The variables can be considered as any variable or set of variables from which a signal can be formed, in some way functionally related to the variables considered. The types of variables fall into two broad categories: static variables and time-varying variables. For example, when a color-blind person tries to distinguish between letters or numerals of pastel dots, he is given static variables or static information. Time-varying variables for which patterns might be recognized include audio signals, for example a person trying to distinguish between the dash and dot patterns he hears in a Morse code signal.

Clearly living organisms can accomplish this task of pattern recognition. People can recognize static information such as printed material (as the reader of these very words is now doing) and time-varying information such as how to swing a tennis racket so as to make proper contact with a tennis ball. Lower life forms also have this ability: certain ant species can recognize the foliage cover near their nests to orient themselves; certain moths can recognize the high-pitched sounds of a bat to avoid being captured; and even clams can learn primitive patterns of tactile responses which distinguish food from danger. Living organisms use electrochemical signals in the neurons of their brain or ganglion to perform this pattern recognition function.

While very complicated computers have been built which can do enormous numbers of calculations at speeds far exceeding the simple calculations done by house flies and clams, the ability of such computers to perform pattern recognition at the level of these primitive organisms has not been forthcoming. A major difference is that people tell the computers what to do whereas flies and clams tell themselves what to do. The former are essentially preprogrammed to do certain sequences in attempts to recognize patterns in space or in time while the latter self-organize themselves to "learn" to recognize patterns which are important to them. In each case, a certain amount of information is already known: in the computer it is a programming language (software) plus the myriad of interconnections in its circuitry; in the living organism it is its instincts or programmed patterns plus the myriad of interconnections in its neural circuitry.

Circuits made of wires and transistors and other electronic components could do well to have the ability to self-organize or learn as living organisms do. These circuits could lead directly to a machine which recognizes speech or recognizes handwriting among other tasks. A misconception is that people think but computers do not think—computers do only what people tell them to; however, self-organizing circuits of the type herein described mimic the ability of the brain to think or at least to do a major subtask of thinking which is pattern recognition. Hence, the line between a computer thinking and a person thinking becomes a fuzzy one.

It will be noted that in the last few years considerable research has been devoted to associative memories based on an approach by John Hopfield (see, for example, Proc. Natl. Acad. of Sci., Vol. 81, pp. 3088-3092, May 1984). When "taught" patterns, these associative memories have some of the same properties of the prior patents by the present inventor and the present invention. For example, both methods can take arbitrary input patterns of binary information and detect when one of several patterns has been detected. Both methods use a multiplicity of "voter" subcircuits having simple binary outputs determined by combining neighboring outputs, weighting them either positively or negatively. Both methods are insensitive to noise—the input patterns during learning or recognition tasks may be only approximate copies of the exact input patterns and still detect the correct pattern. In a variation of the Hopfield algorithm Geoff Hinton and Terry Sejnowski use random outcomes of the subcircuits to better allow their networks to stabilize on a particular pattern (Cognitive Science, Vol. 9, 1985), much as the present invention uses random outcomes in eliminating the need for training of intermediate subcircuits.

But here the similarity ends. Hopfield, Hinton, Sejnowski and their colleagues all use "network optimization" methods for training their associative memories. Rather than using local outcomes of nearby nodes to adjust the interactions between subcircuits as does the present invention, associative memories optimize the network in total. Errors in associative memories are detected at the input and output subcircuits and interactions between subcircuits are adjusted based on these results rather than on local competition between the subcircuits. In addition, associative memories can only deal with combinational patterns of inputs: those whose inputs are not time-varying. The present invention can accept either combinational or sequential patterns as inputs and can output either combinational or sequential patterns as outputs.

At the circuit level, associative memories require symmetric, bidirectional links between subcircuits—each subcircuit that is connected to another has a similar link from the second to the first in both sign and value. In the present invention, no restrictions are placed on the mutual interactions between subcircuits. In this sense, the subcircuits behave very much like a neuron in the brain's cortex: information is transmitted in one direction down the neuron's axon. In the present invention as in the prior inventions, information flows through a subcircuit in only one direction, not bidirectionally as in an associative memory.

OBJECTS AND SUMMARY OF THE INVENTION

An object of the present invention is to provide a method by which a circuit can organize itself into a system which can recognize patterns, which are both static (non time-varying) and time-varying (dynamic).

It is a further object of the invention to provide novel analog and digital circuits which have the ability to learn from previous experiences as a way to self-organize. These circuits have the ability to "remember" patterns for which they were rewarded and also to "avoid" patterns for which they were punished. The learning can be accomplished wholly prior to the use as a pattern recognizer; the learning can occur in conjunction with use of such circuits as a pattern recognizer; or certain information can be learned by one circuit or system and this information can be transferred to other circuits which can operate in either of the first two modes (learn-then-recognize or learn-and-recognize simultaneously).

Another object of the invention is to provide primarily analog methods of accomplishing self-organizing, to provide primarily digital methods of self-organizing and also to provide variations which include some analog circuitry combined with some digital circuitry to accomplish self-organizing.

A further object of the invention is to provide substantially parallel circuitry which accepts multiple inputs from other similar circuits, to act on these inputs, and to output signals to yet other similar circuits. In addition, provision is made to connect such similar circuits in a combination of parallel and serial manner: parallel manner meaning two or more of the similar circuits acting simultaneously; serial manner meaning that one or more of the circuits act only after another has acted.

A further object of the invention is to provide both electrical and non-electrical means by which these circuits can self-organize. Non-electrical means include pneumatic, chemical, optical or other means which obey the rules set forth for self-organizing as described herein.

Yet another object of the invention is to provide specific embodiments of circuits which can preprocess information into a form acceptable to the self-organizing circuits. The two types of information fall generally into the classes of static and time-varying information. An example of the former is visual information patterns representing printing or handwriting; an example of the latter is audio information such as recognizing patterns of speech or music.

Another object of the invention is to provide an architecture of similar self-organizing circuits. The organization or architecture is composed of a hierarchy of levels, lower levels passing on information to higher levels in such a way as to improve the self-organizing ability and ease of learning for the system as a whole.

Still another object of the invention is to provide means for initializing similar circuits with similar input signals such that self-organizing can progress in a nondeterministic way as the system of circuits proceeds in the learning process. Included is a provision for matching the learned responses to various patterns with useful names or identifications which the operator of such a system of circuits might wish.

Another object of the invention is to provide methods by which information between different elements or subcircuits of the self-organizing system can be transmitted by time-variations of signals. These time variations encompass the range between simple changes between two or more signal levels (e.g., binary data), to pulses whose width or rate (or coded sequence of widths or rates) carries the information, the purpose being to reduce the number of inter-connections between various elements or sub-circuits of the system. Yet another object of the invention is to provide a self-learning circuit or system of circuits.

While previous objects of the inventions set forth that if a self-organizing circuit is taught pattern recognition tasks by rewarding or punishing elements of that circuit to produce desirable results, this suggests that an external source provides specifically which patterns are to be rewarded or punished. But the patterns to be learned may also be random, though still punished or rewarded by some criterion. In this case the circuit randomly initiates its own patterns and is rewarded or punished. However, if the pattern is punished, it tends to be eliminated from those patterns which the circuit is testing; if the pattern is rewarded, it is encouraged to be used again. For example, living organisms use this form of self-learning: a baby puts its hands on all sorts of objects at random but soon learns to eliminate hot stoves and thorns as objects to grasp. Self-learning of this type is a primitive form of conceptual thought; circuits which accomplish this function are disclosed herein.

Yet another object of the invention is to provide a method by which sequence of information in patterns is detected. While in many cases unordered information is satisfactory (a dozen eggs is a dozen eggs no matter which order they are taken from the box), some information is ordered and the exact nature of the ordering is critical for the patterns to be recognized. For example, in recognizing the pattern of letters which produce words, the two letters "A" and "M" taken together as a word have completely different meanings depending on order.

An object of this invention is to provide circuitry which determines ordering and sequencing in patterns of both the static and time-varying varieties.

Another object of the invention includes improved circuit design by three means. First it includes a method to better allow the circuit elements of a self-organizing circuit to learn new patterns quickly, secondly it includes a means by which serial or sequential information can be learned, and thirdly includes means by which the circuits can be simplified by reducing the number of interconnections within the circuit.

Another object of the invention is to provide improved teaching of the circuit. Improved teaching includes ways by which the self-organizing circuit can be quickly taught new patterns, first by making each input to a subcircuit compete against the many other inputs to that subcircuit and secondly by making the output of a subcircuit be a simple Boolean combination of its inputs.

To improve the self-organizing capability of the invention, a further object includes mechanisms to add new information to the system and a mechanism to balance the effects of excitory and inhibitory actions which take place within its subcircuits.

In order to make the invention more sensitive to changes in the input, yet another object of the invention is to provide sensitivity to change both by appropriate choice of the competitive function used in teaching the circuit and also by modifications of the circuit to make them more change sensitive.

Another object of the invention is to provide a means by which signals of short duration have little influence on how quickly the system learns new patterns. In living systems, many neurons which fire only once or twice have little influence on neurons to which they are connected: they neither cause the target neuron to fire nor do circuits self-organize based on such short duration information. The present invention incorporates similar "burst functions" which amplify the influence of subcircuits which fire in short bursts and attenuate the influence of circuits which fire randomly or only for short duration. These functions make the learning of patterns by the system as a whole more stable.

Yet another object of the invention provides for a bias of the system's subcircuits. The bias assures that a subcircuit requires a minimum of input from other subcircuits to fire consistently or to not fire consistently. Without the bias, the subcircuit can fire inconsistently. The strength of the bias is also important. If the bias is strong, input from several subcircuits is needed to make the subcircuit fire; if the bias is weak, input from a single other subcircuit can make it fire. A strong bias gives the subcircuit an AND-like or NAND-like character: two or more inputs are needed to influence the subcircuit's outcome. A weak bias gives the subcircuit an OR-like or NOR-like character—any input influences the subcircuit's outcome.

In addition to bias, clipping is an important characteristic of the subcircuits. Clipping is the method by which a subcircuit will not fire if too many other subcircuits influence it. If clipping is strong, input from a single other subcircuit will make it change; inputs from other subcircuits will prevent it from changing. Weak clipping allows a few subcircuits to change the outcome, while more than these few prevents the subcircuit from changing. Clipping gives the subcircuit an XOR-like or XNOR-like character: some input influences the outcome, but too many inputs prevent the influence.

Share is a method by which like-signed influences on a subcircuit grow at more nearly uniform rates. If one or more of the influences grows too quickly, feedback makes the slower growing ones grow faster and the faster growing ones grow slower. Such sharing of the growth factors assures that AND-like and NAND-like subcircuits maintain consistent outputs during learning of input patterns.

The foregoing objects are attained, generally, in a system that includes a self-organizing mechanism connected to receive a plurality of input signals representing constituent elements of input information and operable to effect identification of the pattern of constituent elements by combining the influence which each constituent element has on the pattern of constituent elements, the self-organizing mechanism including multilevels with feedback or communication between higher levels and lower levels to aid in identification of the pattern, the self-organizing mechanism being operable to provide an output related to the pattern, a correction mechanism connected to modify the self-organizing circuit means by varying the influence which each constituent element has on the pattern of constituent elements as occasioned by accurate and inaccurate identification of the input information; a mechanism to vary the influence which each constituent element has on an evaluation of the pattern of constituent elements based upon cumulative Boolean functions between the input signals to each said multilevel circuit and its outputs; and a mechanism connected to vary said influence based upon competition among the input signals. The system also can include a mechanism to vary the influence which each constituent element has on an evaluation of the pattern of constituent elements based upon cumulative Boolean functions between the input signals to each said multilevel circuit and its outputs; and a mechanism connected to vary said influence based upon competition among the input signals. In addition, the system can include a mechanism to add new information to the system; and a method to balance the effects of excitory and inhibitory actions which take place within its subcircuits.

BRIEF DESCRIPTION OF THE DRAWINGS

The invention is described hereinafter with reference to the accompanying drawing in which:

FIGS. 10A, 10B, 10C, and 11 are diagrammatic representations of modifications of the circuit in FIG. 9.

DETAILED DESCRIPTION OF THE INVENTION

Figure 1:
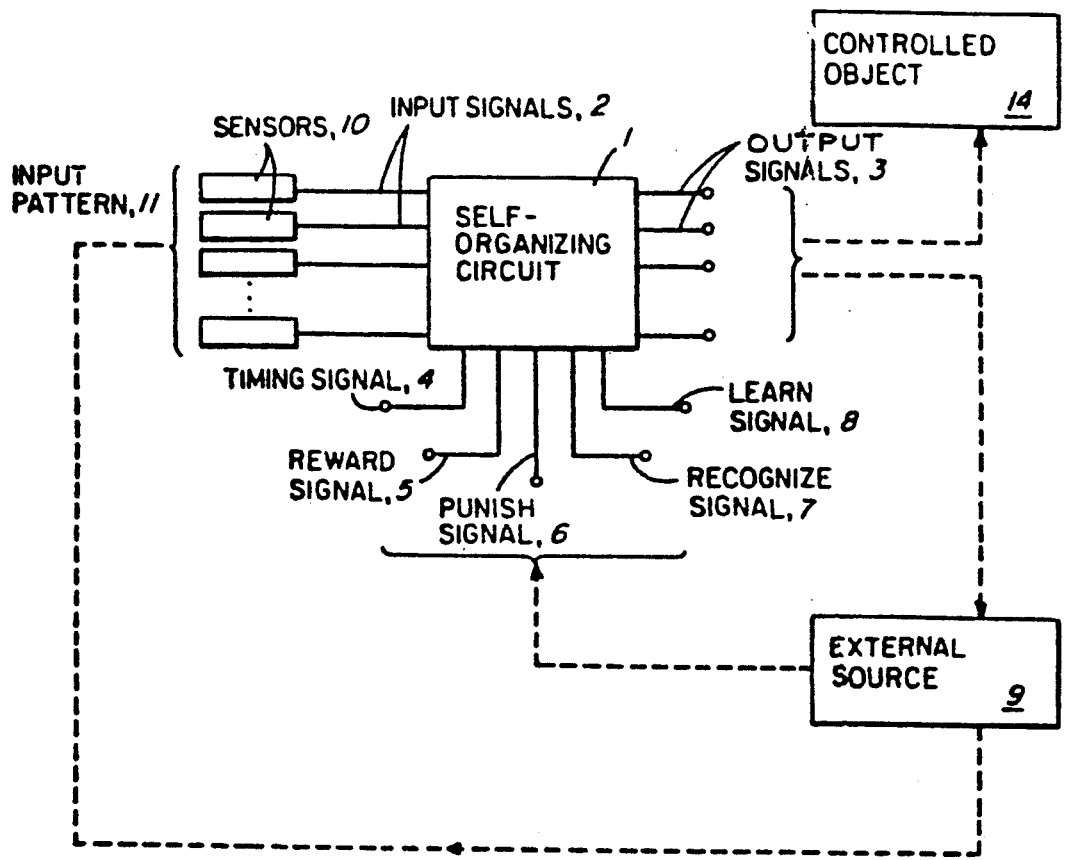
FIG. 1 is a diagrammatic representation of a system that includes a self-organizing circuit of the present invention.

There now follows a brief explanation of the invention with reference to FIG. 1 which shows a system 101 that includes transducers or sensors 10 to sense an environmental condition or some other input pattern thereto at 11. The sensor or sensors 10 are operable to process that input to provide an input signal at 2 which includes information to be analyzed. A self-organizing circuit 1, connected to receive that input signal, is operable to effect analysis of components of constituent elements of the input signal and to provide an output signal at 3. In the discussion which follows, the various signals as well as the entire inner workings of the self-organizing circuit 1 are assumed to be electrical signals. This need not be the case since analogous circuits can be derived which are non-electrical. For example, the self-organizing circuit 1 could be implemented in fluidics using pressure signals instead of voltage signals or in thermics using temperature signals instead of voltage signals (see, for example, U.S. Pat. No. 4,137,964 by Buckley, the present inventor). However, for simplicity, further discussion will consider only the electrical implementation as the preferred embodiment.

Figure 2:
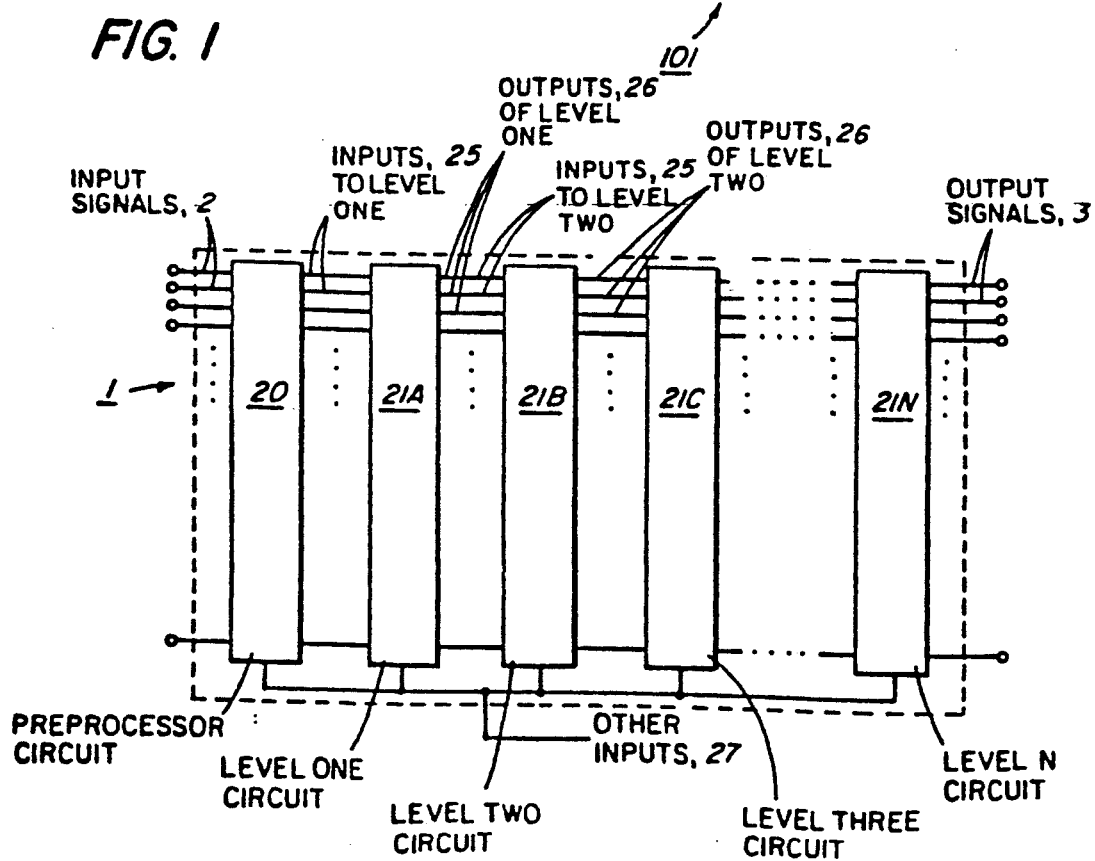
FIG. 2 is a diagrammatic representation of one form the self-organizing circuit of FIG. 1 can take, and shows a self-organizing circuit that includes a preprocessor circuit and a plurality of subcircuits or level circuits.

An external source 9 (e.g., a computer), as explained later herein, is connected to apply modified inputs as inputs 5, 6, 8 and 7 (e.g., a reward signal, a punish signal, a learn signal and a recognize signal, respectively) to the self-organizing circuit 1; the input signals at 5, 6 ... serve to correct errors in the output signal at 3 occasioned by inaccurate analysis by the self-organizing circuit. A timing signal may be applied at 4 for purposes later discussed. Typically, the self-organizing circuit 1, as shown in FIG. 2, consists of several interacting elements. The system 101 may contain a controlled unit 14 (e.g., a mechanical mouse, whose functions are directed by signals 3 from the self-organizing circuit). (In order to simplify the explanation herein, the label 2 designates signal paths or the like interconnecting the sensors 10 and the self-organizing circuit 1, but hereinafter 2 is used also to designate the signal on those paths; and a similar approach is used as to other labels and the things they represent.) In the description that follows, the self-organizing circuit 1 will be discussed. Generally, the circuit 1 has many parallel signals 2 as input; they are usually binary: electrical signals having either one or another of two states (e.g., a high voltage and a low voltage). The signals 2 are fed into the circuit 1 which organizes the inputs to provide various signals 3, deemed by an external source 9 to be either desirable or undesirable. In some cases it is necessary for this outside source (e.g., a computer operating the circuit) to identify which output signals 3 are associated with desired input patterns 11.

In addition to the signals 2 and 3, certain other signals to the circuit 1 may be required. First, a timing signal 4 may be required to initiate various modes of operation of the circuit, for example, learning mode or recognizing mode. The timing signal 4 can be a simple binary signal or perhaps a series of such signals as are currently used on digital computers for sequencing events. Secondly, reward signals 5 and punish signals 6 are other examples of input signals initiated by the external source 9 or an operator whose inputs pass through an appropriate device 9. A reward signal 5 tells the circuit 1 that a pattern 11 which it recognized was a correct one; a punish signal 6 tells the circuit 1 that a pattern 11 which it recognized was an incorrect one. Other signals which may be required are a learn signal 8 and a recognize signal 7. A more primitive form of the circuit 1 can have a learn mode initiated by the learn signal 8 (during which it learned only to recognize patterns) followed by a recognize mode initiated by the recognize signal 7 when it used the organization provided by the learning mode to perform useful recognition tasks.

The external source 9 used to monitor the circuit 1 can be of several types. It can be a mechanism that permits a human operator to direct the circuit 1 as mentioned above, it can be a mechanism that permits the environment to direct the circuit 1, or it can be another electronic circuit which recognized the correctness of a response to a pattern 11 and rewards or punished the circuit 1.

The input patterns 11 can be provided in several ways by the external source 9 as suggested above. These patterns 11 can be patterns presented to the circuit 1 by the human operator or the environment appropriately transformed into the proper binary mode electrical signals for use in the circuit 1 by the sensors 10. The sensors 10 can measure any of the common variables used in engineering disciplines. A partial list of the sensors include optical or light sensors, quantity sensors, radiation sensors, frequency variation sensors, auditory sensors, stress or strain sensors, position sensors, acceleration sensors, temperature sensors, heat flow sensors, time sensors, chemical composition sensors, proximity sensors, voltage sensors, current sensors, magnetic field sensors and force sensors. The electrical inputs at 2 can also be the output signals of another self-organizing circuit, as later discussed with reference to FIG. 2.

In addition to patterns 11 derived from the environment (or some other source of information) by the transforming sensors 10, the inputs may be triggered randomly by the circuit 1 itself as it explores ways in which to reward or punish. The self-organizing circuit 1 can adjust itself or accommodate to an environment with little prior knowledge of what the environment is. For example, if the inputs 2 to the circuit 1 represent each of four directions to which a mechanical mouse 14 controlled by the circuit 1 can turn at each cell within a planar, cartesian maze, the reward might be given for traversing a shorter path through the maze and a punishment given for traversing a longer path. Initially, the mouse 14 randomly picks directions and eventually finds its way through the maze. But as it tries more and more times it is rewarded for shorter routes and punished for longer routes; the self-organizing circuit 1 tends to find the shortest path by eliminating long routes and encouraging short routes.

The input patterns 11, which can represent analog information, can be transformed into digital binary data by the Albus Method (BYTE Magazine, July 1979, p. 61, James Albus). In this method, several sensors 10 act over the range of some analog variable. The responses of the sensors 10 overlap various arbitrary values of the analog variable such that any particular analog value is represented by several simultaneous digital signals by some subset of the total number of digital sensors 10. Information such as audio information, whose time varying characteristic periodicity is not appropriate for the circuit 1 (e.g., is at too high a frequency), can be represented by overlapping filters (as the sensors 10) whose outputs 2 indicate various frequency bands which the audio information contains. These sound spectrograms or voicegrams are standard representations of audio information; digital decompostion of the audio signal into constituent frequencies is a common technique for transmitting acoustic information digitally as will be discussed later. Similarly static frequency patterns such as spectrographs, can be decomposed into a number of discrete frequencies and/or amplitudes for recognizing the patterns of compositions and the like. The focus of this invention is not how the various input sensors 10 derive binary information but, rather, how the electrical signals 2 self-organize to form the recognition signals 3.

Just as the input signals 2 are derived from input sensors 10, the output signals 3 can interact with the external source 9 (or some controlled unit 14) in various ways. If the external source 9 is the environment, it might include such output devices as motors which operate manipulator hands (which could be considered to be the controlled unit 14), valves in hydraulic circuits or innumerable other ways in which the electrical signals 3 alter the environment through mechanical, electrical, thermal, hydraulic or chemical amplification of the electrical output signals 3. The output can also be simply information as used by another electrical circuit or computer. This invention does not primarily concern itself with what the output signals 3 are used for, except perhaps as they directly or indirectly affect the other signals operating on the circuit 1, as previously described.

The principal aspect of the present invention is the way in which the self-organizing circuit 1 is able to organize itself in various ways. To elucidate the different aspects of this invention, the circuit 1 of FIG. 1 is subdivided into subcircuits called levels, as shown in FIG. 2. The signals (typically binary in form) from the sensors 10 of FIG. 1 feed first into a preprocessor circuit 20 whose outputs 26 are inputs 25 to a level one circuit 21A. Each level circuit 21A . . . 21N has outputs 26 which act as inputs 25 to the next higher level. The level one circuit 21A feeds its outputs 26 to the level two circuit 21B via connections 26; the level 21B inputs 25 are the same as the level 21A outputs 26. Level 21B outputs 26 become level 21C inputs 25 and so forth until the last level N circuit 21N is reached. The outputs 26 of the level N circuit 21N are the output signals 3 of the circuit 1.

This hierarchical form is not the most general; it is presented only to simplify the explanations which follows. As in neural connections, there can be feedback signals which in some cases connect from a higher level to a lower level, e.g., the higher level circuit 21B might connect to the lower level circuit 21A, via interconnections 26, but with a signal flow from the level two circuit 21B to level one circuit 21A rather than from the level one circuit 21A to the level two circuit 21B as previously suggested. Moreover, the different levels can pass through a signal from a lower level to a higher level; thus output signals of one level can be available as input not only to the next higher level, but to levels even farther up the hierarchical chain. For example, the preprocessor circuit 20 can have its outputs go into the level one circuit 21A, which may then be sent on the level two circuit 21B such that both the level one circuit 21A and the level two circuit 21B have the outputs of the preprocessor circuit 20 available for acting upon.

Lastly, the FIG. 2 illustration is not meant to imply that the same number of inputs 25 would interconnect all the subcircuits shown. In general, there may be more or less interconnections 26 between two particular levels than between two other levels. Also shown in FIG. 2 are other inputs 27 which are fed to all circuits. These other inputs 27 are meant to include signals such as the timing signal 4, the reward signal 5, the punish signal 6, the learn signal 8 and the recognize signal 7 in FIG. 1.

In FIG. 2, the preprocessor circuit 20 has been distinguished from the level circuits 21A through 21N because the circuit 20 has no self-organizing capability. The preprocessor 20 (as later explained in greater detail) acts in a programmed manner on the input signals 2 to convert them into the input signals 25 which will facilitate the self-organizing capability of the self-organizing level circuits 21A through 21N. While the preprocessor circuit uses Boolean operators such as AND and OR gates, the circuit 20 does not learn (its connection strengths do not change) nor are the circuits based on "cumulative" Boolean functions (no information is accumulated) as in self-organizing circuits 21A through 21N. The form the preprocesor circuit 20 takes depends to a great extent on the patterns which the circuit 1 is attempting to recognize, whether static or time-varying, and also upon the types of sensors 10 used to generate the signals 2 fed into the circuit 20.

The important facet of the self-organizing circuit 1 is not the preprocessor circuit 20, but, rather, the level circuits 21A through 21N. The preprocessor circuit 20 is discussed later with regard to specific tasks which the circuit 1 might perform. Examples used are a static pattern recognition task (recognizing letters of the alphabet) and a time-varying pattern recognition task (recognizing speech). Each type of pattern recognition task requires a specialized preprocessor circuit 20 which is especially designed for the specific task.

COMPONENTS OF A LEVEL CIRCUIT VOTER

Figure 3:
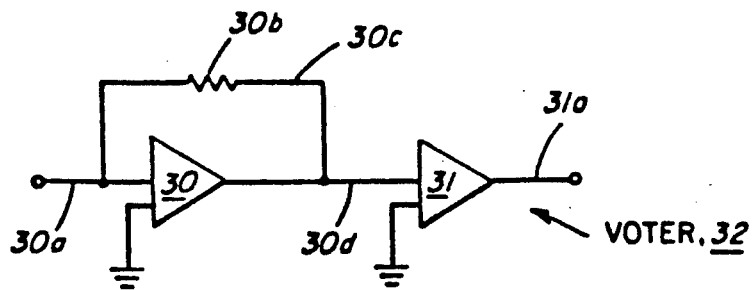
FIG. 3 is a schematic representation of a multiple-input summing junction.

Self-learning circuits of the present invention "vote" and have "path reinforcement." In an analog circuit, voting can be implemented by the multiple-input voting subcircuit or "voter" shown at 32 in FIG. 3. The voltage output signal at connection 30d is proportional to the sum of the currents—i.e., the total current—input at connection 30a. A high-gain amplifier 30 assures that the current at 30a multiplied by the resistance of a resistor 30b, connected via feedback path 30c, equals the voltage at the connection 30d. A subsequent high gain amplifier 31 outputs a binary voltage signal at connection 31a, depending on whether the voltage at 30d is positive or negative. The binary signal at the connection 31a has one of two states, thus specifying whether the voter 32 has fired: if the summation of currents into the connection 30a is positive, the voter 32 fires (i.e., attains one state at the connection 31a); if negative, it does not fire (i.e., stays at the other state at the connection 31a). Henceforth, the term "active" state will be synonymous with a binary one meaning that a particular binary device has fired; an "inactive" state will be synonymous with a binary zero, meaning that the device has not fired.

TRANSMISSION GATES

One method of path reinforcement uses digital-to-analog converters (DACs); it is presented here to illustrate one example of how to implement the present invention. A DAC takes a multiwire digital input signal and converts it to an electric current—the electric current being proportional to the binary weighted value of the input signal. One simple DAC can be made of C-MOS (complementary-MOS) inverters and transmission gates, as shown in FIG. 4A, FIG. 4B, FIG. 5A and FIG. 5B.

Figure 4A:
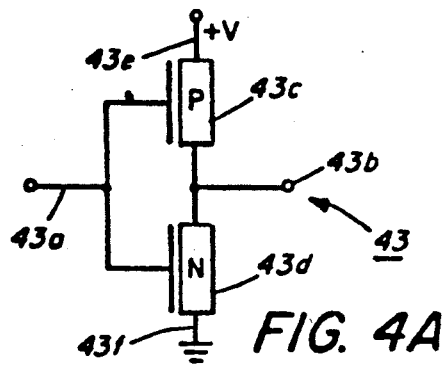
FIG. 4A is a diagrammatic representation of an inverter whose shorthand symbol is shown in FIG. 4B.
Figure 4B:
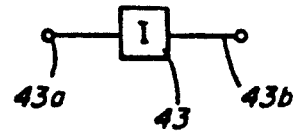

An inverter 43 is shown in FIG. 4A; its shorthand symbol is shown in FIG. 4B. Connection 43a is the input connection to the inverter 43 through which a voltage signal is fed. A positive voltage signal at the connection 43a turns the P-channel MOS element 43c OFF while simultaneously triggering ON an N-channel MOS element 43d, which causes the voltage at the output connection 43b to drop to the ground state voltage (0) which is provided at connection 43f. In a similar manner, a negative voltage at the connection 43a causes the output voltage at 43b to rise to the positive supply voltage (+V) provided at connection 43e.

Figure 5A:
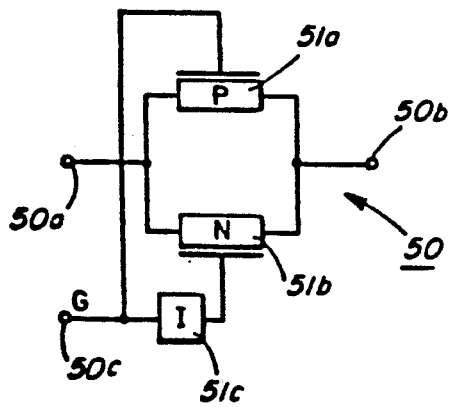
FIG. 5A is a diagrammatic representation of a transmission gate whose shorthand symbol is shown in FIG. 5B.
Figure 5B:
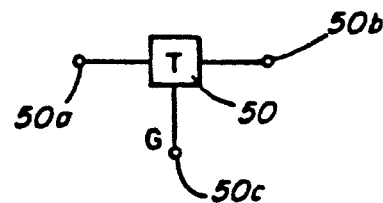
FIG. 5C is a diagrammatic representation of an analog delay circuit.
FIG. 5D is a diagrammatic representation of a digital delay circuit, a shorthand symbol for both being shown in FIG. 5E.

A transmission gate 50 is shown in FIG. 5A; FIG. 5B shows its shorthand symbol. An input current signal at connection 50a in FIG. 5A is transmitted through either a P-channel MOS element 51a or an N-channel MOS element 51b if the gate signal labeled G at connection 50c is in one binary state; but no current is transmitted if the gate signal G is in its other state. An inverter 51c insures that 51a and 51b are either both ON (so current can flow in either direction between connections 50a and 50b) or both OFF.

Figure 5C:
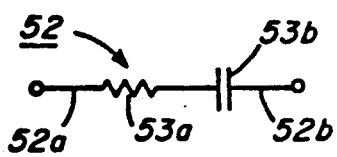
Figure 5D:
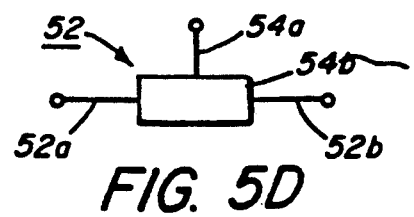
Figure 5E:
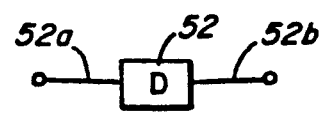

Shown in FIG. 5E is a generalized delay 52 with inputs 52a and 52b. The delay is a common electronic component which can, in many implementations of a self-organizing circuit, improve the ability of the complete circuit 101 to organize itself especially for sequential information.

DELAYS

FIG. 5C shows the analog implementation of the generalized delay 52; FIG. 5D shows its digital implementation. In an analog circuit 101, the delay 52 is simply a resistor 53a in series with a capacitor 53b; when fed a step input of current at connection 52a, the current at output connection 52b slowly builds to the input current 52a, effectively delaying the output 52b with respect to the input 52a. In a digital circuit 101 the shift register 54b is used instead of the analog delay. It is connected between digital input 52a and the digital output 52b; the input value is shifted toward the output connection 52b for each signal on clock input 54a.

PATH REINFORCEMENT

Figure 6A:
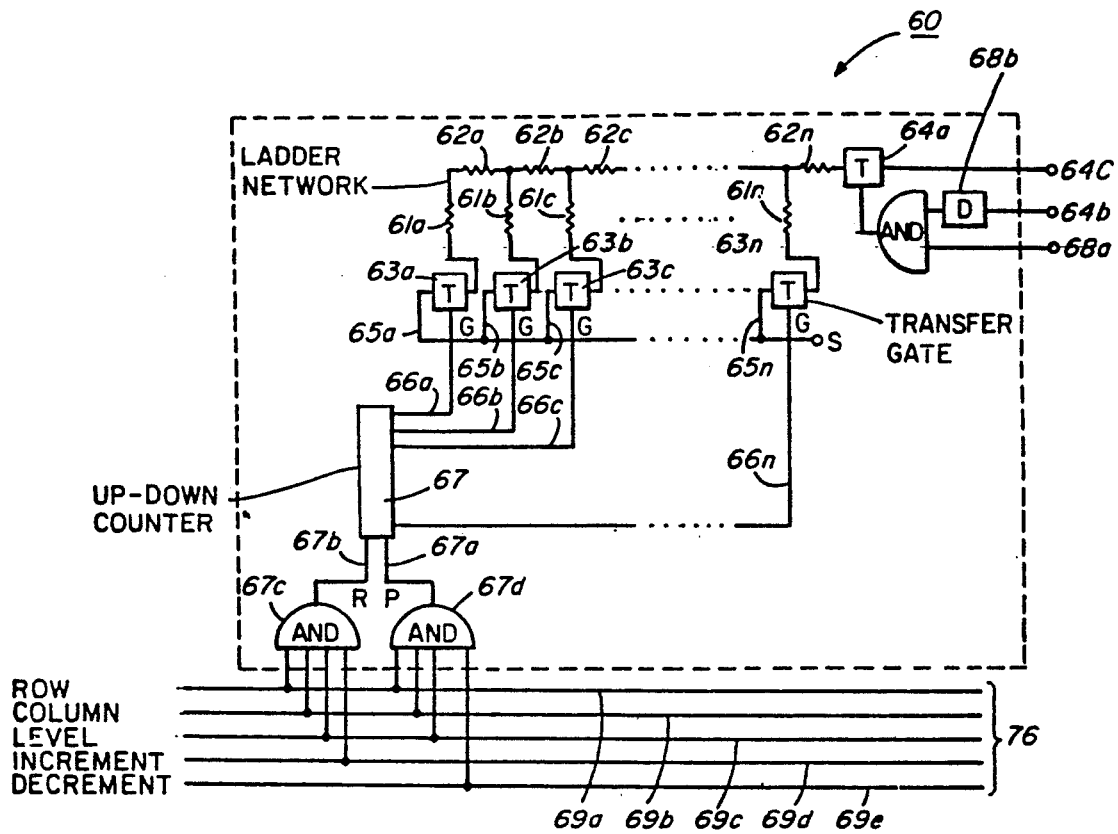
FIG. 6A is a diagrammatic representation of a digital-to-analog converter (DAC) whose shorthand symbol is shown in FIG. 6B.
Figure 6B:
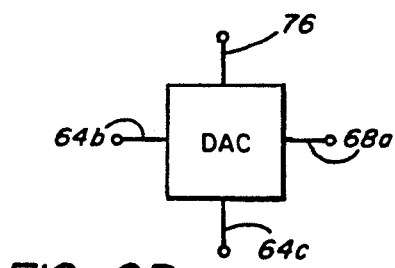

The digital-to-analog converter (DAC) marked 60 in FIG. 6A is composed of a ladder network of resistors 61a ... 62n; FIG. 6B shows a shorthand symbol for the DAC 60. Note that other DACs than the "binary-weighted" DACs discussed here are possible. For example, a sequentially-loading DAC based on charge coupled devices or bubble memories may be used in other designs of self-organizing circuits. Resistors 61a ... 61n are sized properly with resistors 62a ... 62n such that when a set of transmission gates 63a ... 63n is enabled by the binary number in an up-down counter 67, the current output fed to the transmission gate 64a is proportional to the value of a binary number stored in the counter 67 and applied to the transmission gates via connectors 66a ... 66n. One of the signal inputs of each transmission gate 63a ... 63n is connected to a supply voltage labeled S which can be either positive or negative; a positive supply S will produce a current flow into the transmission gate 64a, a negative supply S will drain current from the transmission gate 64a. A gate signal 64b (labeled G1 in FIG. 7A) is delayed by the delay 68b. After the delay, current flows through the transmission gate 64a to the output connection shown at 64c whenever the clock pulse 68a is simultaneously firing.

Figure 7A:
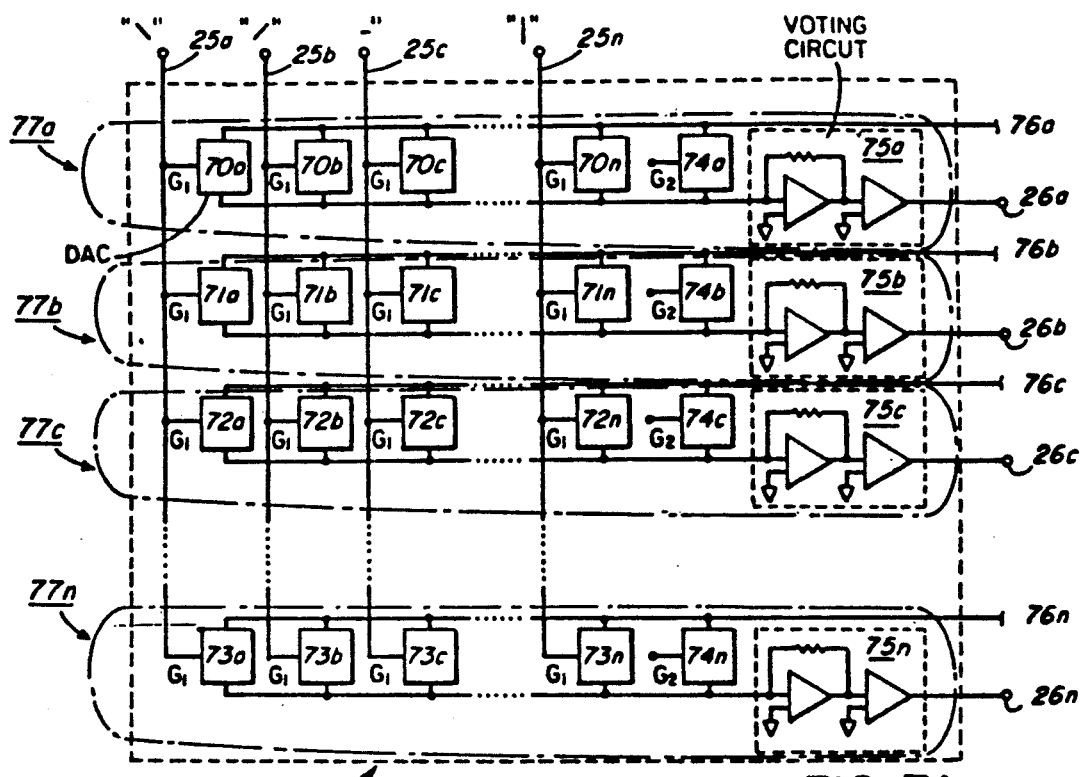
FIG. 7A is a diagrammatic representation of one form the subcircuits or level circuits of FIG. 1 can take.

The DAC 60 works as follows. For simplicity assume that the the delay 68b is zero. Each connection 66a ... 66n represents a bit of the binary number stored in the up-down counter 67. Hence, if the binary number in the counter 67 is zero, no signals will be present at connections 66a ... 66n and none of the transmission gates 63a ... 63n will allow current to flow to or from the supply connections shown at 65a ... 65n; in this circumstance, the output current at 64c will be zero when the gate G1 in FIG. 7A is enabled simultaneously with the clock signal 68a. If the binary number in the inverter 67 is "all ones", all the transmission gates 63a ... 63n will allow current to flow. The current flow into or out of the connection 64c will be its maximum when the gate G1 is enabled simultaneously with the clock signal 68a. Any binary number between zero and "all ones" will cause a current flow at the connection 64c proportional to the value of the binary number in the counter 67, current being drawn into the DAC 60 for a negative supply and current flow being out of the DAC 60 for a positive supply.

The up-down counter 67 is a particular type of binary register which counts up (i.e., the binary value of signals 66a ... 66n is incremented by one) each time it receives a reward signal 67b (at terminal R in FIGS. 6A and 6B) and counts down (i.e., the binary number is decremented by one) each time it receives a punish signal 67a (at terminal P in FIGS. 6A and 6B). A reward signal 67b adds the binary number one to a binary number stored in the counter 67; a punish signal 67a subtracts one bit from the counter's binary number. The binary number is stored in the counter 67; it remains the same whether or not signals are transmitted via connections 66a ... 66n or not. Only the punish or reward signals, 67a and 67b, respectively can change the values of the counter 67.

In this particular configuration, the punish and reward signals 67a and 67b are activated by an punish/reward bus 76. The bus 76 is composed of five signal lines: a row signal 69a, a column signal 69b, a level signal 69c, an increment signal 69d and a decrement signal 69e. The first three signals 69a, 69b, and 69c identify the particular DAC 60 in the self-organizing circuit 101 as will be discussed later. These three are combined in an AND gate 67c with the increment signal 69d to form the reward signal R; they are combined in an AND gate 67d with the decrement signal 69e to form the punish signal P.

In operation, the DAC 60 accomplishes "path reinforcement". In FIG. 6B, a current flows into or out of the connection 64c, according to how much it has been rewarded or punished. The current flows when the delayed input signal 64b occurs simultaneously with the clock signal 68a. A highly rewarded and little punished DAC 60 will have a large current flow; a highly punished and little rewarded DAC 60 will have little current flow. While these circuits have been shown in a C-MOS implementation, it should be noted that similar circuits can be designed in many other types of electronic implementation. In addition, the effect of inhibiting or reinforcing a signal is shown here simply by the choice of supply voltage for the DAC 60; a more complicated circuit as discussed later in more detail may well have the sign of the DAC 60 supply voltage determined by the binary number stored in the counter 67. Hence, in this latter variation, a much-punished DAC 60 would drain current from the connection 64c while a much rewarded DAC 60 would add current to the connection 64c.

LEVEL CIRCUIT

Shown in FIG. 7A is a simple configuration whereby a plurality of DACs 70a ... 74n (like the DAC 60) and a plurality of voters 75a ... 75n (like the voting circuit 32) are combined to give a level circuit 21. The circuit 21 on FIG. 7A is meant to imply any of the self-organizing level circuits of FIG. 2 (e.g., circuits 21A ... 21N). Inputs to the circuit 21 are denoted as connections 25a ... 25n; each input signal 25a ... 25n is connected to every column of DACs. For example, the connection 25a routes an input signal to the first DAC in every row (i.e., DACs 70a, 71a ... 73a); the connection 25b routes its signal to the second DAC in each row (i.e., DACs 70b, 71b ... 73b). The input signals 25a ... 25n are connected to the G1 gate inputs (i.e., the input 64b in FIGS. 6A and 6B) of each respective DAC as discussed with reference to FIG. 6B.

THRESHOLDS

Besides the "path-related" DACs 70a through 73n, the circuit 21 also has the "threshold" DACs 74a ... 74n. A threshold DAC 74a ... 74n is one which draws current from respective voter 75a ... 75n (e.g., like the summing junction 32 in FIG. 3). By contrast, the "path-related" DACs 70a ... 73n add current to the respective voters 75a ... 75n. The purpose of the threshold DACs 74a ... 74n is to insure that input signals to the voter 75a ... 75n are offset properly as more and more learning experiences occur; this will be discussed in more detail later.

The outputs of all the DACs 70a ... 74n either add or drain current from their respective voters 75a ... 75n. If this net current flow to the voters 75a ... 75n is positive, a binary one signal will occur at the output gates 26a ... 26n; if it is negative, a binary zero output signal will occur at the connections 26a ... 26n. The output signal, either a binary one or a binary zero, occurs simultaneously with the clock signal 68a.

CLOCKING AND DELAYS

In the preferred embodiment of level circuits 21A ... 21N (as well as the preprocessor circuit 20) the outputs 26a ... 26n are clocked. That is, the transfer of signals from these circuits occurs at a fixed rate. Since all DACs 70a ... 74n are connected to a clock signal 68a (not shown for clarity in FIG. 7A but shown in FIGS. 6A and 6B), current is only injected into the voters 75a ... 75n at fixed intervals. If the time from the beginning of one clock cycle to the beginning of the next is its period T, then the DACs 70a ... 74n only provide current at multiples of T.

The duration of the clock signal is necessarily less than its period T (since most digital components require an edge to trigger on). The clock signal, then, is active for only a portion of its period T. The effect on the DACs 70a ... 74n is a pulse of current every clock period. Since the clock signal duration is typically half or less of its period, the voters 75a ... 75n must react quickly to the current pulse from the DACs, to reliably convey the information from the inputs 25a ... 25n. Hence the inherent time constant of the voters 75a ... 75n is small compared to the clock period T or to the duration of the clock pulse 68a.

On the other hand, the duration of delay 68b (FIG. 6A) associated with each DAC 70a ... 74n is often greater than T. While there can be as little as no delay, the delay 68b may also be as great as many clock time periods. In digital implementations of the circuit 101, shift register 54b (FIG. 5D) is also clocked at the same time period T via clock signal 54a. Hence, time delays of DACs 70a ... 74n will have only integer values of T from zero to some multiple of T. However, in strictly analog embodiments of the circuit 101 precise clocking of the delays 68b and the DACs 70a ... 74n is not required. In at least one preferred embodiment of the present invention, each input 25 is associated with a delay 68b (also shown as 52 in FIGS. 5A, B, C, D, and E), hence messages from some other sub-circuit or level is delayed in time before each sub-circuit or level weights relative amounts of negative and positive inputs thereto and votes whether or not to pass along information to further subcircuits or levels. The delay 68b can be as simple as a first-order lag circuit common in many analog control circuits. Note that the delays 68b of the threshold DACs 74 ... 74n can also act to give the voters 75a ... 75n a delayed action. By draining the voters faster than they can fill with current, the voter action can be delayed in some self-organizing circuits.

NEURON CIRCUITS

The combination of a row of DACs 70a ... 70n, threshold DAC 74a and the voter 75a is called a "neuron" circuit 77a. There are many such neuron circuits 77a ... 77n in each level circuit 21 according to the present teachings; each mimics the operation of a neuron. The row of DACs 70a ... 70n mimic the dendrites which interconnect a neuron in a living organism to other neurons: they weight the effect of various inputs. The voter 75a in combination with threshold DAC 74a mimics the neuron's cell body and how it fires in response to weighted inputs from other neurons. Each row of the circuit 21A ... 21N represents a column of these neuron circuits 77a ... 77N. All the level circuits 21A ... 21N represent an array of neuron circuits.

Note that in an actual level circuit 21, connecting each column input such as input 25a, to each neuron circuit 77a ... 77n is very inefficient from a wiring viewpoint. A more efficient circuit has only "local" connections: each neuron circuit 77a ... 77n need only be connected to a few of the input signals 25a ... 25n (henceforth simply called the "inputs 25" but referring to any of the input signals 25a ... 25n to a particular level circuit 21A ... 21N). So long as each neuron circuit, such as circuit 77a, has several different inputs 25, the circuit 101 will self-organize efficiently without requiring the massive interconnection requirement that all inputs 25 be connected to each neuron circuit. In other words, the input signals 25 include only some of all the possible input signals available from either a lower level circuit or fed back from a higher level circuit. FIG. 7A shows the interconnections to all inputs 25 only for completeness.

LEARNING AND RECOGNIZING MODES

To understand how the circuit 101 operates, let it be assumed that two modes can occur: learning and recognition. First the circuit learns to respond to various patterns of inputs 2 to give proper outputs. Later, in a recognition mode of operation, the learned responses are used to identify the input signals 2: active output signals 3 indicate a recognized pattern of input signals 2.

LEARN MODE

In the learning mode, the circuit 101 operates in the following manner for a single level 21. The discussion here is simplified to only consider a single level 21 in order to clarify the system's operation. However, in general, each pattern 11 to be recognized uses many levels 21A ... 21N with interconnections between higher levels and lower levels via feedback paths, connections from lower levels directly to several higher levels and connections within a single level, as discussed later in reference to "naming".

Let it be assumed, for example, that the external source 9 in FIG. 1 is a computer which is capable of applying input patterns 11 to the sensors 10, and capable of interpreting the output signals 3 of the entire self-organizing circuit 1. It is also capable of storing within its own memory both the present state of each of the inputs 25a ... 25n and each of the outputs 26a ... 26n of each of the level circuits 21A ... 21N (henceforth simply called the "inputs 25" and the "outputs 26" but referring to any of the input signals 25a ... 25n or the output signals 26a ... 26n to a particular level circuit 21A ... 21N) as well as the previous states of these inputs 25 and outputs 26. Note that the output 26 of a neuron circuit 77 is not necessarily the same as the input 25 of another neuron circuit to which it connects. The two can differ when time delays (similar to the delay 68b (FIG. 6A)) and described later are included in the circuitry. Further, it is capable of sending signals to the punish/reward bus 76a ... 76n in FIG. 7A of each level circuit 21A ... 21N by sending row, column, level and increment or decrement signals 69a ... 69e as discussed earlier. A general purpose computer made by a variety of manufacturers connected with signal lines to the circuit 101 fills the above roles.

During the learning mode, the computer 9 applies different learning experiences or lessons to the input sensors 10, identifies the outputs of the level circuits 21A ... 21N and alters the binary numbers stored in each DAC 70a ... 74n in FIG. 7A by sending signals to the punish/reward buses 76a ... 76n of each level circuit 21A ... 21N.

In general, the computer 9 "teaches" a level circuit 21A ... 21N in the following manner. A desired pattern 11 to be learned is applied to the input sensors 10 in FIG. 1 and the outputs 26 are monitored by the computer 9. Reward or punishment of a particular DAC 70a ... 74n is based on "local" rules. These rules have two major aspects: cumulative Boolean functions and competition.

CUMULATIVE BOOLEAN FUNCTIONS

Boolean functions are those which rule binary (two state) signals; they have binary inputs and binary outputs. In strictly digital implementations, the inputs 25 and the outputs 26 of a neuron circuit 77 (henceforth referring to any of the circuits 77a ... 77n of any of the 21A ... 21N level circuits) have a binary signal. They are either active (when their respective voter 75 (FIG. 3) fires during the clock pulse) or they are inactive (when their respective voter 75 doesn't fire during that clock pulse). In some analog implementations of the circuit 1 (FIG. 1), the signals 25 and 26 are not binary. For example when the voltage output 26 from a voter 75 passes through an analog delay prior to being input to another neuron circuit 77, it may have values of voltage other than those representing active and inactive. In such cases the analog voltage is converted to a digital one by use of a threshold—if the analog voltage is greater than a certain threshold the signal is considered active, below the threshold value the signal is considered inactive.

The particular Boolean functions used by the computer 9 for punish/reward signals on bus 76a ... 76n are two-input Boolean functions, commonly called gate functions or gates. Sixteen Boolean functions exist which have two inputs; these include the common AND, OR, NAND, NOR, NOT, XOR and IF functions as well as the less common IMP (implication), EQV (equivalence), TAUT (tautology) and CON (contradiction). The two inputs used by these Boolean functions relate the binary output state 26i of a particular circuit 77i with input 25j from another circuit. The relationship between the two output states is either with the present values of the output 26i and input 25j or with their past values. The functions are called cumulative because they accumulate over time (or, in the case of digital implementations, over several clock cycles). Cumulative Boolean functions are generally of the form:

$$B = g[SUMT(FN1(X,Y)), SUMT(FN2(X,YT))] \quad (1)$$

where:
X is the binary output 26i of a particular circuit 77i at some particular time t;

Y is the binary input 25j from another circuit to which the circuit 77i is connected, at the time t;

YT is the binary input 25j from the circuit to which the first is connected but at a time previous to t;

FN1, FN2 are functions of the two-input Boolean operators;

SUMT indicates the summation over time of the functions indicated;

g is a functional relationship; and

B is the value of the cumulative Boolean function calculated for circuit 77i with respect to input 25j;

COMPETITION

In addition to cumulative Boolean functions, punish/reward decisions made by the computer 9 are based on "competition." A particular neuron circuit 77 has as inputs 25 the outputs 26 of other circuits 77 to which it is connected. These inputs 25 compete with each other based on their B values: the inputs 25 which have the largest B values have their weights (the values in their respective DACs 70a ... 73n) increased. Other inputs 25 have their weights reduced.

Mathematically, competition is simply a maximizing function (MAX). Given that the cumulative Boolean functions, B, for all the inputs 25 to a circuit 77 have been determined, the maximum function determines the largest B value and rewards the weight associated with that input 25. Reward is accomplished by increasing the value of the binary number stored in the counter 67 of its associated DAC. In some embodiments of the self-organizing circuit 1, several of the inputs 25 which have the highest B values are rewarded rather than simply the single largest one. In still other embodiments, the maximum function rewards the input 25 with the largest absolute value of the cumulative Boolean function, B. For example, when using positive/negative DACs (to be discussed shortly), the cumulative Boolean function can be either positive or negative; hence, competition based on the absolute value of B is preferred.

In addition to rewarding the largest B values, competition also involves the punishment of inputs 25 with low B values. Punishment involves decreasing the binary number in counter 67 of the DACs 70 (associated with the low B values) by activating the punish/reward buses 76. For embodiments with positive/negative DACs 70a ... 73n punishment is based on low absolute B values rather than simply low B values.

COMPETITION EXAMPLE

To understand this process, consider a simple example. Let the input signals at 25a, 25b and 25c of FIG. 7A correspond respectively to a left diagonal, a right diagonal and a horizontal. The signals 25a, 25b and 25c themselves result from the recognition of the various components due to prior teaching of lower level circuits, not shown in FIG. 7A. When the computer 9 applies a pattern corresponding to the letter "A" to the input sensors 10 in FIG. 1 the input signals 25a, 25b and 25c presumably fire because the capital "A" has components corresponding to a left diagonal, a right diagonal and a horizontal.

Initially, the up-down counter 67 in each of the DACs 70a ... 74n has a zero or small random binary number, thus causing a small or zero current flow from the DACs and randomly firing active signals 26a ... 26n. Let it now be assumed the computer 9 was programmed to allow the output 26a (of the circuit 77a) correspond to the input pattern 11 for the letter "A". In this case the desired result is for an active signal to appear at the connection 26a. For this simple static pattern, an appropriate function FN1 is the AND function between the inputs 25 and the outputs 26; the function FN2 is not required for this static pattern. After several clock cycles of the input pattern 11 is presented to the circuit 101, the B values will grow larger for those inputs 25 of circuit 77a which fire at the same time as the output 26a, i.e., those inputs corresponding to the signals 25a, 25b, and 25c (whose AND with 26a will always give a positive output). Other inputs 25d ... 25n will seldom fire in unison with the output 26a and hence their B values will not be as great.

Because of competition, the computer 9 applies a reward signal via bus 76a, which increments the value of the binary numbers in the counters 67 of each DAC 70a ... 70n which had the highest B values. In this case DACs 70a ... 70c have a bit added to their respective counter 67 since active input signals occurred on connection 25a ... 25c. As more and more learning experiences of the letter "A" occurs, the counters of the DACs corresponding to the letter "A" have higher binary numbers and send more current to the voter 75a, causing the voter to fire and giving an output at the connection 26a. On the other hand, the inputs 25a, 25b and 25c may not always be the same during lessons. In the example, some "A"s may not have horizontals; some may have other subcomponents (e.g., the vertical signal at 25n in FIG. 7A). The B values increase when they occur but most of the correct "A"s contain the signals 25a, 25b, and 25c; due to competition among the inputs 25 these "not A" inputs are seldom rewarded. The DACs 70a, 70b and 70c have the highest binary numbers in their respective counters 67, output the most current and therefore have the most influence on the firing of the voter 75a.

Punishment occurs when the inputs 25 do not compete well—when their respective B values are not as high as the most successful inputs such as inputs 25a, 25b and 25c above. The binary numbers in these DACs are reduced to prevent these undesirable inputs from affecting the outcome at connections 26a ... 26n. For example, if the letter "V" is input to the sensors 10, a lower level circuit identifies the left and right diagonal as input signals (among others). Thus the inputs correspond to signals 25a and 25b. Assuming that the computer associated output 26b with the pattern for the letter "V", both outputs 26a and 26b may occur. The latter is the "correct" output signal and hence its DACs 71a and 71b have bits added to the binary number in their counters 67, just as in the case for the letter "A" mentioned above. However, the letter "V" is not expected to have a component horizontal, so signal 25c does not fire under most letter "V" lessons and DAC 71c does not have a high count in its binary number stored in counter 67.

While the letter "V" output signal 26b results in rewards to DACs 71a and 71b, the computer 9 also punishes other DACs 70a ... 73n whose signals 26 fired but were not supposed to. The punishment is accomplished by reducing the value of the binary numbers in DACs which participated in the erroneous signal. For example, in the case where the circuit was learning the pattern 11 of sensor 10 inputs which represent the letter "V", an output signal 26a for the letter "A" may erroneously fire since two of three important sub-components (the left and right diagonal signals 25a and 25b) are feeding current from DACs 70a and 70b into the voter 75a. By reducing the binary number in DACs 70a and 70b, less current flows into the voter 75a and thus an output is less likely to occur at the connection 26a. As the erroneous output signal 26a occurs during letter "V" lessons it is punished more and more until it gives no further erroneous output at the connection 26a. Essentially, a letter "A" becomes more and more recognized by the horizontal component 25c than does the letter "V": certainly a distinguishing characteristic of an "A" is the horizontal, when compared to a "V". In general, there are many more features (or input signals 25 in FIG. 1) of a letter than just the few mentioned above. Relative positions of components, intersections, lengths of components and so forth are all relevant in distinguishing patterns which represent letters of the alphabet.

THRESHOLD LEARNING

The threshold DACs 74a ... 74n are used under certain conditions during teaching mode operation to bias the voltage level of the voters 75a ... 75n (FIG. 7A). Usually, the threshold DACs 74a ... 74n are "sink" DACs which draw current from the input 30a (FIG. 3) of the voters 75a ... 75n. For example, in the case where the DACs 70a ... 73n have only positive binary numbers stored in their respective updown counters 67 and the supply S is positive, only positive currents will output from the DACs 70a ... 73n at the respective connections 64c (FIG. 6A). These positive currents fed to the voter input connections 30a in FIG. 3 must be biased by a negative current; otherwise the outputsof every DAC 70a ... 73n with any binary number in the counters 67 causes the outputs 26a ... 26n to fire. Clearly, the circuits such as 21 would not function as self-learning circuits if virtually any positive number in counters 67 fired their respective outputs 26a ... 26n.

The bias of threshold DACs 74a ... 74n are punished and rewarded just as the DACs 70a ... 73n; by the computer 9 furnishing punish or reward signals on the connections 76a ... 76n. The gates 67c and 67d in FIG. 6A are signaled by the computer 9 in an appropriate manner to allow the value of the binary number in the counters 67 of the threshold DACs 74a ... 74n in FIG. 7A to approximately negate the effects of the sum of positive binary numbers in DACs 70a ... 73n when the correct response to an input pattern 11 to the sensors 10 is obtained at the output connection 26a ... 26n. In general, $$Nt = K^* f(SUMI(Ni)) \quad (2)$$

where:
Nt: Decimal equivalent of the binary number in threshold DACs 74a ... 74n;
Ni: Decimal equivalent of the binary number in each of the i DACs 70A ... 73n which result in obtaining a correct output at connections 26a ... 26n (for pos/neg DACs, the sign is associated with the voltage source to which the DAC is connected);
K: Fractional number;
SUMI: Summation over the i binary numbers; and
f: Functional relationship.

For example, in the previous example of teaching a circuit such as the circuit 21 the proper output for an input pattern of the letter "A" input to sensors 10, after, say, one hundred lessons one might expect the binary numbers in the DACs 70a, 70b, and 70c in FIG. 7A to have decimal equivalents of, say, fifty, fifty and eighty, respectively. Assuming no other significant features were required to trigger an output response 26a, the decimal equivalent of the binary number in the DAC 74a might be approximately one hundred fifty. Since the DAC 74a draws current from the junction 30a (FIG. 3) of voter 75a while 70a ... 70c add current to the junction 30a (FIG. 3), the net current to junction 30a would be proportional to thirty, the difference between the binary number in the DACs 70a ... 70c and the DAC 74a. This current would trigger the voter 75a to give an active output signal 26a. It will be noted, however, that an input pattern representing the letter "V" might only cause the DACs 70a and 70b to output currents proportional to their binary numbers (whose decimal equivalents are fifty and fifty). The net current at the junction 30a (FIG. 3) of the voter 75a is negative; so no output signal 26a results. Thus, for the special case considered here, the threshold DAC 74a helps distinguish between the letter "A" and the letter "V".

POSITIVE/NEGATIVE WEIGHTS

The threshold DACs 74a ... 74n in FIG. 7A are a circuit generalization over self-learning circuits such as the circuits 21 which use positive/negative DACs 70a ... 73n (in place of the positive current DACs 70a ... 74n discussed above) as the "weighting" mechanisms for the input signals 25a ... 25n. Positive/negative DACs can be arranged to accomplish the same function as positive-current DACs 74a ... 74n; positive/negative DACs 70a ... 73n are devices which can output either positive or negative current. The amount of current depends on the value of the number in counter 67. It will be observed that the circuit of a positive/negative DAC is similar, but not identical, to that shown in FIG. 6A.

Note that both a positive DAC (one with a positive voltage source) and a negative DAC (one with a negative voltage source) are often connected between the same input signal 25 and voter 75. Thus the entire range from current addition to current removal is possible by altering the numbers stored in the positive and negative DACs. Occasionally this combination of both positive and negative current DACs are together termed a positive/negative DAC.

With positive/negative DACs 70a ... 73n inserted into the circuit 21 in FIG. 7A, the threshold DACs 74a ... 74n may not be required except in some circuits requiring a delayed response of the voter 75a ... 75n when the delay 68b of a threshold DAC is implemented. Rewarding is accomplished, as before, by adding bits to the binary number stored in counter 67 (FIG. 6A) of the DAC; punishment is done by subtracting binary bits from the numbers stored in counter 67. The current output of one of the DACs 70a ... 73n will be positive if its associated voltage source is positive; the current will be negative if its associated voltage source is negative. A positive current from a particular DAC will tend to fire the associated voter (i.e., the voter 32 in FIG. 3 or the appropriate voter 75a ... 75n in FIG. 7A); a negative current will tend to inhibit the associated voter from firing.

Punishment and reward are handled, as before, by the computer 9 which activates the punish or reward buses 76a ... 76n, depending on the competition for the cumulative Boolean function of its input signals 25a ... 25n. Note that DACs having either positive or negative voltage sources are rewarded by increasing the value of the of the number in their counter 67; punishment is accomplished by reducing the number in their counter 67 thus allowing less current (either positive or negative) to flow. Positive/negative DACs used as DACs 70a ... 73n probably mimic the response of brain neurons more closely than do positive DACs such as the DAC 60 in FIGS. 6A and 6B combined with threshold DACs 74a ... 74n. However, the positive/negative DAC method is generally more expensive to implement than the positive only DAC method. Both are valid methods of producing self-organizing circuits 101. In the discussion which follows, positive/negative DACs (or their equivalents) will be used to discuss implementations of various designs of self-organizing circuits. This is done as a simplification since the threshold DACs may even be required in certain circuits using positive/negative DACs.

WEIGHTING METHODS

The external source 9 (FIG. 1) is an external device used to teach the self-organizing circuits 101; it is not used for the circuit's operation. Moreover, in a more advanced self-organizing circuit 101, the teaching function is implemented in internal hardware: the cumulative Boolean functions discussed above are made in silicon logic associated with each subcircuit 77a ... 77n.

INTERNAL WEIGHTING

Figure 20A:
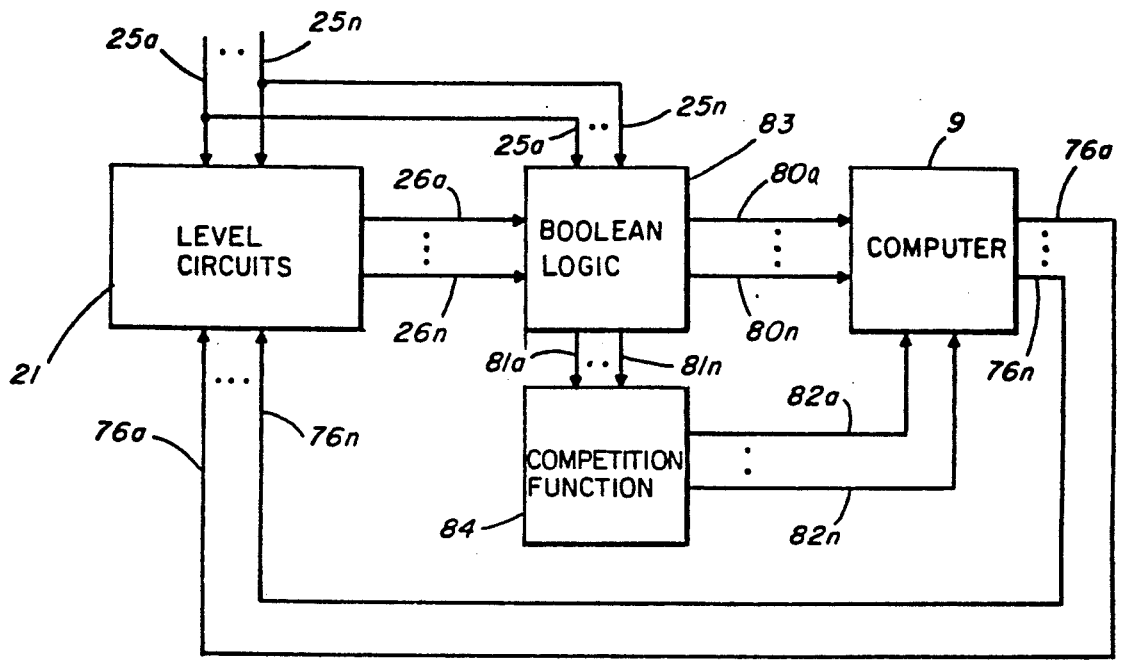
FIG. 20A is a diagrammatic representation of the self-organizing circuit with the Boolean logic function and competition function implemented in hardware.

To understand the various weighting methods between internal or "local" weighting (local implementation of weighting the circuit's DACs) and external weighting (where an external source 9 effects the DACs weighting), consider FIG. 20A. The level circuits 21 function as before to receive input information in the form of an input signal. The level circuits are operable to effect analysis of the pattern of constituent elements in the input signal to extract the input information from the input signal and provide an output signal related to the input information. The circuits 21, as noted above, are self-organizing circuits or levels 21A ... 21N in FIG. 2 interconnected to receive the outputs of other sub-circuits or levels and to provide other output, all of which are connected as inputs to the computer 9 and, usually, fed back from the computer 9, usually after processing by the computer, to other sub-circuits or levels. Typically, then, a sub-circuit or level of the circuits 21 (e.g., sub-circuit 21A in FIG. 2) receives an input signal 25a ... 25n and processes that input signal 25a ... 25n to provide an output signal 26a ... 26n to the higher sub-circuits or levels 21A ... 21N. Within each sub-circuit or level 21A ... 21N there is weighting whereby each sub-circuit or level votes whether or not to pass along information to the next sub-circuit or level. The computer 9 serves to apply modifying inputs to each sub-circuit or level in the level circuits 21 in FIG. 20A, which modifying inputs serve to correct errors in the output signal 26a ... 26n occasioned by accurate or inaccurate analysis of the input signal 25a ... 25n by the self-organizing circuit 1 in FIG. 1, which consists of the preprocessor 20 and the sub-circuits or levels 21A ... 21N. The Boolean logic function and the competition function of the level circuits 21A ... 21N are now discussed in detail. Note, however, that the operation of the weighting of the DACs 70a ... 74n are also influenced by the universal punish/reward signals; as a simplification only their weighting due to other outputs 26 and inputs 25 will be discussed.

According to the present teaching, the outputs 26a ... 26n of the various level circuits 21A ... 21N are connected as input to Boolean logic function circuits 83 (i.e., two-input gates, as above noted) which may be separate circuits as shown or may be functions within the computer 9. Output 80a ... 80n in FIG. 20A from the Boolean logic function circuits 83 to the computer 9 provide some of the data to permit the computer 9 to provide modifying inputs to the circuits 21A ... 21N. That is, one mechanism by which the circuits 21A ... 21N are self-organized is by feedback from the Boolean logic function circuits 83 which typically are part of the computer 9, properly programmed.

As noted earlier, the results of the Boolean logic computation (by the circuits 83 or by the computer 9) are further modified by competition amongst the various inputs based on their B score. In FIG. 20A, the competition function is executed by competition function circuits 84, which receive inputs 81a ... 81n from the Boolean logic function circuit 83 and provide inputs 82a ... 82n to the computer 9 which processes these inputs to provide modifying inputs, included or part of the inputs 76a ... 76n in FIG. 20A, to the level circuits 21. The purpose of the competition function circuits 84 is to provide modifying inputs to the level circuits 21 in FIG. 20A based upon competition among the messages received by the various sub-circuits or levels 21A ... 21N from the other sub-circuits or levels 21A ... 21N.

LOCAL WEIGHTING

Figure 20B:
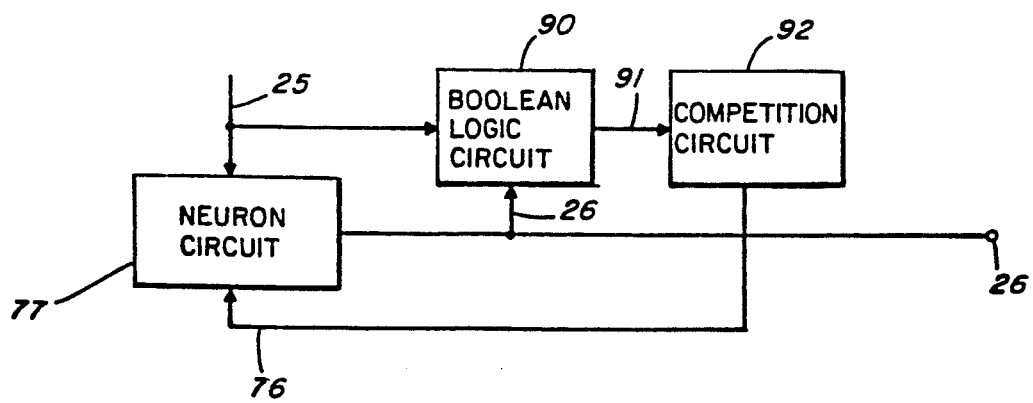
FIG. 20B shows how the same hardware logic functions are implemented at the subcircuit level of the self-organizing circuit.

FIG. 20B shows the Boolean logic function and the competition function implemented on the local level without requiring the use of external source 9. As discussed earlier, the neuron circuit 77 (one of the circuits 77a ... 77n shown in FIG. 7A), receives inputs 25 (collectively, the inputs 25a ... 25n in FIG. 7A) and has an output 26 (one of the outputs 26a ... 26n in FIG. 7A). In addition, each neuron circuit 77 has an associated Boolean logic function circuit 90 which performs the Boolean logic operation described earlier to determine the B scores of the inputs 25 based on the Boolean values of the inputs 25 and the output 26 of the neuron circuit itself. The output of the Boolean logic function circuit 90 is input via connections 91 to the competition function circuit 92 which determines the largest B score of the inputs (or the largest absolute B score in some circuits). The circuit 92 applies a modifying input to the neuron circuit 77 via bus 76 to alter the value of the binary numbers stored in the appropriate DACs of the neuron circuit 77.

Thus the weights in the self-organizing circuit 1 can be modified by several alternate methods. They may be externally modified by a teaching computer 9 with Boolean logic and competition functions implemented in software programming. In the method shown in FIG. 20A the weights can be modified by an external computer 9 which bases its decision on internal Boolean logic circuits 83 and internal competition circuits 84. The weights can also be modified completely internally using Boolean logic circuits 90 and competition circuits 92 associated with each neuron subcircuit 77. A designer skilled in the field can devise many other weighting methods which have various amounts of internal and external functions which accomplish the Boolean logic and competition functions of this invention.

FLOW CHART

In FIG. 1 the preferred use of the computer 9 rather than some other external source (for example, a human operator) is one of convenience only. Teaching with some other external source is identical to teaching with a computer 9, through perhaps slower. The innovation of the present invention lies in the structure of the self-organizing circuits such as circuit 21 in FIG. 7A and the method by which the circuit organizes itself, not in the use of a computer 9 or internal circuitry which are merely convenient and speedy means of teaching the self-organizing circuit.

Figure 7B:
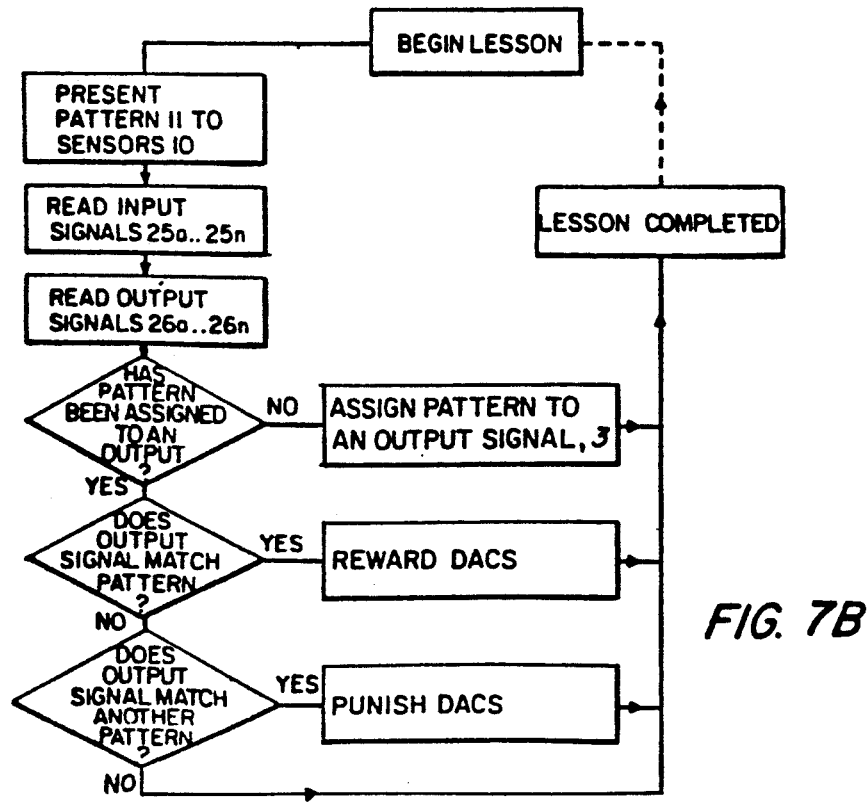
FIG. 7B is a flow chart for the computer of FIG. 1.

The operation sequence of the computer 9 or some other external source can be summarized by the flow chart shown in FIG. 7B. FIG. 7B indicates that the first task of the computer 9 or other external source is to present patterns 11 to be recognized to the sensors 10. For example, a human operator may write a pattern 11 representing the letter "A" such that an optical system associated with the sensors causes digital variation in the sensor outputs as discussed earlier. Next, the active input signals $25a \ldots 25n$ and output signals $26a \ldots 26n$ of level circuits $21A \ldots 21N$ are read as indicated by the second and third blocks of the flow chart. The next operation in a "lesson" is to assign or associate an active output signal $26a \ldots 26n$ (of either the final level circuit 21N or an intermediate one) with the particular pattern 11 to be learned, if this has not already been done in a previous lesson.

The final two operations concern reward and punishment. If the output signal $26a \ldots 26n$ of the desired level matches the assigned pattern, the DACs $70a \ldots 73n$ are rewarded by increasing the value of the binary number stored in their counters 67 (for illustration, positive/negative DACs $70a \ldots 73n$ are assumed). If the output signal $26a \ldots 26n$ does not match the assigned pattern 11, the DACs $70a \ldots 73n$ are punished by reducing the value of the binary numbers stored in their counters 67. At either of these decision points the lesson is completed by altering the binary number stored in the counters 67 of the appropriate DACs by triggering either the reward or punish buses $76a \ldots 76n$. The reward or punishment criteria is based on the cumulative Boolean functions discussed earlier. While a lesson for a static pattern 11 can last as long as a single clock cycle, preferred embodiments have several clock cycles associated with each lesson.

LEARNING METHODS

The flow chart and reward/punishment procedure shown in FIG. 7A is not the only procedure useful in connection with the self-organizing circuit 21, but represents one of several possible procedures, as will be discussed shortly; other procedures represent simple changes in the method of altering counters 67 of DACs $70a \ldots 74n$ while still others represent slight variations in the circuits as well. For example, a circuit self-organizing such as the circuit 21 may have its counters 67 altered in the following manner: each output $26a \ldots 26n$ which fired increases the binary numbers in those DACs $70a \ldots 73n$ which already contain positive binary numbers but reduces the binary numbers in those DACs $70a \ldots 73n$ which already contain negative binary numbers. This learning strategy is useful in stabilizing a particular pattern 11 to a particular output $26a \ldots 26n$ after initial inhibitory or excitory characteristics (minus or plus binary numbers) has been established through punish and reward signals $76a \ldots 76n$. In this case, only the method for altering binary numbers is changed, not the circuit itself. Another way in which the learning strategy is changed is by altering the circuit itself. Although often the same effect can be accomplished by modifying the rule for altering binary numbers, both methods are valid for teaching self-organizing circuits. The discussion which follows considers a few ways in which the circuit itself can be changed to improve self-organizing.

NEGATION

Certain self-organizing circuits may require outputs $26a \ldots 26n$ to feed directly back to inputs $25a \ldots 25n$. These feedback signals aid in distinguishing between various patterns. For example, an output signal specifying the capital letter "A" may be required in recognizing the capital letter "V": although an "A" pattern has some of the components of the "V" pattern, the pattern cannot simultaneously be both. Thus a characteristic of the "A" pattern is that it is not "V"; a characteristic of the "V" pattern is that it is not "A". If the output signal representing pattern "A" is signal $26a$, when that signal is used as an input signal $25a \ldots 25n$ of the circuit 21, it tends to have a negative weighting effect in the case where, say, positive/negative DACs $70a \ldots 73n$ are used to provide the current inputs to voters $75a \ldots 75n$. As learning progresses, each correct pattern "A" which was recognized acts to inhibit the pattern "V" output from occurring since the computer 9 punishes the input signal (i.e., adds negative binary numbers to the counter 67 associated with the appropriate DAC $70a \ldots 73n$) if the signal for pattern "V" occurs simultaneously with that for pattern "A".

Alternatively, the computer 9 may in some self-organizing circuits such as circuit 21 punish all DACs $70a \ldots 73n$ for the ones (e.g., $70a \ldots 70n$) which the computer 9 had identified with the pattern "A" output signal $26a$. The effect is the same—one and only one of the signals $26a \ldots 26n$ tends to fire during any particular recognition cycle.

In still other self-organizing circuits 21 the input signals $25a \ldots 25n$ themselves may be required to be negated. For example, in recognizing the pattern for the letter "O", an important criterion may be the absence of any straight lines such as diagonals, horizontals, or verticals. Thus an active signal representing "not vertical" or "not horizontal" may be as useful in recognition tasks as the signals representing "vertical" or "horizontal". NOT signals are simply inversions of the signals $25a \ldots 25n$ that represented "not vertical".

LEARNING AND RECOGNIZING

The above discussion deals with the learning mode of operation of self-organizing circuits such as the circuit 21. The recognition mode occurs after the self-learning circuits $21A \ldots 21N$ have been taught through many learning trials of different input patterns 11 to the sensor 10 by the computer 9. The output signals 26 may be the final step in recognizing a pattern 11 or may be an intermediate step to more complicated patterns of other higher level circuits such as circuits $21B \ldots 21N$.

The learning mode as discussed so far has been separated in time from the recognition mode. First, learning occurs and then, later, the taught circuit $21A \ldots$ can recognize patterns. However, during learning the taught circuit is also recognizing patterns on which it signals recognition by output signals at connections $26a$ ... 26n. Hence, recognition and teaching by the external source or computer 9 are actually occurring simultaneously: learning mode and recognition mode can occur simultaneously if the computer 9 is made to punish or reward the circuits such as the circuit 21 according to the "correctness" of the response via signals 26a ... 26n.

UNIVERSAL SIGNALS

Ideally, pattern recognition which occurs at higher levels should influence the learning process at lower levels. For example let it be supposed that the positive/negative DAC method is used in the level one circuit 21A of FIG. 2 for recognition of letter components such as left diagonal, right diagonal, horizontal and so forth. Let it be supposed, too, that in a level two self-organizing circuit 21B, the same method is used to recognize patterns of letters based on the outputs of the level one circuit 21A. In the learning of patterns 11 by the first circuit 21A, punish or reward signals 76a ... 76n alter the binary numbers in DACs 70a ... 73n as earlier described in order to identify output signals 26a ... 26n associated with component patterns of diagonals, horizontals and so forth. However, in some self-organizing circuits 1 (FIG. 1), learning of component patterns 11 by the first circuit 21A may also occur simultaneously with learning of patterns of letters by the second level circuit 21B. To accomplish this function in electronic circuitry the punish or reward signals (signals 5 and 6 in FIG. 1) can be transmitted simultaneously to all DACs 70a ... 73n, in addition to separate punish-reward signals based on cumulative Boolean functions. Each DAC 70a ... 73n combines the "universal" punish/reward signals 5 and 6 from the computer 9 with the output signals 26a ... 26n to alter the binary number stored in the respective counter 67 of the DAC 70a ... 73n. In one simple method of accomplishing the combining, a simple AND combination (both inputs present to get a signal) of the "universal" punish/reward signals 5 and 6 and the output signals 26a ... 26n are used to alter the binary numbers.

In operation, a correctly recognized pattern 11 (as presented to the sensors 10 by the computer 9) causes the computer to transmit a reward signal 5 to the self-organizing circuit 1. The reward signal 5 (FIG. 1) combined with an active output signal 26a ... 26n in an AND combination adds binary numbers to the counters 67 in the DACs 70a ... 73n ; the punish signal 6 (FIG. 1) combined with an active output signal 26a ... 26n (FIG. 7A) in an AND combination subtracts binary numbers from the counters 67. In the present example, learning of "letter" patterns 11 by circuit 21B is accompanied by punish signal 6 and reward signal 5 depending on whether the learning was correct or incorrect. Since these same punish and reward signals are also transmitted to the circuit 21A learning will occur on this circuit as well: binary numbers will be altered in response to correct or incorrect answers. Hence, a "diagonal" component signal on first circuit 21A is rewarded if it helped to cause a correct letter "A" pattern to be recognized by the circuit 21B. In general, any DAC in the circuit 1 (FIG. 1) which contributes to a correct answer is rewarded; a DAC that contributes to a wrong answer is punished.

INTERMEDIATE OUTPUTS

Some self-organizing circuits 101 can eliminate the need for learning experiences by a lower level circuit (e.g., level circuit 21A used in the previous example).

The issue is concerned with "naming": associating a particular output 26a ... 26n with a named or known pattern 11. For the circuits 21A ... discussed so far, all outputs 26a ... 26n are known or identified prior to learning. If output 26a, for example, is associated with the pattern 11 for a left diagonal, the punish/reward bus 76a is used by the computer 1 to transmit the proper punish/reward signal depending on the correctness of the signal 26a response to a left diagonal pattern 11. Each pattern 11 shown to sensors 10 is associated with a particular output 26a ... 26n; the forming of these associations is the process of "naming."

While naming of some outputs may be quite important, for other outputs it is not. For instance, a circuit 1 (FIG. 1) whose task was to optically read handwriting would be very concerned which letter patterns 11 were associated with which letters, although the outputs 26a ... 26n associated with the components such as left diagonals, verticals or horizontals might not be important at all. For situations such as these, the naming process can occur randomly.

One way to accomplish random naming is to load the counters 67 of positive/negative DACs 70a ... 73n (FIG. 7A) with small, but random, binary numbers prior to learning. During initial lessons all outputs either fire or don't fire based solely on the sign (positive or negative) of the summation of random numbers stored in their DACs 70a ... 73n. Reward and punishment signals are based, as before, on the cumulative Boolean functions of the inputs 25a ... 25n of each level circuit 21A ... 21N. Some circuits 21A ... 21N may require feedback signals from output to input, as discussed earlier, to insure that only one of the outputs 26a ... 26n of the level circuit of concern fired. As learning progresses, some output signal 26a ... 26n tend to become associated with an intermediate component. Exactly which one is not important since these intermediate outputs 26a ... 26n are transmitted to the next higher level circuit.

For example, if the level one circuit 21A is to have outputs 26a ... 26n which represented components such as diagonals, horizontals and so forth of letters whose outputs 26a ... 26n are in the level two circuit 21B, the DACs 70a ... 70n of the first circuit 21A would be loaded with small random binary numbers. Input signals 25a ... 25n of the first circuit 21A come from sensors 10 but are preprocessed by preprocessor circuit 20. These inputs 25a ... 25n activate certain columns of the DACs 70a ... 73n in FIG. 7A, for instance, the first three columns of DACs. Some of DACs 70a ... 73n, based on the random numbers in their counters 67, would output enough current to the voters 75a ... 75n to cause the voters to fire.

The computer 9 sends reward and punish signals based on the cumulative Boolean functions to the DACs 70a ... 70n in levels 21A ... 21N, having the binary number in their counters 67 incremented or decremented. If the signal were incorrect, the counters 67 would be decremented. In particular, the DACs 70a ... 73n in the first circuit 21A would be incremented or decremented. As more and more lessons occurred for various patterns 11 of block letters, certain intermediate components would become associated with particular outputs 26a ... 26n of the level one circuit 21A. However, which outputs become associated with which intermediate component patterns 11 would not be known, a priori, before learning commenced. Hence, an output 26a might become associated with a diagonal, with a horizontal or with some other component pattern 11 purely at random; "naming" is not always necessary.

BALANCE

As has been discussed previously, the influence which an output connection 25 has on its voter 75$i$ is determined by the value of the binary number stored in its associated DAC (one of the DACs 70$a$ ... 73$n$ of the level circuits 21A ... 21N). The subscript i here refers to a component (in this case the voter) of the neuron circuit 77$i$, one of the circuits 77$a$ ... 77$n$ in FIG. 7A. The value of the binary number (henceforth called simply the DAC's "weight") is itself determined by a combination of influences: the cumulative Boolean function determined between the particular input 25 and the outcome 26 of the voter 75$i$ to which it connects; biasing of the cumulative Boolean function by the universal punish/reward signal; and how well that cumulative Boolean function competes with that of the other DACs 70$a$ ... 73$n$ connected to the same voter. In addition to these, yet another influence on the weights of DACs 70$a$ ... 73$n$ leads to better self-learning properties of the circuit.

"Balance" is a term which applies to the balance of inhibitory and excitory inputs applied to a voter 75$i$ of a neuron circuit 77$i$. Improved pattern recognition capabilities result when the DACs of a circuit 77$i$ have a combined sum of close to zero. That is, if the weights of each DAC (say, 70$a$ ... 70$n$ and 74$a$) connected to a voter (say, 75$a$) are summed algebraically whereby those associated with a positive source (as in source S in FIG. 6A) are assigned a positive sign and those associated with a negative source are assigned a negative sign, the result is nearly zero. Earlier such a "neutral sum" situation was described in relation to the operation of the threshold DACs 74$a$ ... 74$n$. The weight of a threshold DAC 74$i$ was a function of the summation of the other DAC weights which connected to a particular voter 75$i$. Current drawn off by the threshold DAC approximately negates the current inputs by the other DACs of the node; the result is a "neutral sum" of influences to the voter 75$i$.

When the positive/negative method of DAC weighting is used, it is still often necessary to have a balanced node for improved pattern recognition. Without balance, a node (i.e., neural circuit 77$i$) may become dominated by either inhibitory or excitory influences. For example, if a node's weights are mostly excitory (having positive binary numbers in its DACs) the node will fire under almost any input 25 from another node to which it has been formed a strong connection. Such cooperative behavior is valuable in some circumstances where associations of input patterns 11 are to be learned by a self-organizing circuit 1, but it's not useful in determining distinctions in input patterns 11. Similarly, if a node's weights are mostly inhibitory (having the binary numbers in its DACs connected to a negative voltage source), the node will seldom fire at all and will have little influence on nodes to which it connects. More importantly, a balanced node is capable of taking on more information as will be discussed shortly in relation to "addendum".

BALANCE METHODS

Balancing can be accomplished in several ways. The easiest way is to simply reward DACs of each sign equally during the competition for cumulative Boolean functions. As described earlier, a competition takes place in each neuron circuit 77$i$ for the largest B value among the DACs 70$a$ ... 73$n$ to which it is connected. Balance is achieved by allowing the excitory DACs (those connected to a positive source such as the source S in FIG. 6A) to compete separately for the biggest positive B value, while the inhibitory DACs (those connected to a negative source) compete for the biggest negative B value. The DACs with the biggest B values connected to each type of source (positive or negative) are rewarded with weight increases: positive weights get more positive and negative weights get more negative. Note that the number of either positive or negative DACs which are rewarded can either be one (reward the single largest B value in either category) or more (reward several DACs with the highest B values in either category).

As before, the DACs which did not compete well have their binary numbers drained toward zero—so that they will have little further influence on the voter 75$i$. As the neuron circuits 77$i$ of the self-organizing circuit 1 learn the input pattern 11, the biggest of both the positive and the negative weights are increased more or less equally so that any particular neural circuit 77$i$ stays close to being balanced.

Another way to maintain node balance is to use the "net balance" on the node to bias the competition for cumulative Boolean function of each neuron circuit 77$i$. The net balance of a circuit 77$i$ is computed by the weight modification system (such as the computer 9) by first summing the binary numbers for all DACs connected to a circuit 77$i$ of each type: the positive sum is the sum of all the binary numbers in the DACs connected to a positive source (such as source S in FIG. 6A) while the negative sum is the sum of all the binary numbers in the DACs connected to a negative source. The net balance is positive if this positive sum is greater than the negative sum, else it is negative.

The net balance value can be used to bias the competition for the largest B values and thus keep the node balanced. If the net balance on the neuron circuit 77$i$ is positive, the competition is biased so that negative weights (the binary numbers in DACs connected to a negative source) will compete easier. As the weights of each sign grow larger, those that are negative will tend to grow faster than the positive because they will be rewarded with a weight gain more often. Conversely if the net balance is negative, then positive weights in DACs 70$a$ ... 74$n$ will do better in the competition, and the tendency will be to increase positive weights to the detriment of negative weights. Again node balance is maintained.

Node balance of this form can be written algebraically as follows:

$$Bm = B - Kb * f[SUMJ(Nj)]$$

where:
B Cumulative Boolean function associated with a DAC 70$a$ ... 73$n$
Kb Multiplier constant
Nj Decimal equivalent of the DAC binary number having a sign the same as the sign of the voltage source connecting it
SUMJ Summation over the j DACs 70$a$ ... 73$n$ that connect to voter 75
f Functional relationship
Bm Modified cumulative Boolean function The Bm values are used to determine the top competitors for the DACs in a neuron circuit 77i; the weights of the DACs 70a ... 73n are increased for those DACs connected to voter 75i which have the highest Bm scores. If the net balance is positive, the negative-weighted DACs compete better and get chosen for weight increases more often because their Bm scores are higher. If the net balance is negative, the positive-weighted DACs compete better and get chosen for weight increases more often because their Bm scores are higher.

Such a method regulates the net balance to be close to zero. A third way in which balance can be maintained on a node (i.e., neuron circuit 77i) is to base the weight change of the positive DACs on the negative sum and the weight change of the negative DACs on the positive sum. The positive and negative sums are the same as are described above: the sum of the binary numbers of all the DACs having like sign of source which are connected to circuit 77i. Such a method appears to be used by neurons in the cortex of living organisms: inhibitory neurotransmitters spur the growth of excitory connection strengths while excitory neurotransmitters spur the growth of inhibitory connection strengths.

The following equation is a simple way in which weight size of one sign is used to augment the weight change of the opposite sign:

$DN+ = f[SUMJ(Nj)+)]$
$DN- = f[SUMJ(Nj-)]$ where:
- $Nj+$ Decimal equivalent of the binary number stored in a DAC j connected to a positive voltage source (positive weight)
- $Nj-$ Decimal equivalent of the binary number stored in a DAC j connected to a negative voltage source (negative weight)
- SUMJ Summation over the j DACs 70a ... 73n that connect to voter 75
- $SUMJ(Nj+)$ Positive sum (sum of weights connected to a positive source)
- $SUMJ(Nj-)$ Negative sum (sum of weights connected to a negative source)
- f Functional relationship
- $DN+$ Weight increment added to the positive DACs connected to voter 75 which have the biggest cumulative Boolean score
- $DN-$ Weight increment added to the negative DACs connected to voter 75 which have the biggest cumulative Boolean score In a simplified example, the operation is as follows. The weights of the DACs connected to a voter 75i forming a neuron circuit 77i initially start as small random values, some tending to drain current from the voter 75i (negative weights) and some tending to add current to the voter 75i (positive weights). After a period of interaction between the inputs 25 of circuit 77i and the output 26, cumulative Boolean functions are determined by the teaching computer 9 for each of the DACs connected to the voter 75i. If universal punish/reward signals are present, these may be incorporated into the B value as well.

The positive weights compete and the highest B value among the positive weights is rewarded by increasing its weight. The amount which it is rewarded, however, depends on the node's negative sum, $SUM(Nj-)$; the negative sum is computed by the computer 9 and the most competitive positive DAC has its stored binary number increased by an amount related to the node's negative sum. Conversely, the biggest B value among the negative weights determines the negative DAC which will be rewarded by increasing its weight to a bigger negative value. The amount which it is rewarded is related to the positive sum, $SUM(Nj+)$, of DACs connected to the voter 75i. Note that in this simple example only a single weight of each sign is rewarded; in general, several of the biggest weights of each sign are augmented, each in proportion to its B score. As before, the B value may have an additional term for the effect of the universal punish/reward signal.

ADDENDUM

"Addendum" is an important feature of a self-organizing system that is to operate on a variety of information at different times. Addendum is the ability of a circuit 1 to add information in addition to that which it has already been trained. For example, suppose a pattern of input signals 2 (FIG. 1) representing the letter "A" was taught to the circuit 1 (as was previously described by presenting this input pattern 11 to appropriate sensors 10 and preprocessor circuit 20). The circuit would then be able to recognize the letter "A" if the input pattern 11 presented to the sensors 10 once again was an "A" or close to it.

If the circuit was trained on the letter "V" at the same time, the input pattern 11 could be either a letter "A" or a letter "V" and the output signals 3 would respond either to the letter "A" or to the letter "V" as previously described. "At the same time..." here means that the patterns for the letter "A" and the letter "V" are presented to the circuit 1 alternately—first the letter "A" pattern, then the letter "V" pattern, back to the letter "A", then "V" again and so forth. By using such a presentation of patterns, the weights (the values of the binary numbers in the DACs 70a ... 74n) incorporate the information of both patterns 11 at the same time. To properly distinguish the "A" from the "V", weight modification must incorporate both patterns.

However in living organisms, the learning of one pattern is not restricted to occur simultaneously with the learning of all other patterns. All living organisms have the ability to add new patterns—new information—to the store of patterns which they learned at a previous time. The new pattern may be learned weeks or years later, when the store of previous patterns is not even available for comparison. For the most part living organisms learn patterns sequentially in a one-after-the-other manner, rather than learning patterns simultaneously.

As described earlier, the connections (inputs 25) of a node (neuron circuit 77i) are chosen by having them compete for the cumulative Boolean function biased by the universal punish/reward signal. Necessarily only a few of the many inputs to a circuit 77i develop large inhibitory or excitory connection weights. These are the winning connections for the pattern being learned. DACs whose B values (or B+, B− values) didn't compete well are reduced—their binary numbers are driven toward zero, where they have little influence on the outcome of the voter 75i. These are the losing connections for the pattern which is being learned. As the same pattern 11 is repeatedly presented to the sensors 10, the winning connections grow larger and larger (either positively if connected to a positive source or negatively if the reverse). After many of these weight modification steps, only a few of the connections will dominate the response of the node. Addendum operates by freezing or maintaining the weights of the winning connections of the previously learned patterns, during the time when a new pattern is being learned.

To understand how addendum operates, consider a hypothetical neuron circuit 77$i$ (one of the circuits 77 among the level circuits 21A . . . 21N) which has positive/negative DACs and inputs 25 representing primitives of letters. After the circuit 1 has been trained on the letters "N", "R", and "V" many times, circuit 77$i$ modifies its weights such that the inputs develop as follows. The winning excitory connections are inputs 25$a$ and 25$b$ (similar to those in FIG. 7A). They have strong excitory weights (DACs connected to 25$a$ and 25$b$ have large binary numbers and a positive source S) and represent a left diagonal and a right diagonal "/", respectively. The winning inhibitory connections are inputs 25$d$ and 25$n$. They have strong inhibitory weights (DACs connected to inputs 25$d$ and 25$n$ have large binary numbers and a negative source) which represent a left-facing curve ")" and a vertical "|", respectively. Other connections have lost in the competition for B values—their DACs only have small binary numbers; they contribute little to whether voter 75$i$ fires or not.

When the input pattern 11 presented to the circuit 1 is a "V", the voter will tend to fire. Two of its subcomponents ( and "/") are present; DACs connected to these two will inject large amounts of current into the voter 75$i$ causing it to fire and producing an output signal at 26$i$.

When the patterns 11 for "N" and "R" are presented to sensors 10, they will tend to prevent the voter 75$i$ from firing. Though these patterns have a subcomponent in common (the ) which injects current into voter 75$i$ fire, they will also have strong inhibitory signals from connections connected to 25$d$ and/or 25$n$ which drain current from voter 75$i$. Hence the voter 75$i$ tends to fire when patterns for the letter "V" are presented but not fire when patterns for "N" and "R" are presented. At this point the circuit 1 has "learned" information, namely that one of its subcircuits (75$i$) can distinguish one pattern from among several of the input patterns presented to it.

But now suppose the circuit 1 is to learn addition information—while still retaining the information it already has. Suppose a new input pattern 11 which represents the letter "A" is to be learned in addition to patterns for the letters "N", "R" and "V" to which it already responds. First the winning connections of the neuron circuits 77 are held fixed; the binary numbers in those DACs 70$a$ . . . 74$n$ which developed the highest binary numbers during previous learning experiences are no longer allowed to participate in the competition for highest B values. For example in the circuit 77$i$, the connections 25$a$, 25$b$ 25$d$, and 25$n$ are all winning connections. The binary numbers in the DACs associated with these inputs are held fixed. In living organisms, neuron connections appear to undergo a similar process which distinguishes "short-term memory" from "long-term memory". In long-term memory, protein synthesis in the synapses (connection points between neurons) occurs, making connections which last for years.

As the new pattern 11 representing the letter "A" is presented to the sensors 10, once again the inputs 25 to circuit 77$i$ operate through their respective DACs to add or drain current from the voter 75$i$ causing the circuit to either fire or not fire. Since the pattern "A" has both left and right diagonals, the circuit 77$i$ (whose output 26$i$ represents the letter "V") would tend to fire due to its excitory connections 25$a$ and 25$b$. Note that while the winning weights do not change, they still influence the voter to which they are attached when their respective inputs 25 fire. In addition to circuit 77$i$ firing, the circuit 77$j$ (whose output 26$j$ eventually will represent the letter "A") also fires. The DAC having output 26$j$ as an input 25$e$ to the voter 75$i$—a feedback connection from output to input on the same level circuit—will develop a high B value since the computer 9 will reward the "correct" response "A" rather than the incorrect response "V" (see discussion regarding the universal punish/reward signal). The DAC connected to input 25$e$ (and output 26$j$) will compete well with the other DACs and is likely to be rewarded by increasing its binary number (i.e., its connection weight). Since it is an inhibitory connection, the source associated with it is a negative one.

After presentation of the pattern representing "A", the weight associated with input 25$e$ will be increased. In addition, some other DAC having a positive source S (FIG. 6A) will also be rewarded in order to keep the circuit 77$i$ close to balance (for example, the input representing "NOT horizontal"). Notice however that the connections associated with inputs 25$a$, 25$b$, 25$d$ and 25$n$ (which already have large binary numbers in their DACs) do not participate in the competition for B values. Only the "losing connections" from previous learning experiences participate in the B value competition. As the pattern 11 representing "A" is presented again and again, the binary number stored in the DAC connected to input 25$e$ of circuit 77$i$ will grow larger and larger. Soon it, along with the other DACs with large binary numbers (those associated with inputs 25$a$, 25$b$, positive 25$d$, 25$n$, negative), will dominate the behavior of the voter 77$i$. The result is that information has been added to the circuit 1 by showing it only the new pattern 11 representing the letter "A". The learning of the new pattern occurred after other patterns had been learned, not in conjunction with the learning of the other patterns. In particular, the neuron circuit 77$i$ which responds to the input pattern "V" by firing, learned not to fire when the pattern "A" is presented—despite both patterns sharing two important subcomponents. Note too that balance is important in allowing the circuit 1 to add new information by way of modifying the weights of its connections. For example, if the circuit 77$i$ had more large positive weights than negative ones, the addition of a large negative weight from the input 25$e$ wouldn't be enough to prevent the output 26$i$ from firing when the "A" pattern is presented.

ADDENDUM AND BALANCE FLOW CHART

Figure 21:
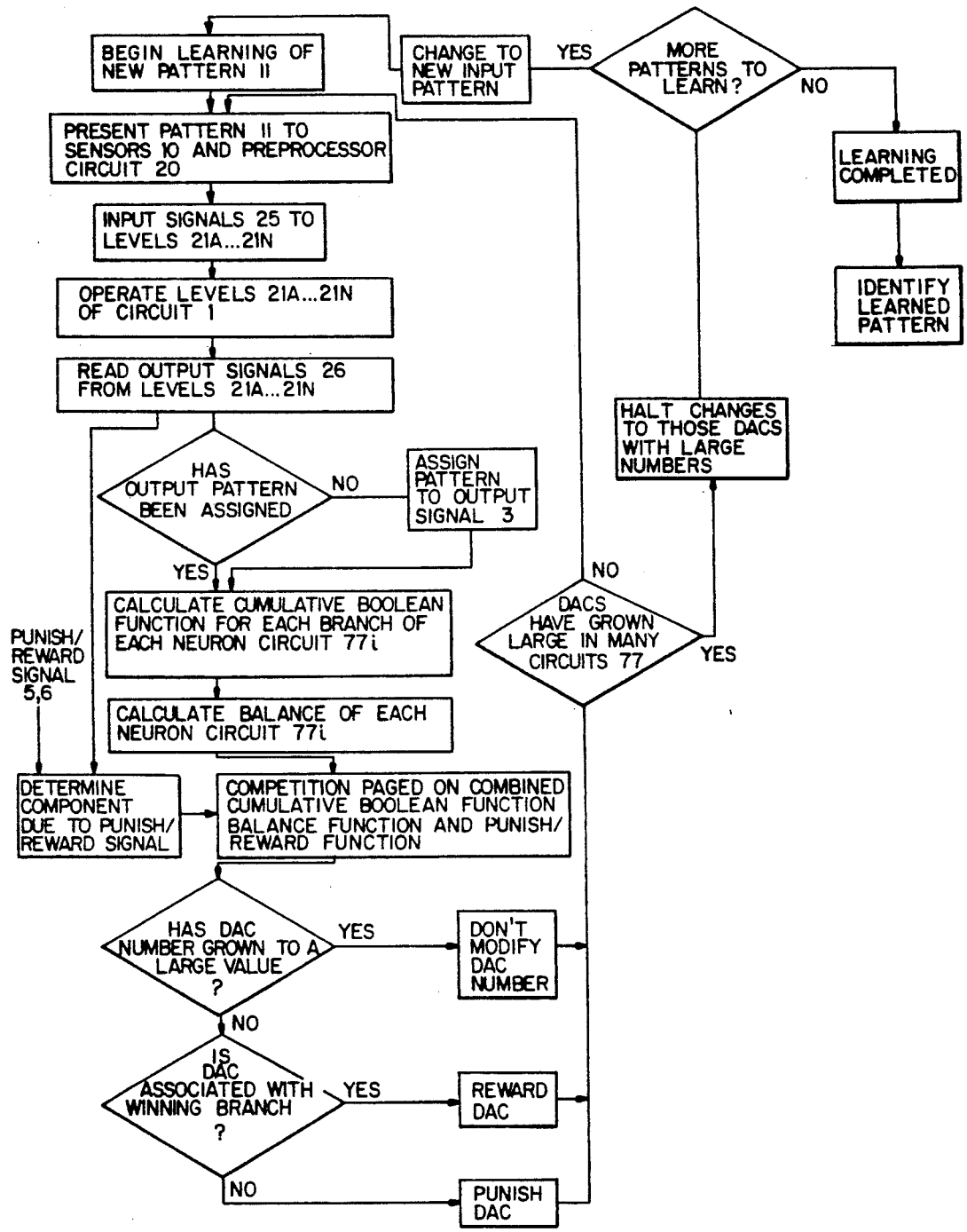
FIG. 21 is a flow chart incorporating balance and addendum features for the computer of FIG. 1.

FIG. 21 shows how balance and addendum are implemented in flow chart fashion for one variation of the present invention in learning several new patterns. The process begins with the circuit 1 learning the first of several patterns 11. The pattern is presented to the sensors 10 and through interaction with a preprocessor circuit 20. The preprocessor circuit sends signals 25 to the level circuits 21$a$ . . . 21N. The level circuits 21 operate on these input signals through the interaction of the weights (numbers stored in their DACs) on the current flow into the voters 75. The result is output signals 26 from each of the level circuits 21A . . . 21N. Some of the output signals will be those for the level 21N—the output signals 3 of the self-organizing circuit 1. If these outputs are to be "named", the output pattern will be assigned to one of the output signals 3. Next the cumulative Boolean function is calculated for each connection of each neuron circuit 77$i$ (representing any of the circuits 77 of the level circuit 21A ... 21N. A connection of a circuit 77$i$ is a DAC connected to its voter 75$i$. The balance function is calculated next for each neuron circuit 77$i$. Meanwhile the punish/reward function is calculated based on the punish/reward signal 5,6 (sent to all circuits 77) and on the output signals 26 from the level circuits 21A ... 21N. The cumulative Boolean function is combined with the balance function and the punish/reward function to give a composite value for which the connections of a circuit 77$i$ compete. If a DAC of the circuit 77$i$ is associated with a winning connection, then the number stored in the DAC is incremented; if the DAC is associated with a losing connection, it's number is decremented. If the number stored in the DAC has already grown to a large value (after repeated winning the connection competition in previous presentations of the pattern) then no changes are made to that DAC's number.

The process—presentation of the pattern 11, operation of the level circuits, calculation of the composite value, competition for the highest values, and modification of the connections based on the competition—is repeated until many of the circuits 77 have numbers stored in their DACs which have grown large. When this occurs the teaching for that pattern 11 is completed. Those DACs which have large numbers in them are frozen; no further changes are made to the numbers stored in these DACs. The circuit may now be used to recognize the pattern which it learned: the output 3 will respond when that pattern 11 is presented to the sensors 10.

If other patterns are to be learned (either before or after some patterns 11 have been recognized) then the process is repeated. A new pattern 11 is presented to the sensors 10 and the level circuits operate on the inputs 25 causing voters 75 to fire giving outputs 26. If the new pattern has not been assigned an output signal 3 one is assigned. Calculations are made on each DAC of each neuron circuit 77$i$ for a composite value based on the cumulative Boolean function, the node balance and the punish/reward signal (which operates if the output 3 or intermediate outputs 26 fire inappropriately). However only those DACs of each circuit 77 which did not have high numbers stored (and were identified in earlier learning to have their respective DAC weights frozen) compete for the highest composite values. The best competitors among these are rewarded by increasing the numbers stored in their DACs. When any of the competing DAC numbers in a neuron circuit 77 grows large through repeated winning of the competition, that DAC is prevented from growing larger.

When many of the neuron circuits 77 all have DACs with large numbers stored, the DACs with the large weights have no further changes made to their weights—learning of the newest pattern ceases. Now the circuit can be used for pattern identification: a pattern 11 presented to the sensors 10 will cause an output signal 3 which corresponds to that pattern to fire. During such "recognizing" operation, the circuit 1 does not require the computer 9 to operate; the computer 9 is only required when new patterns are being learned by the circuit 1. Alternately, the circuit 1 can be trained to recognize still other patterns 11 by repeating the steps above.

BALANCE AND ADDENDUM FUNCTIONS

EXTERNAL

The balance and addendum functions, like the Boolean logic and competition function described earlier, is how the network of neuron circuits 77 learn patterns 11 presented via sensors 10 and preprocessing circuit 20. These functions only determine how the weights (the numbers stored in the up-down counters 67 of the DACs 70$a$ ... 74$n$ of the level circuits 21A ... 21N) are modified during self-organizing operation of the circuit 1. As such, the functions can be implemented completely by the external computer 9, as discussed with respect to the Boolean logic and competition function. The computer 9 serves to apply modifying inputs to each subcircuit or level in the level circuits 21 in FIG. 2, which modifying inputs serve to correct errors in the output signals 26$a$ ... 26$n$ of the level circuits 21 (or output signals 3 in FIG. 1) occasioned by accurate or inaccurate analysis of the input signals 25$a$ ... 25$n$ of the level circuits 21 (or input signals 2 in FIG. 1). As noted previously, the use of the teaching computer 9 is merely one of convenience; a human operator could also modify the inputs (i.e., change the values of the numbers stored in the DACs) to the level circuits 21 in FIG. 2, so long as the rules described for balance and addendum were used to insure efficient self organizing.

INTERNAL

Figure 22A:
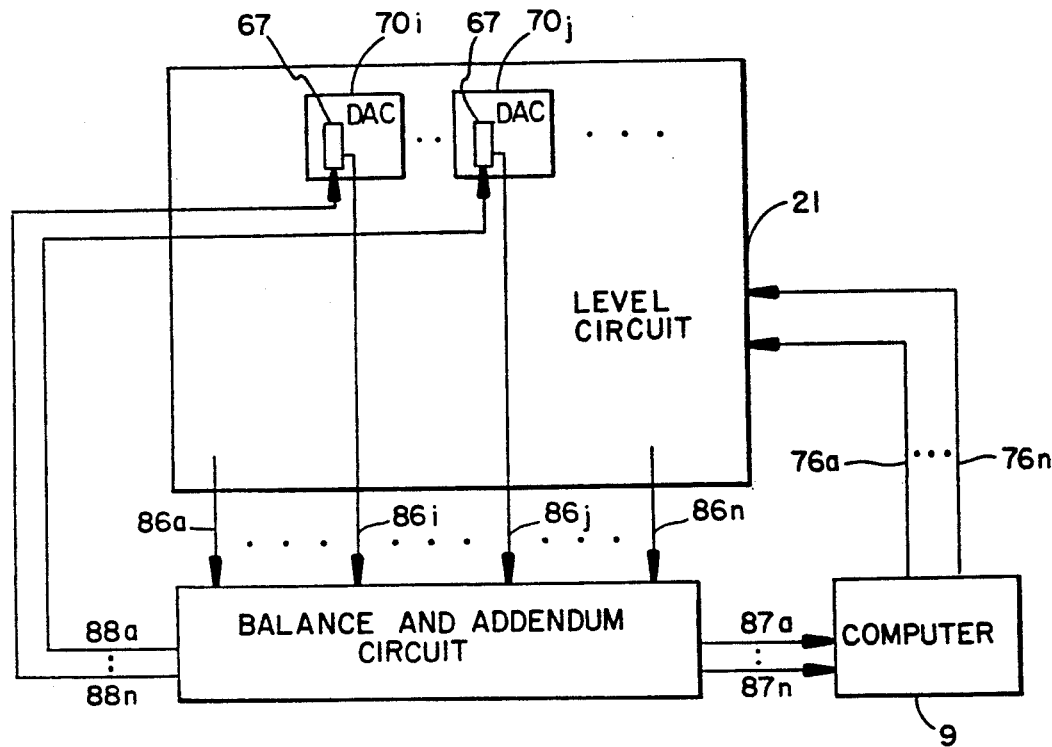
FIG. 22A is a diagrammatic representation of the self-organizing circuit with balance and addendum functions implemented in hardware.

Separate circuits may replace the some of function of the computer 9 for modifying inputs to the level circuits 21. FIG. 20A shows how the Boolean logic and competition functions may be incorporated as a separate circuit rather than as part of the function of the computer 9; such parallel processing can speed the learning of the circuit 1 when it contains many hundreds of neuron circuits 77. Similar circuit architecture improves the speed of the balance and addendum function as well. FIG. 22A shows a specialized circuit 85 connected to the up-down counters 67 of the DACs 70$a$ ... 74$n$ of the level circuits 21. Connections 86 access the values of the binary numbers stored there. The balance circuit 85 makes summation calculations (such as SUMJ(Nj), SUMJ(Nj+) or SUMJ(Nj−)) based on these values to determine the balance of each of the neuron circuits 77. The balance information is fed to the computer 9 via links 87$a$ ... circuits 21 to alter the numbers stored in the DACs based on the balance values, the cumulative Boolean function and the universal punish/reward signal. Other specialized circuits within circuit 85 perform the addendum function by preventing changes to the numbers stored in DACs 70$a$ ... 73$n$. Whenever these numbers grow very large they are prevented from changing further by signaling the appropriate DAC via connections 88.

LOCAL

Figure 22B:
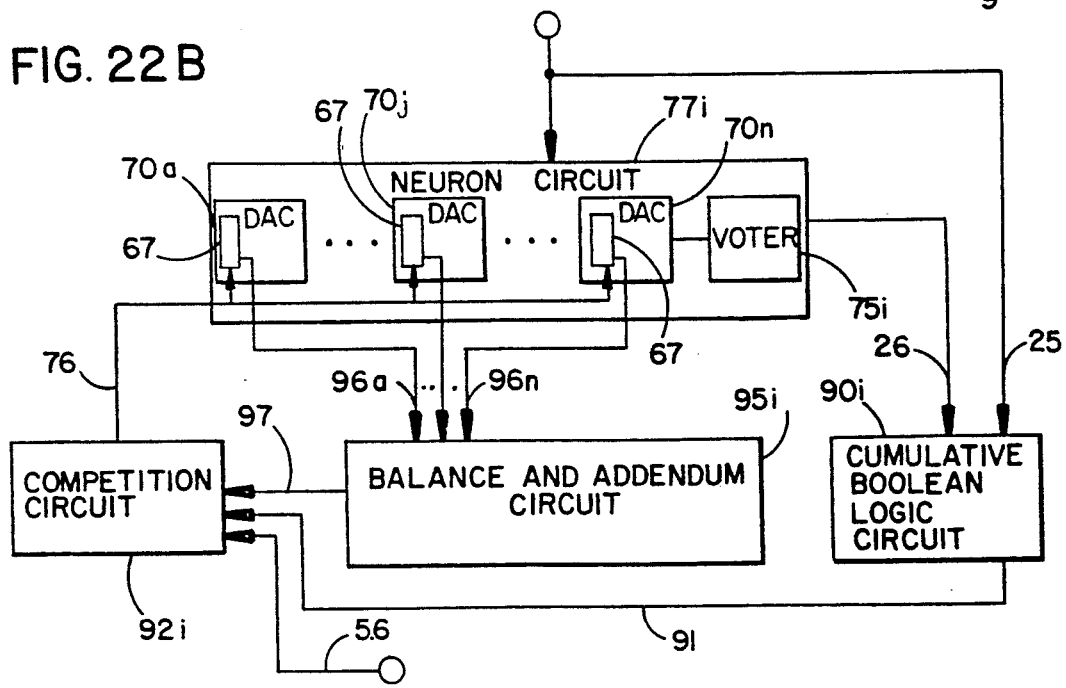
FIG. 22B shows how the same hardware logic functions are implemented at the subcircuit level of the self-organizing circuit.

FIG. 20B shows how the Boolean logic and competition functions are implemented "locally": circuits 90 and 92 associated with each neuron circuit 77 determine the Boolean logic correlations between inputs 25 and outputs 26 and competition for those correlations. The balance and the addendum functions can also be determined locally. Consider the circuit 95 in FIG. 22B which shows one way in which a local balance circuit for a neuron circuit 77$i$, such as circuit 77$a$ in FIG. 7A, can be implemented. A balance circuit 95$i$ is associated with each neuron circuit 77$i$ of the level circuits 21A ..

. 21N. Connections 96a ... 96n connect the up-down counters 67 of the DACs 70a ... 73n (which connect to the voter 75i of that circuit 77i) and access the values of the binary numbers stored there.

Summation calculations (such as SUMJ(Nj), SUMJ(Nj+) or SUMJ(Nj−)) based on the DACs' binary numbers determine the balance of the neuron circuit 77i. The balance values (via connections 97), the cumulative Boolean values (via connections 91) and the universal punish/reward signal (via connection 5,6) are combined in the competition circuit 92i where they compete to determine which of the DACs 70a ... 70n connected to the voter 75i will be rewarded or punished. Addendum circuits associated with each circuit 95i also are connected to the up-down counters of the DACs as above. These circuits sense when a weight (i.e., DAC-stored number) has grown very large. They signal the competition circuit 92i to a too-large weight from being altered thereafter. The large numbers can represent either negative or positive weights depending on the sign of the source (such as source S in FIG. 6A) to which they are connected.

CHANGE SENSITIVE FUNCTIONS

An important function of a self-organizing system is to be sensitive to change. Knowing when and where an input pattern 11 changes allows a self-organizing circuit 1 to organize more efficiently. Changes—either to static or time-varying patterns—which occur at any of the inputs 25 to any of the level circuits 21 can be used to modify the connection weights (the numbers stored in the up-down counters 67) between the inputs 25 and the outputs 26 of a neuron circuit 77. The sensitivity to change can be accomplished in two ways: 1) the competition criterion can be biased to be sensitive to change and 2) the subcircuits themselves can be modified to be sensitive to change.

CHANGE-SENSITIVE COMPETITION

The competition criterion for modifying the connection weights is based on a cumulative Boolean function between the output 26 of a voter circuit 77 and its input 25 (including past values of the input 25). The Boolean function can be chosen such that its accumulation will allow it to compete well toward increasing its connection strength. For example, in the case discussed earlier where a letter "A" is to be distinguished from the letter "V", the input 25c (FIG. 7A) specifying the horizontal is the one which changes. The other two inputs 25a and 25b remain the same for either letter "A" or letter "V" input as pattern 11 (FIG. 11); they do not change and should fare less well in the competition for increased connection strength based on change sensitivity.

To understand the process, consider a simple Boolean function: $K1*AND(X,Y)+K2*ABS(IF(Y)-IF(YT))$ The first term, $K1*AND(X,Y)$, is as discussed previously with regard to the competition for cumulative Boolean function; the second term $K2*ABS(IF(Y)-IF(YT))$ is the change-sensitive term. K1 and K2 are constants which bias the relative amount of change sensitivity.

Applying this simple function to the example of recognizing a letter "A" from a letter "V", assume that letters "A" and "V" are input in random sequence repeatedly as the input pattern 11. As before, when an output 26 fires at the same time as either of the important subcomponents " " 25a or "/" 25b (FIG. 7A), the Boolean AND(X,Y) function will begin to accumulate.

The second term contributes nothing to the Boolean function that is accumulating for the inputs 25a and 25b—when either the "A" or the "V" are presented these inputs do not change.

However, the situation is different for the input 25c. Of course, the first term will contribute to the cumulative Boolean function B when the "A" is presented (as before), but the second term will also contribute to B. Each time the input pattern changes from an "A" to a "V" (or back again), the second term will contribute. IF(Y) will be unity whenever the horizontal appears in the input pattern 11, and IF(YT) will be one at some previous time. In a digital implementation, the "previous time" is typically one or more clock cycles; the patterns 11 are typically presented for many clock cycles. Hence whenever the pattern the value of IF(Y) differs from that of IF(YT), the second term will be non-zero and will add to the accumulation of Boolean function. The two values differ only when the pattern changes. As the patterns switch back and forth between the two patterns, the input 25c (depending on the choice of constants K1, K2 and when it is measured) will compete well with other inputs which don't change. The result is that connection strength of input 25c is likely to be increased—the horizontal is an important component in distinguishing an "A" from a "V". Note that other components such as the left and right slants (inputs 25a and 25b) are also likely to have their connection strengths increased by competing well. Their cumulative Boolean function B is based more on the first term than the second since they do not change.

CHANGE-SENSITIVE CIRCUITS

Figure 23:
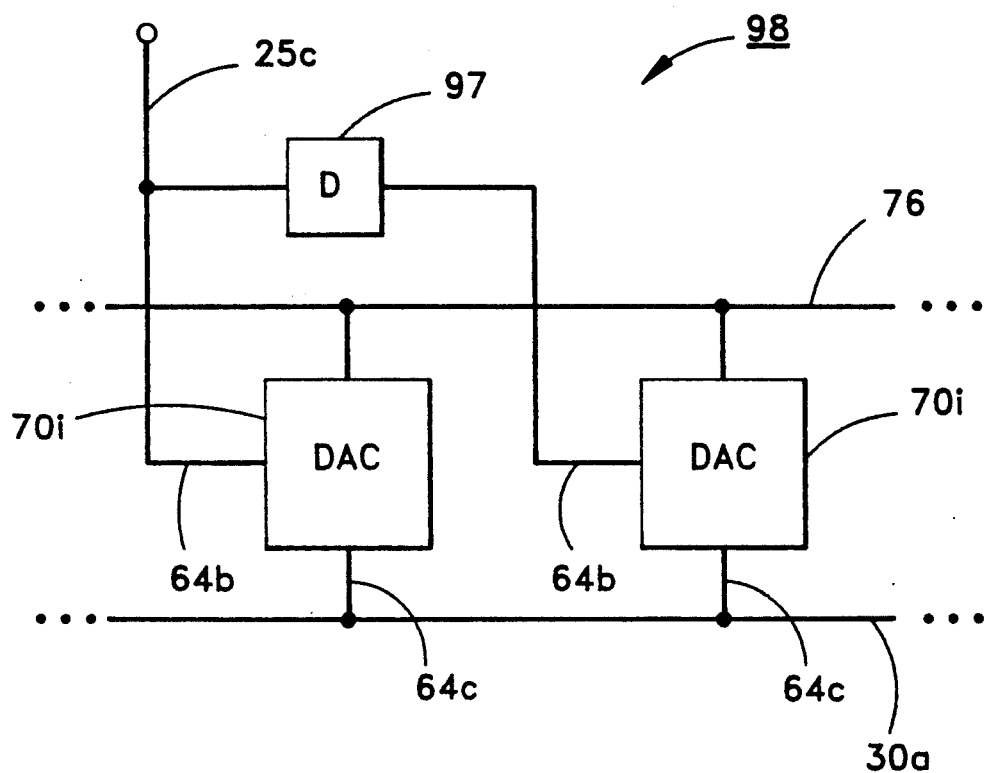
FIG. 23 is a diagrammatic representation of a modification of the circuit in FIG. 7A showing how change-sensitivity can be implemented.

Not only does the choice of Boolean function make a self-organizing circuit 1 more change sensitive, but so do changes in its circuitry. FIG. 23 shows a modification of a portion of the circuit shown in FIG. 7A. This circuit is presented only to illustrate how the circuit 7A can be made change-sensitive with only minor changes; in general, the components are combined to make a much simpler circuit. Two DACs 70i and 70i' are connected to the same input signal 25i via connections 64b (see FIG. 6A). They add or drain curent via connections 64c into the same connection 30a which is an input to a voting circuit 32. Both DACs, in the simplest implementation, are also both connected by the same punish/reward bus 76 such that both increase their connection strength (the binary numbers in their counters 67) by the same amount.

The two DACs 70i and 70i' differ in that they have opposite signs of their voltage sources (see source S, FIG. 6A). If one DAC has a positive source then the other has a negative source. They also differ by the addition of a delay 97 through which the input signal 25i passes before going to DAC 70i'. The delay is identical to the internal delay 68b of the DAC; it is called out specifically to emphasize its importance to the operation of the circuit. In a digital implementation of the circuit 1, the delay 97 is typically one or more clock cycles; in analog circuits, the delay's time constant is usually longer than the time constant of the voter 32 (FIG. 3). The internal delay 68b of the DAC 70i will be much less than that of the delay 97 for proper functioning of the circuit.

Again assume that the patterns 11 are the letters "A" and "V" randomly presented to circuit 1. Consider a circuit 98 whose input is the horizontal signal 25c (see FIG. 7A)—it only fires when the letter "A" is presented. Let the DAC 70i have a positive voltage source (it adds current to the associated voter 32) and the DAC 70i' have a negative voltage source (it drains current from the voter). Suppose that the letter "V" had been presented and the pattern 11 was then switched to the letter "A". When the signal 25c first fires, the DAC 70i adds current to the connection 30a while the DAC 70i' has no effect—its input is delayed by delay 97. The net tendency is to make the voter 32 more likely to fire. A short time later when the delay of time delay 97 has passed, the current added by DAC 70i is the same as that drained by DAC 70i' (since they both have the same binary numbers in their counters 67). There is no net current added to the connection 32a by the input 25c, so input 25c has no influence on the firing of voter 32.

Let the Boolean function which accumulates be the simple function AND(X,Y) as discussed previously. For several clock cycles after the pattern 11 changes from "V" to "A" the input 25c will have positive values of the Boolean function. The B value will accumulate after many presentations of the two patterns. Thus the B value of input 25c competes well with the other connections and is likely to have its connection strength increased. Certainly a distinguishing feature of the letter "A" is not only that the horizontal is present, but that its first appearance is important. Moreover, when the letter "A" is removed, the horizontal input 25c ceases and the circuit 97 tends to prevent the voter 32 associated with the letter "A" from firing (current is drained from the voter when DAC 70i' stays on even after DAC70i stops adding current).

Note that change sensitive circuits such as shown in FIG. 23 are added to circuit 7A in addition to DACs such as 70a . . . 73n. Hence an input 25c would likely feed into a DAC 70c as shown in FIG. 7A and also feed into a circuit 97 sensitive to changes in the signal 25c. Also note that because a circuit 98 is sensitive to change, it is also sensitive to noise. A random firing of the input 25i would cause noisy fluctuations in the voter connection 30a. Usually the delay 97 is several clock cycles to prevent the circuit from being too noise sensitive.

The change sensitive circuit 98 is one of many such circuits. The important characteristic of a change sensitive circuit is that an input signal 25i arrives at a voter via two paths, one which drains current and one which adds current. If one signal is delayed from the other, the circuit becomes change sensitive. Indeed, multi-level circuits (such as those described on p. 22 of U.S. Pat. No. 4,479,241 by the present inventor) spontaneously form change sensitive paths through subcircuits when delays such as delay 68b are included. Similarly, when both the signal and its negation (for example, "horizontal" and "not horizontal") have different internal delays 68b are both input to the same voter circuit as previously discussed, conditions are ripe for spontaneously forming change sensitive circuits. The methods now discussed for making change-sensitive circuits by either proper choice of the Boolean function which accumulates or by circuit modification improves the sensitivity to respond to changes in the input patterns, either static or time-varying.

BURST FILTERS

In the change sensitive circuits described above, time delays 68b in the DAC 60 (FIG. 6A and 6B), were used to sensitize the self-organizing circuit 1 to changes of the signals relayed between its neuron subcircuits 77. The delays 68b can also perform another important function of self-organizing circuits: burst filters. Under some conditions, the subcircuits 77 make connections (by increasing the value of the binary number stored in their DAC counters 67, FIG. 6A) through random firing of other subscripts 77. In general, the subcircuits 77 should not respond to random firings of other subcircuits; they should respond by making connections to relatively consistent firings (or non-firings) of other subcircuits 77.

Not only can a neuron subcircuit 77 make connections to other inconsistently firing subcircuits, but they can also be turned on or off by inconsistently firing subcircuits 77. The delay filter 52 (FIG. 5C) is often sufficient at preventing subcircuits 77 from firing due to random inputs 25: random firings of an input 25 are attenuated by its associated delay filter 52. Only consistently firing inputs 25 (which fire many times in a row) can penetrate the delay filter 52. Note, however, that the simple first order filter 52 (FIG. 5C) is sometimes insufficient at preventing randomly firing inputs 25 from triggering subcircuits 77.

Hence, burst filters 300 are valuable in two different applications in self-organizing circuits 1. First, they are used in the learning mode, where the connections between randomly firing subcircuits 77 are prevented. Second, they are used in the recognition mode to better attenuate randomly firing subcircuits 77. Burst filters require bursts of firings from a subcircuit 77 before signals are acted on—either by the learning (weight modification) subcircuits or by other subcircuits 77 during the recognition mode. In either application, the filter may be implemented as either analog circuitry or as digital algorithms, depending on whether the learning mode and the recognition mode have been implemented in hardware or as software. The preferred embodiment is for the learning (modifying the binary number stored in DAC counters 67) to be implemented by a computer such as external source 9, while the recognition (determining the state of outputs 26) to be implemented in hardware. However, a person skilled in the art could envision alternative embodiments.

BURST CIRCUITS

Figure 24A:
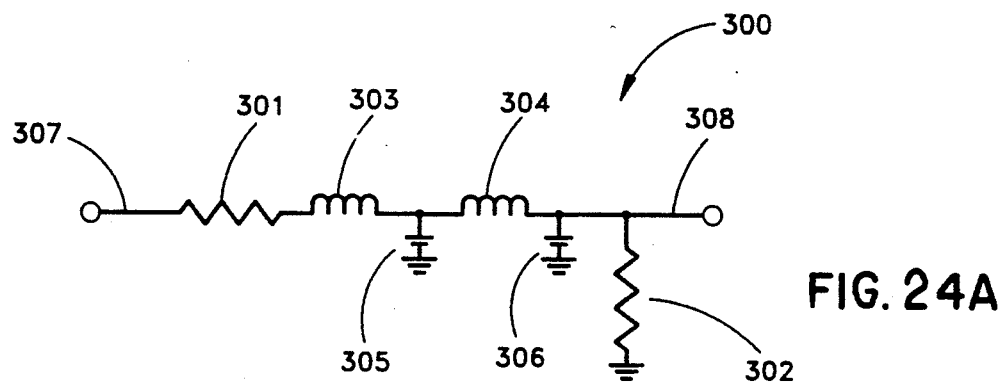
FIG. 24A is a diagrammatic representation of an analog burst filter whose shorthand notation is shown in FIG. 24B.
Figure 24B:
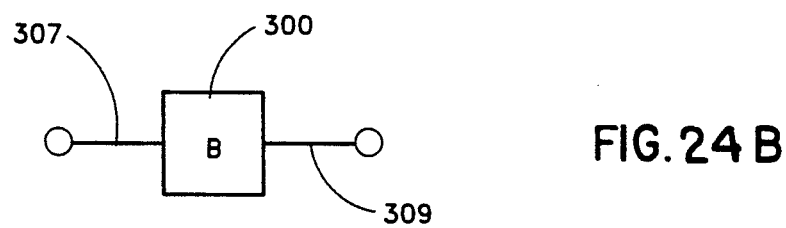

An analog burst filter is simply a higher order filter 52 (FIG. 5E) than the simple first order filter shown in FIG. 5C. Burst filters belong to a class of filters called low-pass filters: they pass lower frequency information but attenuate higher frequency information. Filters with a sharp cutoff between the low frequencies passed and the high frequencies attenuated are the preferred embodiment of burst filters. Shown in FIG. 24A is a passive low-pass filter 300 with sharp cutoff; resistors 301, 302 inductors 303, 304 and capacitors 305, 306 are sized to allow a few pulses from a firing subcircuit to be attenuated, while a burst of many firings in succession passes through the filter. A burst filter may also be produced using active elements such as op-amps. FIG. 24B shows the shorthand symbol for the burst filter 300 with connection 307 as input and connection 308 as output. Note that dendritic spines of biological neurons are thought to serve as burst filters in living organisms.

Burst filters 300 used to prevent the propagation of random firings of subcircuits 77 replace the simple first order filter 52 (FIG. 5C) in the generalized delay 68b (FIG. 6A, FIG. 13) of the DAC 60 (FIG. 6B). When used in DAC 70i (representing one of the DACs 70a . .

. 74n which influences subcircuit 77i, one of the neuron circuits 77a ... 77n, FIG. 7A), the input 25i (one among the inputs 25a ... 25n) is burst filtered before it affects the outcome of the voting circuit 75i. Only bursts of firings at the input 25i allow the output 26i (the output of subcircuit 77i) to change. Similarly, if an input 25i has been firing consistently for some time, any short duration of non-firing will not affect that DAC's input to the voting circuit 75i—it will continue to respond as if the input 25i had fired consistently.

To prevent randomly firing input 25i from influencing the learning mode of circuit 77i, burst filters 300 incorporated into the DACs 70i ... 74i also assure that the Boolean logic circuitry 83 and 90 (FIG. 20A and 20B) only respond to bursts of firing or non-firing inputs 25i. Alternatively, burst filters 300 can be added to the Boolean logic circuits 83 and 90 so that accumulations of the Boolean function are based on consistent firings and not random ones.

Burst filters can be added in software as well as in hardware for those embodiments where the DACs 70i ... 74i are rewarded or punished by a computer rather than by specialized circuitry as in FIG. 20A and 20B. Burst filter algorithms (see Discrete Time Systems, Ch. 2,3, Control and Dynamic Systems, Takahashi, Auslander and Rabins, Addision-Wesley, Reading, Mass. 1970) are generally of the form:

$$X(k+1) = P\,X(k) + Q\,u(k)$$

where:
- $X(k)$ are the values of an $1 \times N$ discrete-time state vector at various discrete time steps k; one of the states is chosen to be the output of the algorithm
- $X(k+1)$ are the values of the same state vector one time step later than k
- P is an $N \times N$ dimension state matrix with matrix values chosen to pass primarily frequencies of $u(k)$ below a certain value
- Q is an $1 \times N$ input vector
- $u(k)$ is the scalar input at time steps k
- N is the order of the state system and determines how sharply higher frequencies are rejected When burst filters are implemented as a learning algorithm, the input $u(k)$ to the burst filter is either the B value (cumulative Boolean function) or the Bm value (modified cumulative Boolean function) discussed earlier. The output of the algorithm X1 (one of the states of the vector X) becomes the filtered output. The burst filtered value X1 then replaces all uses of B or Bm in algorithms of the computer 9 which modify the binary number stored in DACs 67.

Figure 14:
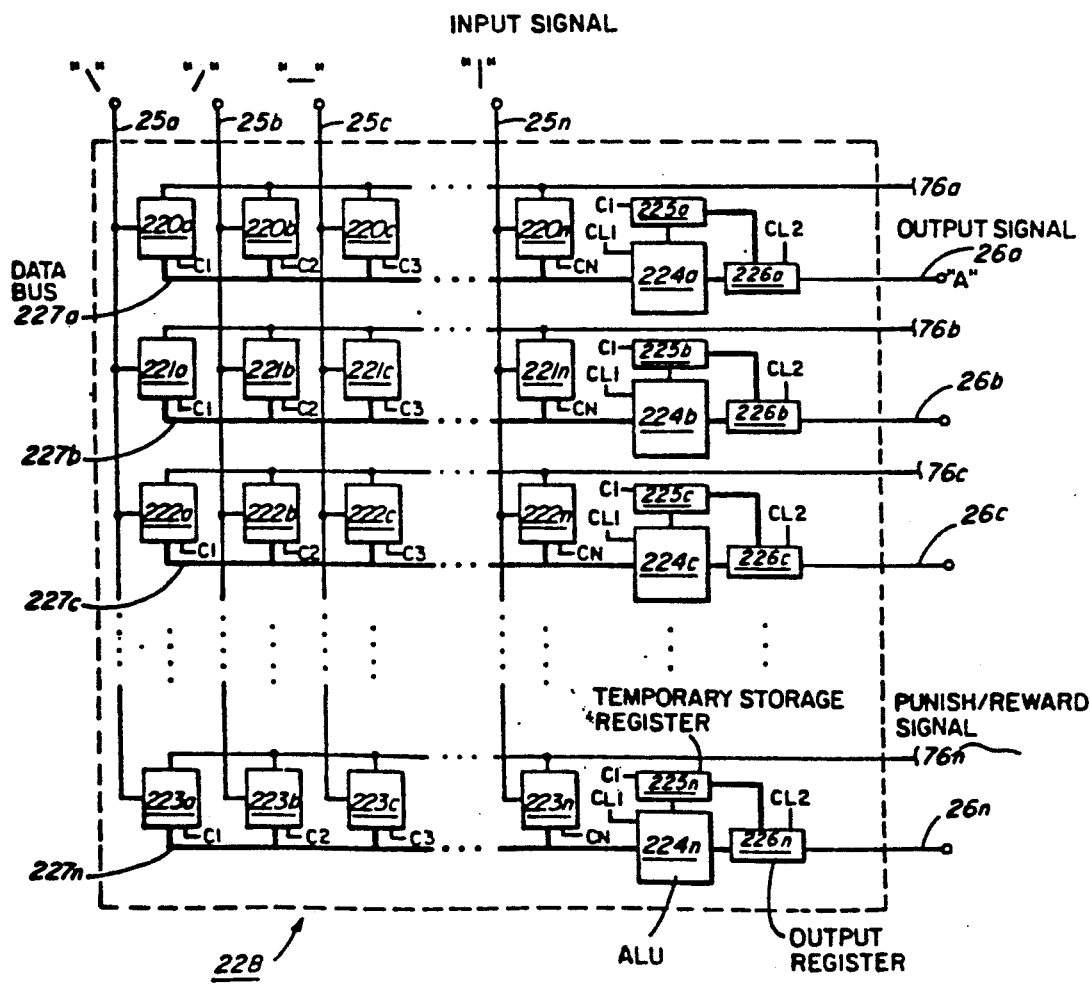
FIGS. 14 and 15 are diagrammatic representations of a modification of the circuit in FIG. 7A.
Figure 15:
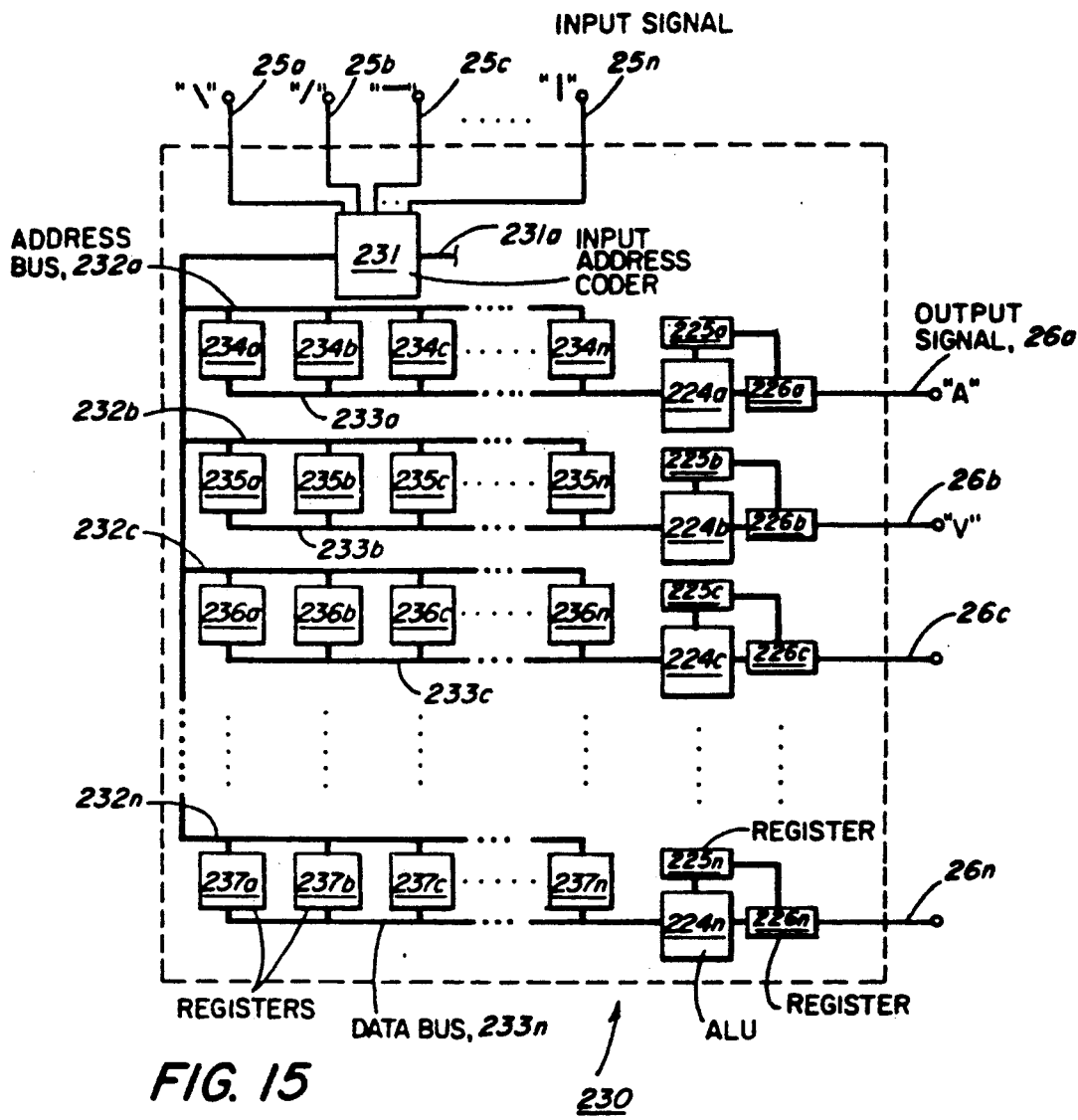
Figure 17:
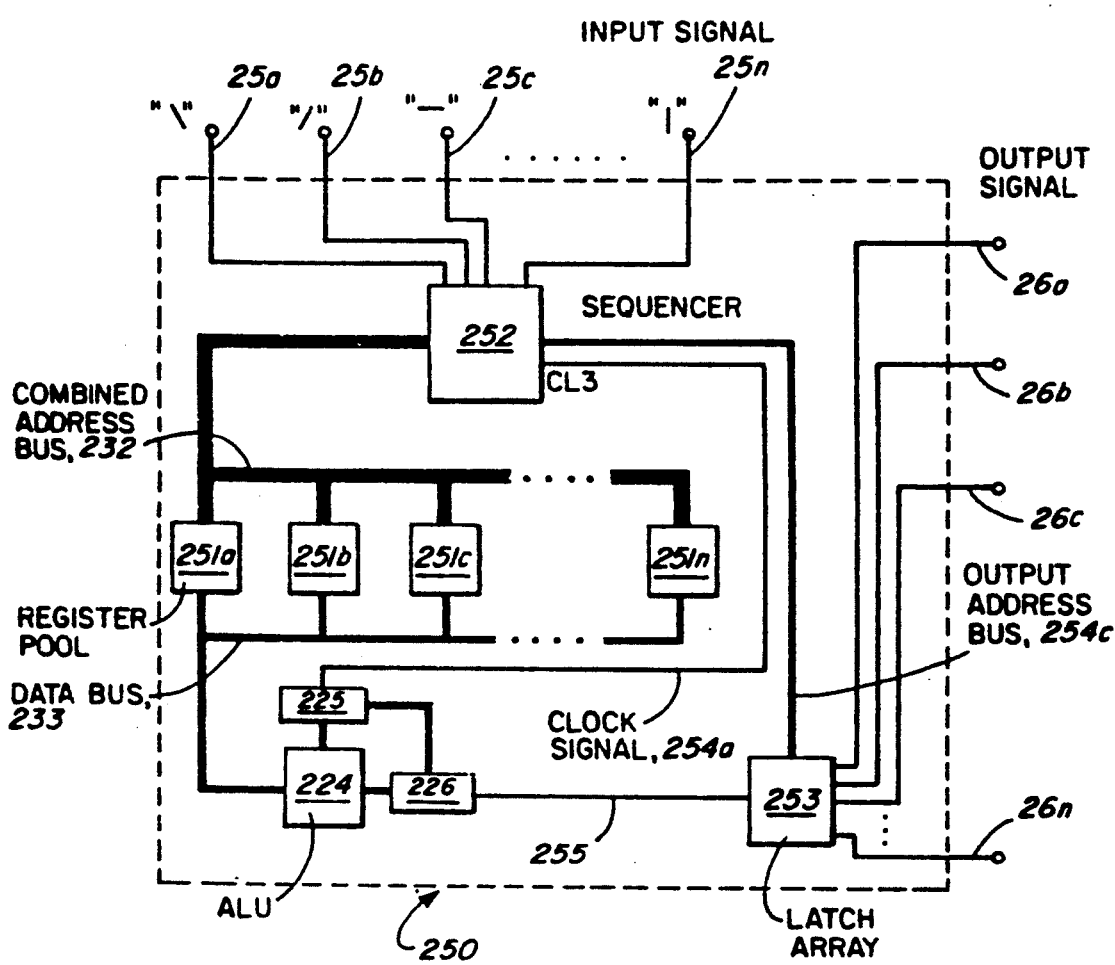
FIG. 17 shows diagrammatically a modification of the circuit in FIG. 15.

When burst filters are implemented as a recognition algorithm in Digital Self-Organizing Systems (as will be discussed later), the input to the filter algorithm $u(k)$ is the input 25a ... 25n to the registers 220 (FIG. 14). The output X1 of the algorithm replaces all uses of the inputs to registers 220 in forming the outputs 26a ... 26n by ALU 224a ... 224n. Similar burst filters can be implemented in other digital embodiments such as shown in FIG. 15 and FIG. 17 by a person skilled in the art.

IMPROVED BIAS

Improved self-organizing results when threshold DACs (see Threshold Learning) are used to bias a neuron circuit 77. In the preferred embodiment, bias is implemented through the threshold DACs 74a ... 74n. These threshold DACs are specialized only in that they are of the positive/negative variety (see Positive/negative Weights) rather than being of the single source variety shown in FIG. 6A. The purpose of the bias is to change the characteristic behavior of the neuron circuits 77 from an OR-like nature to an AND-like nature. As discussed previously, OR and AND gates are two of the 2-input Boolean functions. The terms "OR-like" and "AND-like" used here refer to circuits 77 which have two or more inputs 25, yet behave in a similar manner to their respective 2-input Boolean gates.

Refer now to the example discussed in relation to Equation 2, where the input pattern 11 representing the letter "A" is distinguished from the pattern representing the letter "V". The bias on threshold DAC 74a is a high negative one, acting to prevent the circuit 77a from firing. As shown in the axample, a high negative bias on a neuron circuit 77 prevents the circuit from firing unless two or more of the inputs 25a ... 25n fire; the circuit becomes AND-like because a 2-input AND function only fires if both of its inputs fire. Similarly, a low negative bias lets the circuit 77 fire if at least one of its inputs fire; the circuit becomes OR-like because a 2-input OR function fires if any of its inputs fire.

Note that bias can also be positive. For example, suppose two input connections 25a and 25b (FIG. 7A) of a circuit 77i have negative weights (the supply voltage of their positive/negative DACs is negative) and a high positive bias (the supply to threshold DAC 74i is positive). With no input signal 25a or 25b, the positive bias assures the voter 75i fires giving an output 26i. Similarly, if only one of the inputs 25a or 25b fire, the circuit 77i will continue to fire: the negative contribution of the input signal cannot overcome the positive bias. However, if both input signals 25a and 25b fire, the voltage to the voter 75i is drawn down preventing an output signal 26i. A high positive bias acts NAND-like since a 2-input Boolean NAND function acts similarly: there's always an output except when both inputs fire.

In contrast, a low positive bias acts NOR-like. The NOR function has no output except when no inputs act on it. Again suppose the inputs 25a and 25b have negative weights. If either input 25a or 25b or if both inputs 25a and 25b fire, the output 26i will not fire. The positive bias is insufficient to overcome the current drain to the voter 75i by the negative-supply DACs associated with inputs 25a and 25b. Only if neither input fires will the small positive bias be large enough to make the output 26i fire.

Bias comes about in two ways. First, neuron circuits 77 have an inherent bias which makes an individual circuit behave in an OR-like, NOR-like, AND-like or NAND-like manner. Second, the bias can be modified during learning (i.e., in conjunction with learn signal 8) of the self-organizing system 1 (FIG. 1). The following discussion on bias weighting applies to the preferred embodiment shown in FIG. 7A, which uses a hardware means to feed current to produce the output signals 26 of the subcircuits 77. However, the same arguments apply to digital embodiments of circuit 1 such as described in reference to FIG. 14, 15, and 17.

INHERENT BIAS

In inherent bias, neuron circuits 77 are randomly assigned bias values having both positive and negative sources. These values range from those with low values giving OR-like and NOR-like character to those with high values giving AND-like and NAND-like character. Depending on the mix of these inherent OR/NOR values to that of AND/NAND values, the capability of the self-organizing system 101 is altered.

For example, suppose the circuit 1 (FIG.2) was to be made sensitive to a small change to its input pattern 11: a change to one of the input signals 2 alters the output signal. Assume the circuit 1 had learned some set of inputs 2 (i.e., input pattern 11); when that set of inputs 2 fired, the circuit 1 responded with an output signal $3i$ during the recognition mode of operation. Now consider the case where the mix of AND/NAND to OR/NOR is 100%: the bias values are all high. Each of the circuits 77 which make up the level circuits 21A . . . 21N behave like AND/NAND functions. The inputs 25 to each circuit 77 of level circuit 21A must all be the correct pattern 11 or that circuit will change state (not fire if it is AND-like, fire if it is NAND-like).

Now, not every circuit 77 in the first level circuit 21A will change state when one of its inputs 25 from the preprocessor circuit 20 changes because each circuit 77 is usually not connected to every input 25 during the learn procedure. But those circuits 77 of level 21A that are connected to an input 25 which changes, do change state. Changes to their output 26, in turn, are the inputs 25 to the next higher level circuit 21B. Any change to the output of circuits 77 in level 21B will affect still higher level circuits.

When the circuits 77 are biased to be AND/NAND-like, even a small change of the input pattern set 11 propagates to higher and higher level circuits 21A . . . 21N until eventually the output signals 3 are affected. This cascading effect acts like an avalanche—a small change in pattern 11 effects more and more of the inputs 25 to each successive higher level; more an more of the circuits 77 are affected.

By contrast, consider tha same network of circuits 77 but whose bias values are all low: a zero percent mix of AND/NAND to OR/NOR. Given the same one-bit input pattern 11 change (one of the input signals 2 to the preprocessor circuit 20 changes), level one 21A circuits 77 are unlikely to change since for low bias a change to a single input 25 is not sufficient to change the state of the output 26. If a change did occur in level 21A, the change would not likely affect the output of circuits 77 in level 21B for the same reason. Small changes to the input pattern 11 for OR/NOR-like circuits 77 do not propagate easily to higher level circuits as do the AND/NAND-like circuits. For circuits 1 where there are many levels 21A . . . 21N, changes to OR/NOR-like circuits 77 seldom affect the output signals 3 unless they involve many changes to the set of input signals 2.

Here then is a method by which the self-organizing circuit 1 can discriminate between small changes and large changes to the input pattern 11. If the circuit 1 is to be sensitive to small changes, then the bias values of its circuits 77 are chosen to have high values such that small changes propagate readily to the output signals 3. If the circuit is to be made insensitive to small changes, low bias values are chosen. Most information which a circuit 1 is required to learn needs both a "detail" sensitivity (the ability to detect small changes in the input set 2) and "global" sensitivity (the ability to be insensitive to small changes to the input set 2).

In general, the preferred embodiment is for circuits 77 to have a range of bias values that include both high bias AND/NAND-like circuits as well as low bias OR/NOR-like circuits. Depending on the mix of low bias circuits 77 and high bias circuits 77, the self-organizing circuit 1 becomes detail sensitive (mostly high bias circuits 77) or becomes global sensitive (mostly low bias circuits 77). An even mix of both high bias and low bias circuit 77 gives the output signal 3 of the circuit 1 the capability of responding both to small changes of the input pattern 11 as well as to large changes.

BIAS MODIFICATION

In addition to inherent bias, the bias of neuron circuits 77 can be modified during learning. The bias can be changed based on three different types of signals: the state of the circuit and its connecting inputs, universal signals and changes in the circuit and its connecting inputs. The state of the circuit refers here to its output 26, that is, whether the circuit 77 fired or not. The circuit's connecting inputs refers to other circuits 77 whose outputs 26 have strong inputs 25 to the circuit— those which input large currents into the circuit via the DACs 70a . . . 73n whose counters 67 have large absolute values.

The first type of signal which can be used to modify the bias is the state of the circuits 77 and their connecting circuit. As one example of this type, consider a case where the Boolean competition for inputs 25 has already occured. An input pattern 11 produces a set of inputs 2, the weights (the binary numbers in the counter 67 of the DACs 70a . . . 73n) have grown in value such that the circuits 77 of the various levels 21 will tend to either fire or not fire consistently. Those which fire consistently have a current summation to their voters 75 that is positive; those which do not fire have a negative current summation.

For simplicity, assume only two inputs 25 have weights which have grown large and that these two are both firing consistently (depending on the choice of Boolean function B, either firing or non-firing inputs 25 might have won the competition). These bias values must be consistent with the state of the circuit 77 to best produce the AND/NAND or OR/NOR capabilities discussed above. In particular, if a circuit 77 is generally firing, an AND-like or OR-like function is implemented making a negative bias at DAC 74. By contrast, if the circuit is generally non-firing, a positive bias at DAC 74 produces a NAND-like or NOR-like function.

The bias on a circuit 77 is not randomly chosen, but rather, is made to depend on the state of the circuit itself. Moreover, the bias depends on the state of its connecting inputs (which were both firing in this example). Bias values (the binary numbers stored in counter 67 of the threshold DACs 74a . . . 74n) are incremented or decremented by the computer 9 via gate G2.

The second type of signal which alters the bias is universal signals. The universal signals 5 and 6 are reward and punish signals which are used to send signals "universally" to all DACs in all levels 21 of a circuit 1 (discussed in more detail in Universal Signals). Universal signals likely correspond to pain and pleasure signals in living organisms. In self-organizing systems 101, universal signals 5 and 6 can be used to set the bias of circuits 77.

For example, suppose that the circuit 1 is learning to distinguish between the letters "A" and "V" as shown in FIG. 7A. Such a determination requires a detail sensitivity: AND/NAND-like characteristics are required so the bias of the circuits 77 must be set high (else the circuit 1 may not form connection weights on DACs 70a . . . 73n which exclude the input pattern 11 for a letter "V" but include the pattern 11 for the letter "A").

By coupling the bias values in the DACs 74 to the reward and punish signals 5 and 6, the circuit as a whole can be made more sensitive to details—to distinguishing the input pattern 11 for patterns which only differ by a small portion of the input signals 2, such as those for letters "A" and "V".

During the learning mode, if the circuit 1 makes an improper determination of the input pattern (the output signal 3 does not match the input pattern 11), then the teaching computer 9, signaled by the punish signal 6, increases the bias of those circuits 77 which incorrectly fired. These include the circuits 77 linked by connecting circuitry in the various levels 21. With higher bias, the circuit 1 becomes more sensitive to the differences between the input patterns 11 dynamically, that is, while the system 101 is learning.

In other cases, the circuit 1 must become less sensitive to differences in the input pattern rather than more sensitive. For example, suppose the circuit above was to learn some variations of the letter "A": perhaps those with vertical sides such as input 25n (FIG. 7) or those with curved diagonals rather than straight ones like inputs 25a and 25b. A useful self-organizing circuit 101 should recognize these variations as the letter "A". If the circuit 1 only responds to inputs 25a, 25b and 25c to fire the letter "A" output signal 3, it is too sensitive to details. To respond to variations, the circuits 77 should become more OR/NOR-like; the bias values in DCAs 74 should be reduced rather than increased. During the learning mode, correct patterns 11 which are not correctly identified (the correct output 3 associated with the pattern 11 does not fire) are used by the teaching computer 9 to reduce bias values in those circuits 77 linked by connecting circuitry in the various levels 21. The circuits 77 involved in the determination of output 3 becomes less sensitive to changes in the input pattern 11.

After many trials where the various patterns 11 are applied to the circuit 1, the bias is increased in those circuits 77 which are required to produce a distinction of the outputs 3 and the bias is reduced in those circuits 77 where variation of the pattern 11 is required. In this example, both the universal signals and the state of the circuits 77 combine to modify bias values. Note when the computer 9 either increases or reduces the appropriate bias values in DACs 74, the changes are applied to all the levels 21 of the circuit 1, not simply a single level as shown in FIG. 7a.

The third type of signal used to modify the bias is changes in the state of the circuits 77 and their connecting circuitry: those inputs 25 and outputs 26 which recently changed. Such change sensitive functions use changes from the prior states of the outputs 26 of neuron circuits 77 (for details see Change Sensitive Functions). A changed output 26 is either one which is firing but recently had not been firing, or the reverse, one which had been firing but which is no longer firing.

Using changed outputs 26 for altering the bias has important consequences: it means that circuits which are not firing have useful information. Firing circuits 77 are not the only ones which carry information; so do the non-firing ones, especially if they have recently changed. In addition, the important changes to an output 26 are not those which occur inconsistently, but rather, those which are relatively consistent. For example, an output 26 which changed randomly every few clock cycles T would represent an inconsistent output 26, while one which stayed in one state for many clock cycles T and then changed would likely be an important change (see Burst Filters and Burst Circuits for more details on assuring that changes are consistent).

Given that consistent changes in the outputs 26 have been identified by proper filtering, bias modification based on changed outputs 26 can improve the accuracy of learning, especially in those cases where details—small differences—in the input pattern 11 are to be distinguished. For Example, consider again the case where inputs 25 (FIG. 7A) are to distinguish between the patterns 11 for an "A" and a "V", the distinguishing charateristic being the presence of the horizontal signal 25c in the letter "A" pattern. Now if the two patterns 11 are presented in rapid succession to the system 101 (FIG. 1), then the only input 25 that changes is the input 25c, since the inputs 25a and 25b are common to both patterns 11 and do not change. Humans use a similar technique: when manually inspecting for errors of, say, a printed circuit board, images of both a correct board and the defective board are presented in quick succession; our brains are particularly adept at detecting details when those details change.

Recall that increasing the bias of a circuit 77 makes that circuit more sensitive to details—more AND/NAND-like. Then by increasing the bias to those circuits 77 which change and whose connecting circuitry changes, the circuit 1 will become more sensitive to the same changes in the future. In this example, the circuit 77 whose output 26 changed (the one representing the pattern 11 for "A") as well as those circuits 77 of lower levels 21 whose output 26 changed (e.g., the one whose output 26 represents the input 25c). Conversely, when the circuit 1 is to become less detail sensitive and more globally sensitive to those circuits 77 which change, the bias of the circuits 77 which changed is reduced.

In the preceding, bias modifications are based on the state of signals and connecting inputs, on universal signals, and on changing states and changing connecting inputs. Note that these signals can also be combined to modify the bias of circuits 77. As an example of combining signals, universal signals, those which signal all of the circuits 77 of the system 101 based upon the correctness of the outputs 3, can be used to modify the bias of circuits 77 whose state and whose connecting inputs change. Depending on whether the output 3 is correct, universal signals 5 and 6 can signal circuits 77 which changed to either become more OR/NOR-like or more ABD/NAND-like. By coupling the outcome 3 of the circuit 1 to bias modifications, the system 101 can adjust to errors in its output.

Consider an erroneous output 3 of a circuit 77 of the last level 21N. Other circuits 77 which changed and were the input signals 25 to that circuit 77 are clearly the source of the error. Moreover, these other circuits 77 whose connecting inputs changed also contributed to the error in output 3, and so forth through the chain of circuits 77 spanning between the inputs 2 and the outputs 3. In this example, it is this "error set" of circuits 77 whose bias is modified. If the system 101 was learning the details of the input pattern 11, the error set of circuits 77 have their bias reduced making them more AND/NAND-like. If the system was learning associations of the input pattern 11 (global variations, not details), the bias of the error set is increased. After repeated learning of the many different input patterns 11, the system 101 adjusts to outputs 3 which are correct.

CLIP

Clip is another means by which the bahavior of the circuits 77 can be altered to provide improved self-organizing. While bias changes the circuit 77 between one having OR/NOR-like and one having AND/NAND-like characteristics, clip changes it from OR/NOR-like to XOR/XNOR-like characteristics. The XOR and XNOR functions, like the OR, NOR, AND and NAND functions, are 2-input Boolean operators. XOR is the "exclusive OR" function; XNOR is the "exclusive NOR" function. The terms "XOR-like" and "XNOR-liked" used here refer to circuits 77 which have two or more inputs 25, yet behave in a similar manner to their respective 2-input Boolean gates.

When circuits 77 are made to operate like XOR or XNOR functions, they provide the circuit 1 with a "decision" capability. Rather than "averaging" the effects of the inputs as the OR/NOR functions do, the XOR/XNOR functions force the output of the circuit 77 to be determined by one input or the other, not a combination of both. XOR/XNOR functions provide a branching organization of various input patterns 11 which aids in correctly determining the proper output 3.

The clip function resembles the response of actual neurons. When a neuron receives too large an input signal (that is, the excitory neurotransmitters cause the neuron's internal potential to rise too high), the neuron "overloads": it ceases to fire. Such a function is XOR-like; it behaves like a Boolean XOR. Consider a two-input XOR gate. It will fire like an OR gate 1) if neither of its inputs fire or 2) if either, but not both, inputs fire. However, for the case where both inputs fire, the XOR differs from the OR gate: the OR fires but the XOR does not. Similarly, an XNOR gate responds like a NOR gate except for the case where both inputs fire: the NOR doesn't fires but the XNOR does. To make an OR gate into an XOR gate requires only that the output of the gate be "clipped" (not fire) for the case where both inputs fire.

Just as a neuron circuit 77 (FIG. 7A) could be modified by the bias to produce OR/NOR-like and AND/NAND-like behavior, the same circuit 77 can be simply modified to produce XOR/XNOR-like behavior. While the term XOR and XNOR only apply to 2-input Boolean gates, in general, a neuron circuit 77 is XOR/XNOR-like if its output is altered when the input voltage to its voter 31 (FIG. 3) is either too high (XOR-like) or too low (XNOR-like).

Figure 25:
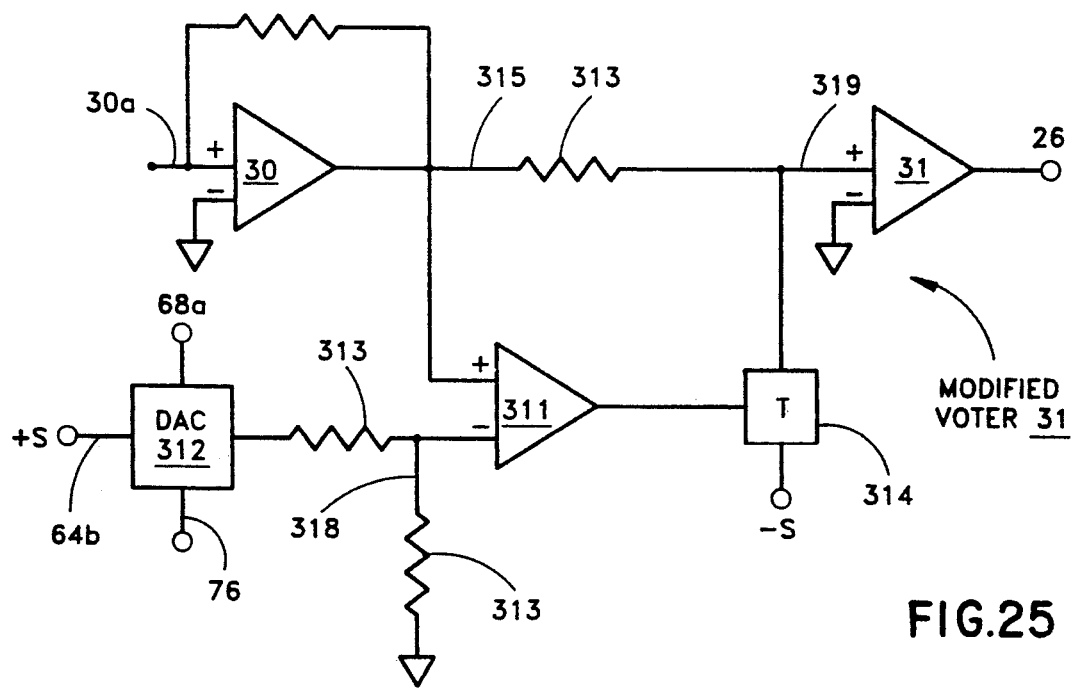
FIG. 25 is the schematic representation of a modification of the voter circuitry of FIG. 7A which incorporates a clipping capability.

FIG. 25 shows a modification of the voter 32 (FIG. 3) which makes the neuron circuit 77 into one having XOR-like behavior. As in the voter circuit 32, circuit 310 uses a high gain amplifier 30 to sum the currents from its DACs (such as DACs 73a ... 74n of circuit 77n) and provide a voltage signal 315 which is proportional to the sum of these currents, either positive or negative. The modification of circuit 310 includes amplifier 311, DAC 312, resistors 313 and transfer gate 314 connected to negative supply S. The voltage 315 is compared to voltage signal 318 by the amplifier 311. If the voltage 315 exceeds that of voltage 318, the amplifier 311 with provide a positive voltage which triggers transfer gate 314, drawing down the voltage input to amplifier 31 and preventing it from firing and from producing an output 26 of the voter 310.

The clip voltage 318 is set by the current out of DAC 312 and resistors 313. The DAC 312 is set in the usual manner of DAC 60 (FIG. 6A) by incrementing its up-down counter 67 via connections 76 which address the DAC 312 of the appropriate neuron circuit 77. Control line 68a of DAC 312 assures that its output current is triggered by clock signal 68a; input signal 64b is tied to the positive voltage supply so that it is always on. With the addition of the modified voter circuit 310, a neuron circuit 77 can be modified to have XOR-like behavior. To understand its behavior, consider the simple case where the capital letter "I" is to be distinguished by a level circuit 21 made up of neuron circuits 77 (as shown in FIG. 7A) whose inputs include 25a (left diagonal), 25b (right diagonal) and 25n (vertical). The "I" pattern, though, might have alternative correct forms that include any one of these components, but no more than one.

Consider, in particular, circuit 77b, one of the circuits 77. Assume that initially, the clip voltage 318 of circuit 77b is set to a very high value such that no voltage 315 could exceed it. As such, the circuit 77b would have no clipping. Now suppose that the initial random values in up-down counters of DACs 71a ... 71n were such that the output 26b of circuit 77b begins firing when the input pattern 11 to circuit 1 (FIG. 1) is an "I" pattern. As alternative forms of the "I" are input, the inputs 25a, 25b and 25n have their DACs 71a, 71b, and 71n incremented such that the output 26b fire more and more often when any of the "I" patterns also fire (as discussed earlier in Learning Mode).

However, the same output 26b also fires if other patterns 11 are input to the circuit 1. For instance, the pattern for letter "V" or letter "A" might also trigger the output 26b to fire, since these contain the components 25a and 25b. Note that changing the bias does not help to distinguish an "I" from a "V" or from an "A". The clip does help.

By reducing the clip voltage 318 to a lower and lower value as the various patterns for letters "A" and "V" are incorrectly identified by the output 26b, the circuit 77b becomes more XOR-like. At some value of the clip voltage 318, the output voltage 26b will fire if one of the components 25a, 25b or 25n fire since the contribution from the corresponding DAC produces a positive voltage 315 which fires the amplifier 31. But output 26b will not fire if more than one of the component signals 25 fire (the sum of the current from their DACs produces a voltage 315 which exceeds the clip voltage 318 causing the transfer gate 314 to short the input voltage 319 of amplifier 31 to the negative supply, preventing it from firing).

The XOR-like behavior produced by the clip function is similar to the XOR-like behavior (discussed in U.S. Pat. No. 4,479,241: 1.7-36, p. 19) by the present inventor. The effect is the same: the number of outputs to a level is reduced as incorrect outputs are discovered among the outputs. In the previous method, negative weights from outputs on the same level present other outputs at that level from firing. The present method is believed to be more general since the clip voltage 318 can be reduced until correct firing outputs occur. The clip voltage may produce an output when only one pf the inputs fire or it may produce an output when several of the proper inputs fire. For example, by adjusting the clip voltage to allow two inputs, but not three, to trigger the output of a circuit 77, the letter "V" (with two components, 25a and 25b) is distinguished from the letter "Y" (with three components, 25a, 25b and 25n).

XNOR-like behavior is achieved by slightly altering the circuit 310, for example, by using a positive/negative DAC 312 and coupling its output to the voltage source feeding transfer gate 314. When the DAC 312 output is positive, the voltage source is negative as shown in FIG. 25, but when the DAC 312 output is negative, the source switches to a positive one (not shown for clarity). As an alternative, the output of an XOR-like circuit 310 can be negated (as discussed in U.S. Pat. No. 4,479,241: 1.37-62, p. 19 and in Negation) to provide XNOR behavior. XNOR-like circuits 77 produce an output 26 having an opposite sense as the XOR behavior of circuit 310: they fire when the XOR circuit does not and they don't fire when the XOR circuit does.

INHERENT CLIP

As with neuron circuits 77 which have an inherent bias, circuits 77 of self-organizing circuit 1 can have an inherent clip value. In inherent clip, neuron circuits 77 are randomly assigned clip values having both negative and positive sources, (that is, producing either XOR-like or XNOR-like behavior respectively). The clip values range from those with high values giving OR-like and NOR-like behavior to those low values giving XOR-like and XNOR-like behavior. Depending on the mix of OR/NOR values to that of XOR/XNOR values, the capability of the self-organizing system 101 is altered.

Whit mostly high inherent clip values (OR/NOR-like), the circuit 1 has little "branching" behavior. With mostly low inherent clip values (XOR/XNOR-like), the circuit 1 has more branching behavior. The circuits 77, linked by connecting circuitry in the various levels 21, form a pathway between the input signals 2 and the output signals 3. Branching occurs when this pathway branches: the pathway splits into separate branches or separate branches combine into a single pathway. In the example above determining among several alternate pattern "I" inputs, the circuit 77b is a branching point since three alternative paths (circuits 77 whose outputs 26 are the inputs 25a, 25b, and 25n) combine to a single output 26b. Any of three possible inputs is suitable for causing the output 26b, but a choice must be made: only one of the inputs can cause the output 26b to fire.

The more circuits 77 with low inherent clip values, the more branching behavior the circuit 1 has. Generally only a small amount of XOR/XNOR-like behavior is sufficient to provide useful self-organizing capability of the system 101. The mix of nodes with low inherent clip values (i.e., XOR/XNOR-like behavior) is typically less than 20%.

CLIP MODIFICATION

Just as the bias values of neuron circuits 77 are modified during learning, so are clip values. Like the bias, clip changes are based on three different types of signals: the state of the circuit and its connecting inputs, universal signals and changes in the circuit and its connecting inputs. As seen in bias modification, clip modification can be based on these signals individually, or more commonly, in combination. Examples of both types of modification follows.

First consider an example of clip changes based on the state of the circuit. Assume that an input pattern 11 produces weight increases in the DACs 70a ... 73n via the usual competition and producing outputs 26 of circuits 77 which are either firing or not firing. For simplicity, again assume only two inputs 25 have weights which have grown large and that these two are both firing. The clip values (stored in the up-down counter 67 of DACs 312) must be consistent with the state of the circuit 77. If a circuit 77 is generally firing, an XOR-like or OR-like function is implemented by adding positive values to those DACs 312 making a positive-firing clip. By contrast, if the circuit 77 is consistently non-firing, a negative clip at DAC 312 produces a XNOR-like or NOR-like function.

Like the bias, the clip on a circuit 77 is not randomly chosen, but rather, is made to depend on the state of the circuit itself. Moreover, the clip depends on the state of its connecting inputs (which were both firing in this case). Clip values (the binary numbers stored in counter 67 of the threshold DACs 312) are incremented or decremented by the computer 9 via gate G2.

Next consider an example where several signals are used in combination to modify the clip values: universal signals 5 and 6 in conjunction with change signals. If, say, a circuit 1 is learning the distinction between the input pattern 11 of the letter "A" versus that of letter "V", it is again the horizontal component 25c which is a major feature separating the patterns. Now when the input pattern 11 has represented the letter "A" and is switched to the letter "V", those circuits 77 which change and whose connecting inputs 25 change are ones which are associated with the new input pattern 11 and the new inputs 2 to the preprocessor circuit 20.

If the outputs 3 are in error, say, because the output representing the letter "V" and the one representing "A" are both firing, then the universal punish signal 6 fires. By reducing the absolute clip value (less positive for those OR-like circuits and more positive for those NOR-like circuits) in the DACs 312 of those circuits 77 which changed, makes those circuits more XOR/XNOR-like. As such, they prevent those circuits from responding to both the letter "A" pattern and the letter "V" pattern.

As a further refinement to combining signals for clip modification, consider those circuits 77 which change when the input pattern 11 changes. Since the state of these circuit change, necessarily some of their inputs 25 also changed their state: the connecting circuits 77 whose outputs 26 are the inputs 25. Often the circuits 77 whose state changed have other inputs 25 which did not change state, in addition to those which did change state. By reducing the absolute clip value of such circuits (making them more XOR/XNOR-like), they produce the branching behavior described earlier. Conversely, reducing the absolute clip value on circuits 77 whose inputs 25 either didn't change or which all changed prevents the branching behavior.

BIAS AND CLIP SUMMARY

Shown above have been various examples of using three kinds of signals, either singly or in combination, to modify the bias and clip value of the circuits 77. The signals include the state of the circuit and its connecting circuitry, universal signals and changes of the circuit's state and connecting circuitry. Depending on the requirements for self-organizing (e.g., global sensitivity, detail sensitivity), these and other combinations of bias and clip modifications allow the system 101 to efficiently self-organize.

While these methods are implemented by the computer 9 modifying the contents of the up-down counters 67 of the DACs 74 and 312 of the circuits 77, the implementation may be by direct means as well. Just as the Boolean logic and competition circuitry is implemented by hardware (such as in the circuits 83 and 84, FIG. 20A), so is hardware implementation appropriate for modifying the bias and clip values. The hardware can be implemented as circuitry (such as circuits 83 and 84) which use the complete set of inputs 25 and outputs 26 of the level circuits 21. Additionally. hardware circuits for implementing bias and clip values require the universal signals 5 and 6 if the modifications are to depend on them.

The hardware can be also be locally implemented. Local implementation of bias is similar to the local hardware for modifying the DACs 70a . . . 70n of the balance and addendum circuits 95i (FIG. 22B), except that DACs 74 and 312 are modified according to the rules and signals set forth above. As in the local balance and addendum circuits 95i, the circuitry uses the input signals 25 and output signals 26 to a specific neuron circuit 77i (as well as the universal signals 5 and 6 sent to all circuits 77) on which to base the modification.

SHARE

"Share", like balance, is a way to allow learning (incrementing or decrementing the weights in DACs 70a . . . 73n) in system 101 to self-organize more efficiently. When a new pattern 11 is learned, sometimes several weights of the same sign will grow simultaneously. For instance in the example used earlier with respect to Eq. 2 (see Threshold Learning), the pattern 11 associated with the letter "A" has three positive weights associated with it (represented by the large current inputs from DACs 70a, 70b and 70c, FIG. 7A).

When weights pf the same sign, such as these, are growing as a result of winning the competition for the cumulative Boolean function, B, they usually grow at different rates. Each weight (binary number in a DAC 70a . . . 73n) starts as a small random binary number and is incremented (positive weights) or decremented (negative weights). If one of the weights grows much more quickly than the others, the output of the circuit 77 can change inconsistently. This is especially true when circuits 77 are closely in balance (see Balance and Balance Methods).

In the example above, if the weight in DAC 70a grew very slowly compared to the weights in DAC 70b and DAC 70c, the output 26a might initially not fire but then later fire as the weight 70a first grew slowly and then caught up with the other major weights, 70b and 70c. When the output of one level 21 fires inconsistently, the outputs of higher levels (those whose outputs 26 are used as inputs 25 of the higher level) also fire inconsistently and the circuit as a whole has difficulty self-organizing to a stable. To maintain a neuron circuit 77 whose net sum to its voter 75 remains close to neutral, its like-signed weights must grow large at a uniform rate.

Conversely, under conditions where two like-signed weights are not required, one DAC weight may grow large independently of other like-signed DAC weights. For example, when AND/NAND-like circuits 77 (those with high bias; see Bias) have growing weights while learning various patterns 11, like-signed weights must grow at uniform rates to properly implement AND/NAND-like circuits. But when OR/NOR-like circuits 77 have growing weights, there is less of a requirement for like-signed weights to grow at a uniform rate (the bias is less so the circuit need not operate with a near-zero current sum to its voter 75).

Share is a generalized method by which the weights will grow at a uniform rate when required. In general, a circuit 77 has weights of both signs: ones that either contribute current (positive weights) or those which extract current (negative weights) from the voter 75. These weights are represented by small random numbers in the up-down counters 67 of DACs 70a . . . 73n. On a positive/negative DAC, positive binary numbers represent positive weights and negative binary numbers represent negative weights.

Consider the simplified case where a simple 2-input AND-like circuits is to be formed to recognize the input pattern 11 representing the letter "V" by combining the inputs 25a (" ") and 25b ("/") in circuit 77b to produce an output 26b signaling a correct letter "V" (FIG. 7A). As the circuit 77b learns the pattern for the letter "V", the weights in DACs 70a and 70b (for the inputs 25a and 25b) grow as their cumulative Boolean function, B, wins the competition with other connections 25c . . . 25n. Assume that the bias function assures proper growth of the circuit's threshold DAC 74, and that the balance function maintains the growth of the positive weights as a group so the net sum of current into the voter is close to zero as previously discussed.

Figure 26:
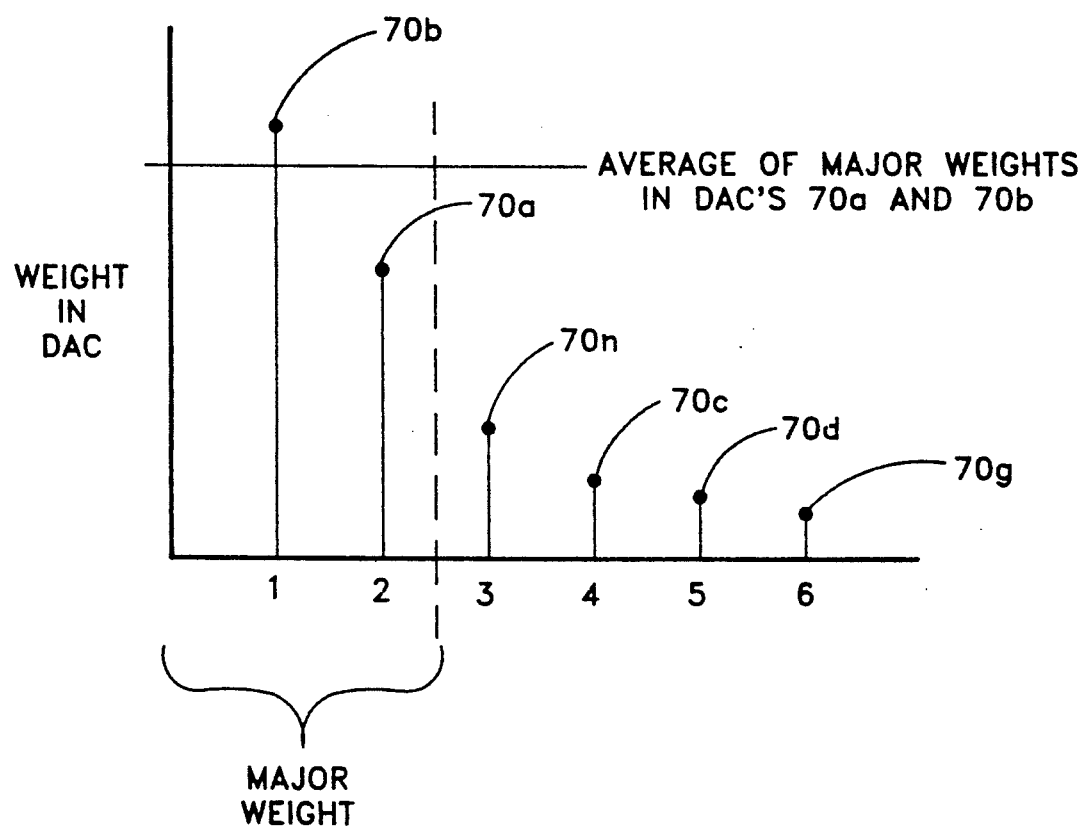
FIG. 26 shows schematically how the weights in a subcircuit 7A are modified to allow them to grow at a uniform rate.

At some point early in the learning process, FIG. 26 shows the like-signed connections to circuit 77b rank ordered by weight. For a 2-input AND-like function, only two of the positive branches are to grow, the "major" weights in DACs 70a and 70b; the other weights in DACs 70c . . . 70n never grow because they never win the Boolean competition. Now the purpose of share is for the major weights in DACs 70a and 70b to grow at a uniform rate. To let the major weights grow uniformly, an algorithm of the following general form can be used:

$$DN(j) = DNb*(1 + Ks*f[(AVE - Nj)/AVE])$$

where:

AVE = SUMM(Nj)/mAverage of the major weights and:
DN(j) Amount the major weight j is incremented during learning
DNb Amount the weight is incremented due to other growth factors (such as those based on Boolean competition and balance)
f Functional relationship
Ks Multiplier constant
m number of major weights to be incremented
Nj Decimal equivalent of the DAC binary number of the major weights
SUMM is the summation over the m major DACs which connect to voter 75

Essentially, if one of the major weights is above the average of all major weights, it is incremented less than the other major weight, while those that are below the average are incremented proportionately more. As learning proceeds, those weights which are less than the average tend to grow faster than those above the average. Slow growing major weights in DACs 70 . . . 73 tend to catch up to the faster growing ones such that all the major weights grow uniformly.

In the example shown in FIG. 26, the major weight in DAC 70b has grown larger than that of the other major weight 70a. For an appropriate value of the constant Ks, its normal weight increment DNb is reduced because its weight is above the average of the two major weights in DACs 70a and 70b. By contrast, the normal weight increment of the weight in DAC 70a is increased since its weight is below the average. After successive applications of this algorithm during the learning process, the weight in DAC 70a will catch up to that in DAC 70b. However, when the circuit 77 is to be OR-like (rather than AND-like as in this example), the multiplier constant Ks is made very small and no sharing takes place. The share function is thought to mimic the operation of certain neurotransmitters which control dendritic protein growth.

PREPROCESSOR CIRCUITS

Figure 8:
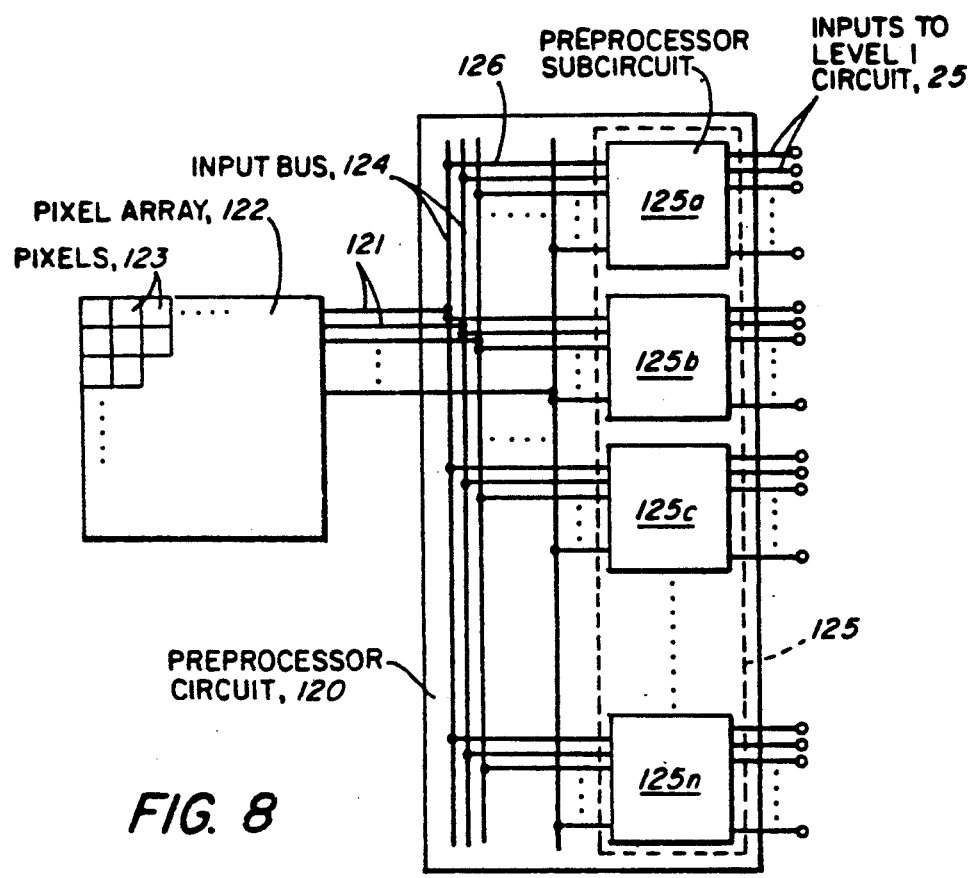
FIG. 8 shows diagrammatically a preprocessor circuit in combination with an array of optical sensors.

Earlier, a preprocessor circuit 20 in FIG. 2 was discussed in regard to inputting the proper signals 25 into the level one circuits 21A. To understand how the self-organizing circuits 21A . . . 21N actually performs on raw input data signals 2 from the sensors 10, an example of a preprocessor circuit labeled 120 for a specialized application is discussed below with reference to FIG. 8. The particular application used is that of an array of optical sensors 10 which perform the function of the first few layers of the retina in a human eye. Other embodiments consider other preprocessor circuits 20 for other specialized applications such as the recognition of speech patterns or the recognition of tactile (i.e., touch) patterns. The circuit 120 discussed below is meant only to illustrate how one such preprocessing circuit operates in conjunction with the sensors 10 and the self-organizing level circuit 21. ARRAY SENSORS As shown in FIG. 8, the optical preprocessor circuit 120 receives inputs 121 from an array 122 of optical sensor pixels 123.

Each signal 121 from the pixel array 122 is separately connected to each pixel element 123. A pixel element 123 can be, for example, photovoltaic sensors whose voltage output signals 121 relate to the amount of light impinging on each sensor. Teaching or recognition patterns 11 can be introduced to the pixels 123 by optically casting a shadow of the desired pattern 11 on the array 122. The actual method used to obtain voltage output signals 121 from the array 122 is not particularly of concern; of concern is that the desired geometric pattern 11 to be recognized by the circuit 1 in FIGS. 1 and 2 is partitioned into numerous sensor inputs each of which represents a portion of the pattern. The pixels 123 need not be of the square array shown in FIG. 8. They can be a radial or even random; they need not be area-sensitive sensors (they can for example, sense the pattern 11 crossing edges of the square pixels 123 shown); and they need not even be optical input sensors (an array of switches 123 activated by an embossed pattern 11 is adequate). However, each pixel 123, when activated, is represented by an input signal 121. Usually, the input signals 121 are binary: they are active or they are not. Depending on the type of sensors employed, an analog voltage may be converted to a binary one when the analog signal is greater than some voltage threshold. The input signals 121 to the preprocessor circuit 120 connect directly to an input bus 124, such that all the signals 121 are available to various preprocessor subcircuits consisting of sub-circuits 125a, 125b, 125c . . . 124n via connections 126. The task of the circuits 125a . . . 125n is to convert the raw sensor data 121 into useful output information suitable for processing by circuit 21A via connections 25. The task of each of the primitive circuits 125a . . . 125n is to represent different "features" or subcomponents; for an optical pattern 11 the features may be such patterns as a vertical line, a horizontal line, a left facing diagonal or a right facing diagonal. The circuits 125a . . . 125n are part of the preprocessor circuit 120 because the information is first processed before learning occurs—the circuits 125a . . . 125n do not have learning capabilities such as the circuits 21A . . . 21N in FIG. 2. Thus, for example, the task of the circuit 125a may be to detect short horizontal lines optically masked unto the pixel array 122 as suggested earlier.

Figure 9:
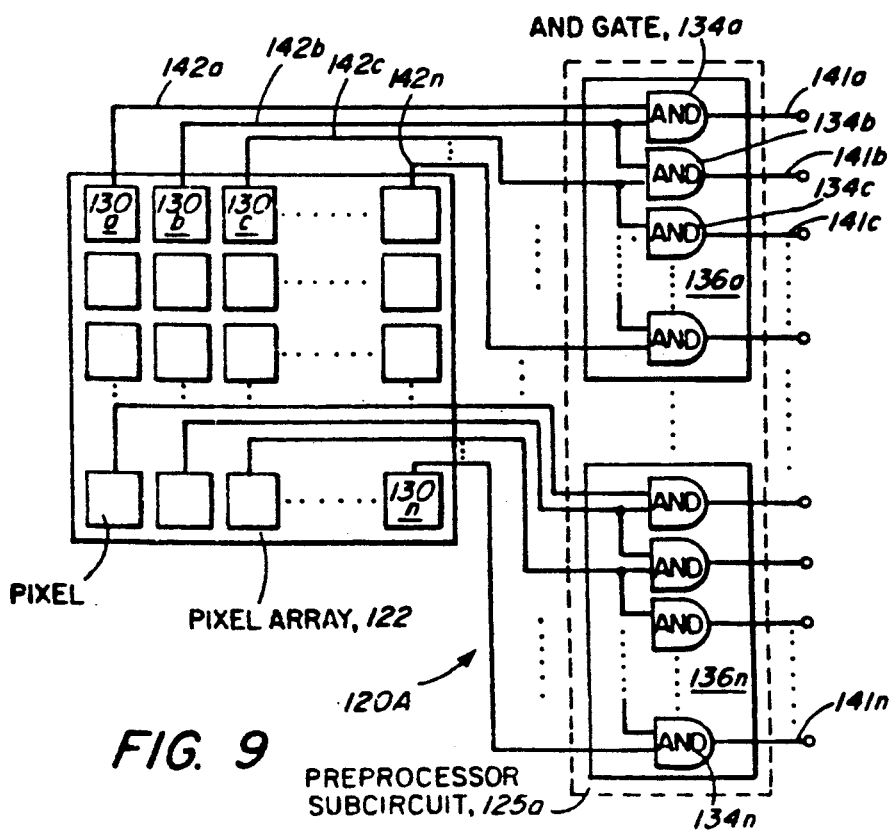
FIG. 9 shows diagrammatically and with some schematic detail one form the circuit of FIG. 8 can take.

One method of detecting lines such as horizontal, a vertical or a diagonal is to use "nearest neighbor rules" of the pixel elements 123. If any particular pixel has an active output and its nearest neighbor horizontally also has an active output, then an active signal appears at one of the connections 25 of the circuit 125a. FIG. 9 shows how this can be accomplished with standard electronic components for the special case of a horizontal line producing a number of "nearest neighbor" interactions between pixels 123 in the array 122. The pixels, marked 130a . . . 130n in FIG. 9, are connected such that each set of two adjacent pixels is connected to AND-gates 134a . . . 134n of a subcircuit 136a . . . 136n in a preprocessor sub-circuit 125a. In this example, the pixels 130a and 130b are both connected to the AND-gate 134a; the pixels 130b and 130c are both connected to the AND-gate 134b. Each row of pixels 130a . . . 130n is connected to a separate subcircuit 136a . . . 136n of AND-gates 134a . . . 134n. In FIG. 9 the top row of pixels 130a, 130b, 130c . . . is connected to the gating subcircuit 136b (not shown) and finally the bottom row of pixels is connected to AND-gates of the gating subcircuit 136n. In every case, two pixels 130a . . . 130n horizontally adjacent to each other are connected to an AND-gate 134a . . . 134n. For example, the line 142b connected from pixel 130b is routed to both the AND-gate 134a and 134b. Thus, the information from the pixel 130b is combined with information from the pixels 130a and 130c—the pixels on each side of it—to give an output at connections 141a and 141b, respectively.

The purpose of the preprocessor subcircuit 125a in FIG. 9 is to identify two-pixel long horizontal lines. If any two horizontally adjacent pixels, such as the pixels 130b and 130c, both have an output, then the output connection 141b will also have an output. Similarly, any other horizontally two adjacent pixels will also give an output at the connections 141a . . . 141n. However, only horizontally adjacent pixels will give active outputs since AND-gates give active outputs only if all inputs are active.

For example, if pixels 130a and 130c are active (representing an optical pattern 11 imposed on these pixels), connections 141a . . . 141n remain inactive because these two pixels are not horizontally adjacent. The information available at the connections 141a . . . 141n is much more useful to a learning ciruit 21A since much of the organization of pixel output is accomplished by the preprocessor circuit 120 prior to any learning. That is, any output at 141a . . . 141n means that two-pixel long horizontal lines are already identified—both with regard to existence as well as to location (i.e., an output at the connection 141a means a two-pixel horizontal line is identified in the upper left of the pixel array, while an output at the connection 141n means one is identified in the lower right of the array; position or location is determined by which output connection 141a . . . 141n has an output voltage. Of course, the circuit 125a in FIG. 8 considers only adjacent horizontal pixels. Other preprocessor sub-circuits 125a . . . 125n (hereinafter the label 125 generally designates any preprocessor sub-circuit of a preprocessor circuit 120) may identify longer lines seen by the pixels, by AND-gating together more adjacent pixels than simply those which are side by side. For example, each set of three pixels in a row may be connected to a single AND-gate to give three-pixel long horizontal line indications, as shown in FIG. 10A. Here pixels forming three-in-a-row combinations are all connected to the same AND-gate: pixels 150a, 150b and 150c are all connected to an AND-gate 152a; any pattern 11 causing these pixels to output identifies a three-pixel long horizontal line by an output at the connection marked 151a. The output will occur only if all three pixels—not two, not one—have outputs.

In a similar manner, other preprocessor subcircuits 125 can identify and locate horizontal lines of any length simply by including more adjacent pixels connected to each AND-gate. It will be noted that a learning circuit 21A probably has all inputs available to it (those representing two, three, four or more pixels in a row) to most easily learn appropriate patterns.

Another method by which a preprocessor circuit 120 can signify length of line is by paralleling the outputs of shorter line-length circuits. As shown in FIG. 10B, four-pixel long horizontal lines can be identified and located by combining the outputs of the two-pixel long horizontal lines. Each of the pixels shown at 153a . . . is connected to an AND-gate 154a . . . in adjacent pairs as was discussed earlier with regard to FIG. 9. In FIG. 10B, however, the AND-gates 154a . . . themselves are connected in adjacent pairs to AND-gates 155a . . . 155n. Thus connections 157 will have output signals if any adjacent pair of pixels is activated and connections 156 will have outputs if any pair of pixel pairs 153a . . . is activated; connections 156 indicate any four pixels in a row which are activated.

The process can be extended (for example, by combining pairs of outputs 156, eight activated pixels in a row can be identified) or combined with the process described earlier with identifying groups of three activated pixels in a row (as discussed in relation to FIG. 10A). Through these techniques, output connections can be used to identify any desired number of activated pixels in a row: two, three, or four as just described, but also more than four. So far the preprocessor circuits have been described only with regard to identifying horizontal lines of certain pixel length.

In general, the pixels can be in any direction: diagonals, verticals as well as horizontals. Diagonals of various pixel length require that adjacent pixels on the diagonal be connected to AND-gates in a similar manner as adjacent pixels on the horizontal are connected to AND-gates 134a . . . 134n in FIG. 9. Longer lengths than two-in-a-row are accomplished as discussed for horizontals in FIGS. 10A and 10B. Other features are also possible. Intersections are sometimes characterized by several pixels in a small area being activated: for example, a group of four pixels arranged in a square. These can be identified by AND combinations of adjacent horizontal pairs as shown in FIG. 10C. Pixels 158a . . . when activated, identify adjacent horizontal pixels through the use of AND-gate 160a (as previously shown in FIG. 9). Similarly, pixels 159a . . . when activated, identify adjacent horizontal pixels in an adjacent row through AND-gates 160b. The combination of both an activated pixel pair in one row and an activated pair in another row, above or below, will cause an output signal from AND-gates, 161a . . . which is made available to self-organizing circuits through connections 163a . . . For instance, if an intersection was to be identified by four pixels in a "square" pattern simultaneously being activated, an output should result at connections 163a . . . . In particular, let the "square" pattern be composed of pixels 158b, 158c of the first row in FIG. 10C and also pixels 159b, 159c of the second row. The AND-gates labeled 164a and 164b are activated by simultaneous signals respectively from the pixel pair 158b and 158c and pixel pair 159b and 159c. In addition, the AND-gate 161b fires since the AND-gates respond to simultaneous inputs from both of the AND-gates 164a and 164b; the output of the AND-gate 161b is available to self-organizing circuit 21A at the connection 163b. It will be observed that a simple adjacent pair combination of pixels is also available at connections 162a . . . OR-GATING Preprocessor circuits, like the circuit 120 show how different lengths of activated pixels in different directions can be properly identified for use in self-organizing circuits 21A. However, these identifications specify two characteristics: length and location.

Figure 11:
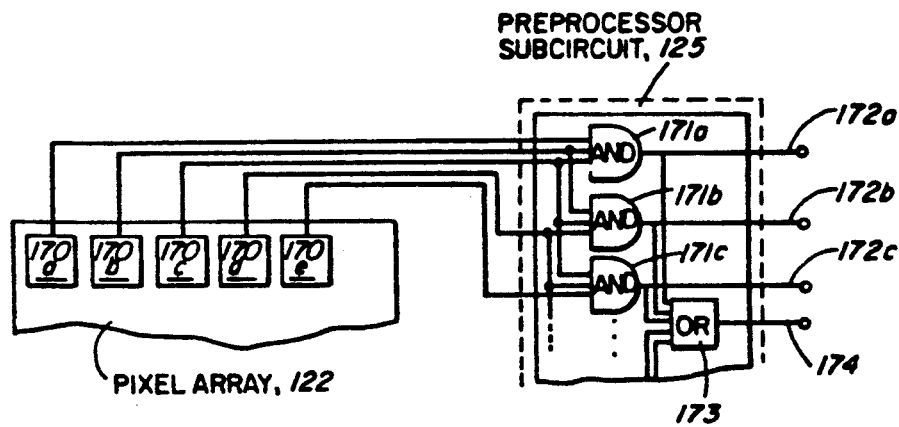

In some situations, more useful information can be passed on to the self-organizing circuit 21A if only the length and not the location is specified. For example, some letters of the block alphabet (which may be used as patterns 11 to activate the pixel array) may be identified more readily by detecting simply whether a certain feature exists in addition to where it is located. If the pixel array is activated by a geometric pattern 11 representing either an "E" or an "F", the presence or absence of a horizontal is crucial. Other preprocessor sub-circuits 125 can detect the presence (or in some cases the number) of features fed to self-organizing circuit 21A. There is shown in FIG. 11 one such possible circuit. AND-gate outputs from a circuit such as was described with reference to FIG. 10A are used in FIG. 11 as the inputs to OR-gates. OR-gates function such that they will fire if any input is present. In FIG. 11, any horizontal set of pixels 170a . . . that is three pixels long will fire AND-gates 171a . . . . An OR-gate 173 will fire if any of the AND gates 171a . . . fires. The output of the OR-gate 173 is available to the self-organizing circuit 21A through a connection 174 to provide an indication that a three-long pixel array exists somewhere in the row of pixels. More complicated OR-gating may identify other features such as a diagonal somewhere on the left half of the array, or a two-long horizontal anywhere on the array, or an intersection near the middle of the array. The outputs from OR-gates such as the gate 173 are important because they are not so location specific as the AND-gate (such as the gates 171 . . . ) outputs. After all, a child can recognize the letter "A" no matter where it is located on a page; it is the "connectedness" which identifies letters: right-facing diagonal connected to a horizontal connected to a left-facing diagonal. The OR-gate outputs can identify this connectedness by establishing the general locations of various primitive components with respect to each other. OR-gates can also be used to reduce the "size" dependency of different patterns. A block letter "A" should be recognized as such regardless of its size: a big capital "A" should be as readily identified as a small capital "A". Of course there are size limitations of the pixel array, but within those bounds size ought not be a major influence. Once the "connectedness" is determined by OR-gate outputs (as suggested above), the size factor of each sub-feature is eliminated.

For example, a capital "A" becomes recognized by the recipe: a right diagonal next to a left diagonal with an intersection on their upper end separated by a horizontal. The same recipe is valid regardless of the size of the capital "A". Techniques such as sizing are common in current image processing methods and these methods may also be used for preprocessing; the exact nature of the preprocessing is important only in that it can simplify the task of the self-organizing circuit.

TIME VARYING SENSORS

Figure 18:
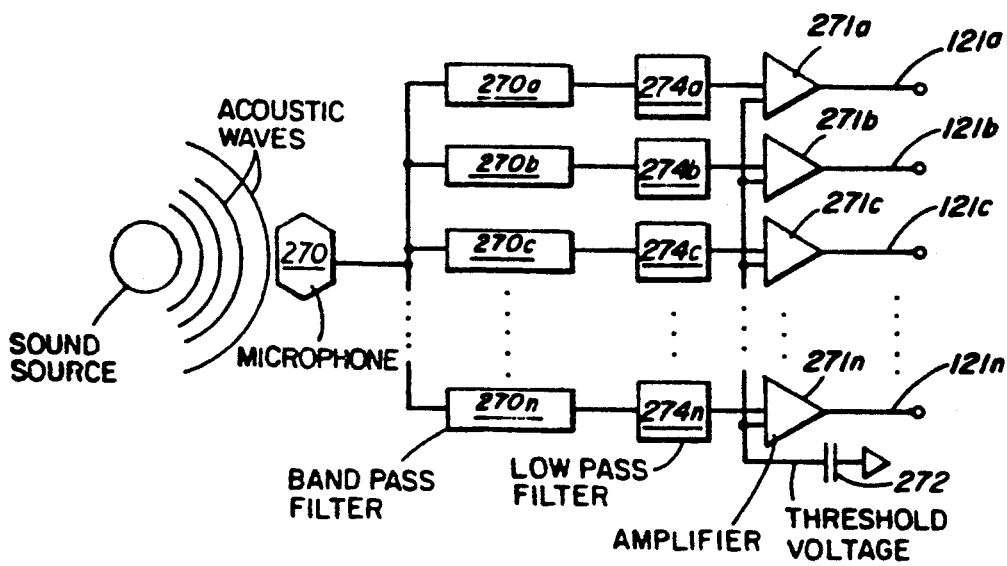
FIG. 18 shows diagrammatically a circuit that receives time varying information (i.e., acoustic energy) which is acted upon prior to being introduced to the self-organizing circuit of the present invention.

Static preprocessor circuits such as circuit 120 have been described; another variety are time-varying or dynamic preprocessor circuits. Time-varying preprocessor circuits 20 are those which have input patterns 11 (FIG. 1) which are time-varying. An example is a self-organizing circuit 1 designed to recognize speech patterns, say, from a human operator speaking into a microphone. The sensors 10 may be a microphone connected to band-pass filters such that the input signals 2 to the self-organizing circuit 1 in FIG. 1 are digital signals specifying whether the input speech pattern has frequency content of one or more of the filter frequency bands. FIG. 18 shows a simple circuit which will convert an input speech pattern 11 into digital signals suitable for input to preprocessor circuits 20 (FIG. 2). The sound source may be, for example, a human whose speech patterns cause a microphone 270 to send an analog electrical signal via connection 273 to each of several band-pass filters 270a . . . 270n. If the speech pattern 11 has frequency content corresponding to the pass band frequency of the band-pass filter 270a . . . 270n, an analog electrical signal at that frequency will be transmitted to low-pass filters 274a . . . 274n. The low-pass filters 274a . . . include rectifying, integration and decay functions such that the output electrical signal indicating the presence or absence of frequency content at that particular frequency. This analog signal is converted to a digital by high gain amplifiers 271a . . . 271n with a threshold capacitor 272 (similar to those used in the circuit 32 (FIG. 3)); the signal output at connections 121a . . . 121n is a digital signal which is active only if the sound source has a certain amplitude of frequency content associated with a particular band pass filter 270a . . . 270n. That such crude measurements of speech patterns can be used to identify speech has been demonstrated by several researchers. At any instant of time, the inputs 2 to the preprocessor circuit 20 (FIG. 2) have binary values of voltage—no different than the binary values of voltage described previously with regard to FIGS. 8, 9A, 10A, 10B, 10C, and 11. While a particular sound pattern 11 may occasionally be recognized by simply knowing the speech pattern at any instant, more often the speech patterns 11 can only be recognized by knowing how the sound pattern changes with time. The time-varying frequency content of an acoustic signal is commonly called a "voice-print" or sound spectrogram; often the frequency content is graphed as a function of time to produce voice prints used by speech experts and the like.

Figure 19:
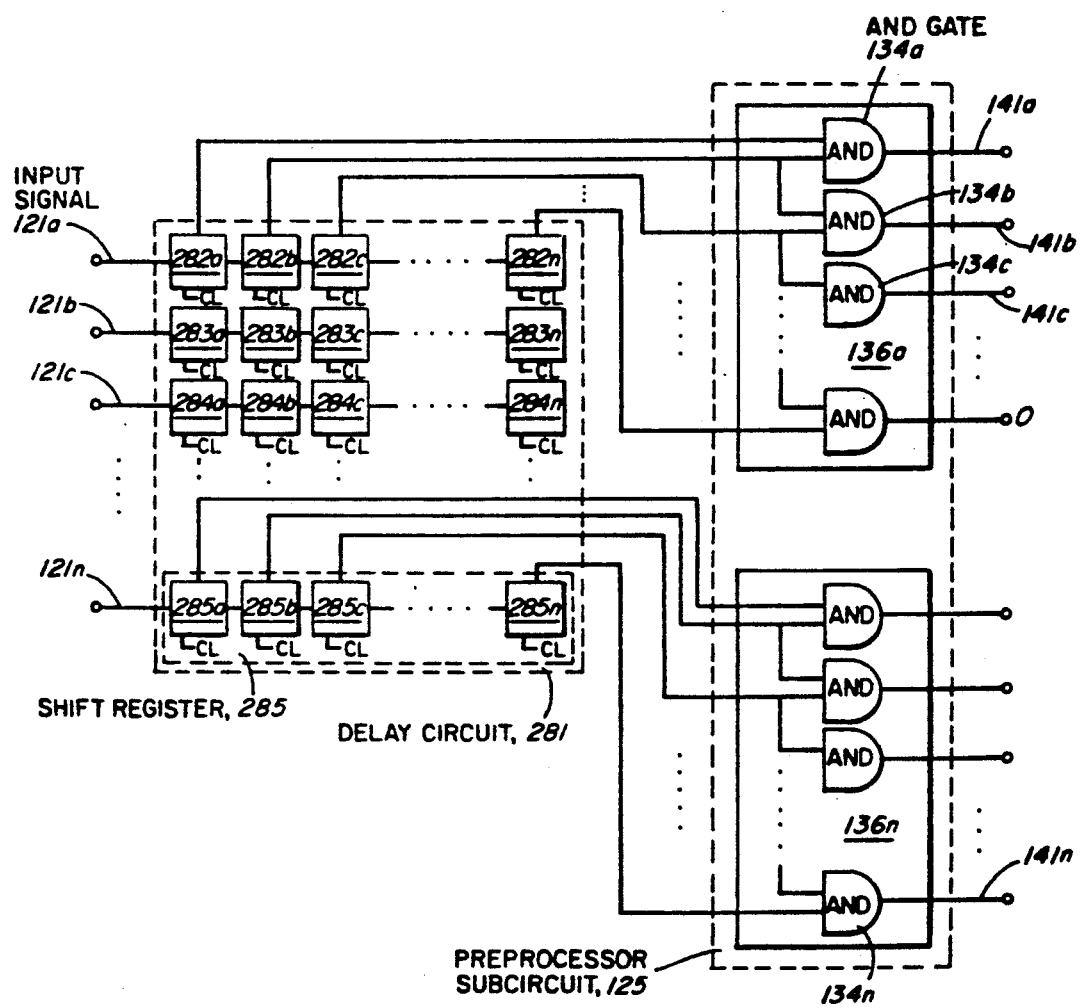
FIG. 19. is a diagrammatic representation of a further modification of the circuit in FIG. 9.

In FIG. 19, the inputs labeled 121a . . . 121n are fed into a delay circuit 281 before being preprocessed by preprocessor subcircuits 136a . . . 136n such as were previously described in relation to FIG. 9. The input signals 121a . . . 121n are transmitted to a column of shift registers whose individual bits are identified by register bits 282a . . . 285n. The function of each bit in a shift register is to hold its digital data or pass its data on to the register bit on its right. The transfer of data (or shifting) occurs when a clock signal, designated CL in FIG. 19 is received by the registers bits 282a . . . 285n. Clock signal CL is triggered by the clock signal 68a so that the patterns input to the self-organizing circuit 101 is synchronized to its operation.

Each time cycle, digital data is fed to the input connections 121a . . . 121n and is held in the first column of shift registers bits (i.e., 282a, 283a, 284a . . . 285a) for the duration of that time cycle. At the end of the time cycle, the data in each bit column is shifted to the column to its right. For example, the data stored in bit column 282a . . . 285a is shifted to 282b . . . 285b; that in bit column 282b . . . 285b is shifted to 282c . . . 285c, and so forth for each bit column. During operation, all the shift registers hold their data for the active portion of the cycle; shifting of data and addition of new data from connections 121a . . . 121n occurs only between the active portions of the time cycles and is initiated by the clock signal CL.

The preprocessor subcircuits 136a . . . 136n for a time-varying signal work in much the same way as previously described for static signals (in relation to FIG. 9 for example). The only difference is that they operate only during that part of the time cycle in which the data is not being shifted. In the example shown in FIG. 19, a row of registers 282a . . . 282n may represent high frequency band data coming from a band-pass filter 270a (FIG. 18) set to a high frequency. Registers 285a . . . 285n may represent a low frequency band, with other registers (e.g., 283a . . . 283n) representing intermediate frequency bands. If the acoustic signal from the sound source in FIG. 18 represented, say, the hissing sound of the spoken letter "S", one expects filters 270a, 270b, and 270c (which may correspond to higher frequencies) to be activated since this sound has high frequency content. As the hissing sound begins, register bits 282a, 283a and 284a store data received from connections 121a, 121b and 121c during the first time cycle. When the hissing sound continues, this same data is shifted on, first to the register bits 282b, 283b and 284b in the next time cycle and then to the register bits 282c, 283c and 284c in the following time cycle. As data is shifted out of register bit column 282a . . . 285a, new data is added via input signals 121a . . . 121n during the shift. Let it be supposed that the hissing sound lasts for three time cycles such that, when the sound ends, data is stored in nine register bits: 282a . . . 282c, 283a . . . 283c, 284a . . . 284c. At this time, the preprocessing sub-circuit in 136a in FIG. 19 has simultaneous inputs to AND-gates 134a and 134b giving signal outputs at connections 141a and 141b occurring during the third time cycle. Signals occurring at these two connections are used by self-organizing circuit 21A in FIG. 2 to determine the signal specifying the hissing sound whose duration is three time cycles. Of course signals from sub-circuits 136b . . . 136n are used in conjunction with the signals from the sub-circuit 136a to identify other frequency band information; in this example, only the sub-circuits 136a, 136b and 136c (corresponding to the input signals at connections 121a, 121b and 121c) have signals transmitted to self-organizing circuit 21A. Other preprocessing subcircuits 125, are possible for dynamic or time-changing signals. Just as static signals can use information from columns of pixels to determine vertical line patterns, so can simultaneous signals from several frequency bands be analyzed by preprocessor circuits similar to sub-circuits 136a ... 136n in FIG. 19. For example, the hissing sound discussed may be identified by simultaneous active signals from the higher frequency band sensors (e.g., 270a, 270b and 270c in FIG. 18) which input signals at connections 121a, 121b and 121c. AND-gate combinations of these signals by preprocessor sub-circuits 125 can feed information to a self-organizing circuit 21A that indicates the width of the frequency bands of the incoming sound signals: in this case, the hissing sound has frequency content in the highest three frequency bands. Just as static signals use AND-gate combinations of rows or columns of pixels in preprocessor circuits, so can dynamic signals use AND-gate combinations of rows or columns of shift register bit data during any particular time cycle. Similarly, OR-gate combinations can lead to preprocessor determination of either row or column information from shift registers just as was previously discussed for rows or columns of pixels. In summary, the preprocessor circuits 20 (FIG. 2) for static or time-varying signals operate in the same way: AND-gate or OR-gate combinations of rows, columns and so forth trigger the output signals 25 from the preprocessor circuit 20. For static signals from pixel arrays, the rows and columns are rows and columns of the pixel outputs themselves such as 130a ... 130n in FIG. 9. For time-varying signals the bit columns represent data stored in shift registers for all input signals during a particular time cycle (such as the register bits 282a ... 285a in FIG. 19); the rows represent data stored in a shift register of a particular input signal for many successive time steps (such as shift register 285 in FIG. 19). In static signals, the output signals 25 are operated upon at any time the input information from the sensors are present; in time-varying signals these outputs 25 are operated upon during active portions of each time cycle.

SCANNING

Usually, static preprocessor circuits are distinct from time-varying ones. However, for certain pattern-recognition tasks of static patterns 11, aspects of time-varying preprocessor circuits may be used. For example, if printed words are to be recognized as in hand-writing recognition, optical sensors 10 may be fabricated into a horizontal or a vertical array of pixels which are moved over the letters in a scanning manner. Instead of an entire pattern 11 the pixels 10 are only exposed to a vertical strip of the pattern 11 at any instant; other vertical strips of the pattern are exposed to the pixel array as time progresses. Just as time-varying patterns associated with acoustic energy may be recognized as discussed earlier, so may time-varying patterns which represent the scanning of letters or words by an optical array of pixels. Scanning of patterns 11 can provide important information to the self-organizing circuits such as the circuit 21. Scanned patterns give "ordering" of information. For example, if the circuit 281 shown in FIG. 19 represented a vertical scan of the capital letter "L", the register bits 282n ... 285n may be activated by the vertical stroke of the letter while the register bits 285a ... 285n may be activated by the horizontal stroke. AND combinations of the register bits 282n ... 285n identify the vertical stroke via circuits similar to circuits 136a ... 136n while AND combinations of the register bits 285a ... 185n identify the horizontal stroke via circuits such as 136n. Outputs of preprocessor circuits (such as 136a ... 136n in FIG. 19) identify "ordering": the order in which the vertical stroke pattern appeared in relation to the horizontal stroke pattern. In the example, the left-to-right scanning pixel array identifies first the vertical stroke and then the horizontal stroke, which may be an important element in recognizing the scanned letter "L". The capital letter "J" has nearly the same elements as the letter "L" but the ordering is different: a left-to-right scan recognizes the near-horizontal stroke before the vertical stroke. Perhaps an important distinguishing feature in recognizing the letter "J" is its ordering compared to the letter "L". By scanning, such pattern characteristics as "above", "below", "before" "after" can be used the self-organizing circuits such as circuit 21 to recognize patterns.

REDUCING INTERCONNECTIONS

The circuits described so far show how arrays of the DAC subcircuits 70a ... 74n (FIG. 8A) fed with information from preprocessor circuits such as the circuit 120 can self-organize the information of static or time-varying patterns 11 directed on input sensors 10 (FIG. 1). While the method described will perform as a self-organizing circuit, it is not a particularly efficient way to make a self-organizing circuit. The number of inputs which actually carries information about a particular pattern 11 may be a tenth of the total inputs 25a ... 25n. In the example discussed in relation to FIG. 7A, most of the capital letter "A"s were defined by only a few inputs such as 25a, 25b, 25c; in general, one would expect considerably more active inputs than three but also somewhat fewer than the total possible inputs 25a ... 25n. Consequently, one could argue that most of the DACs 70a ... 73n are not being used: only if an active input signal 25a ... 25n matches an active output signal 26a ... 26n in FIG. 7A is the particular DAC corresponding to that column and row significant. Perhaps only 10% or 20% of the DACs 70a ... 73n actually have non-zero numbers stored in their respective up-/down counters 67.

ASSIGNING WEIGHT COMPONENTS

Figure 12:
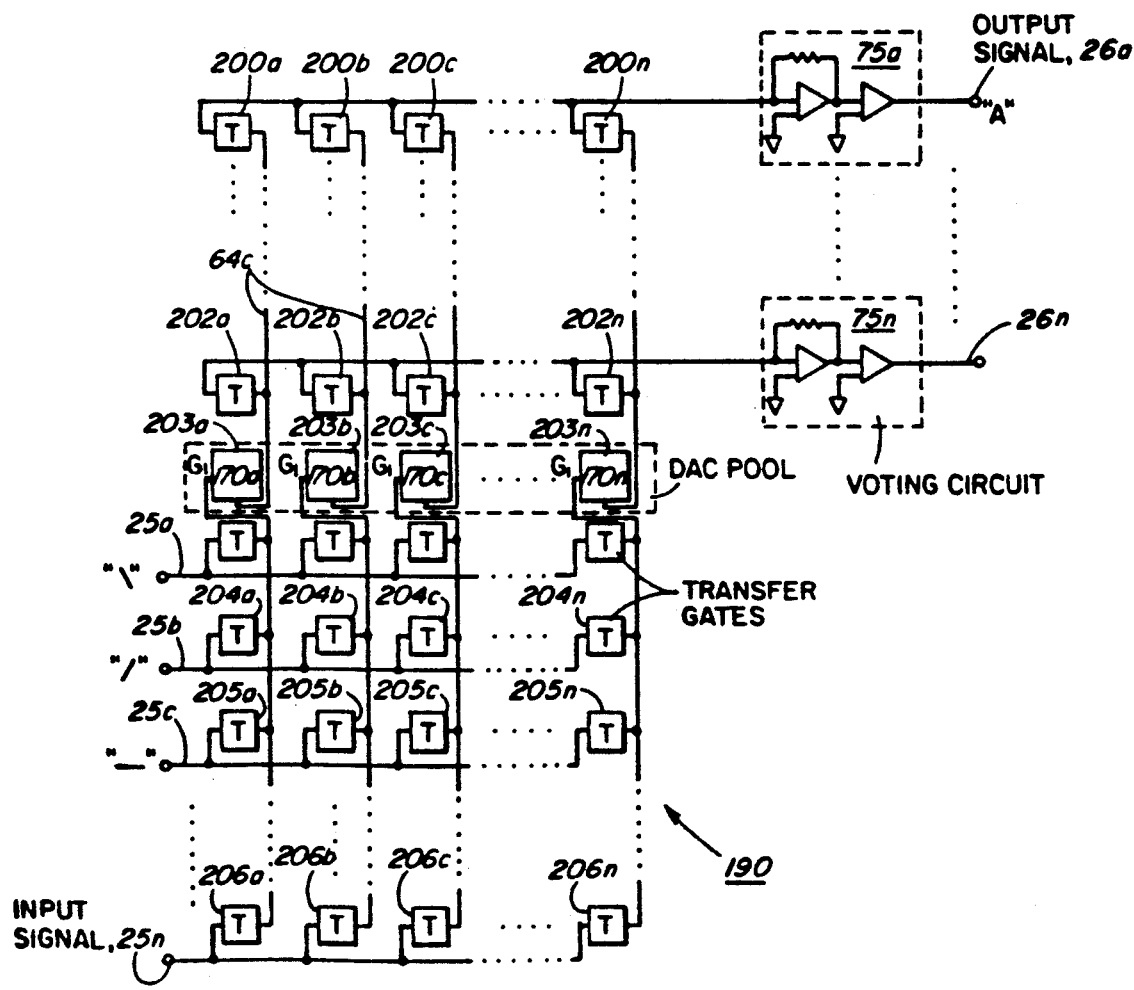
FIG. 12 is a diagrammatic representation of a modification of the circuit of FIG. 7A.

The dilemma of sparsely populated DACs 70a ... 73n which are used to output current to voters 75a ... 75n can be solved by "assigning" a particular DAC to a column (e.g., the column associated with input 25a) and also to a row (e.g., the row associated with output 26c). The circuit marked 190 in FIG. 12 shows how this assignment can occur using DACs 170a ... 170n, similar to those discussed in connection with FIG. 7A. Inputs to the circuit 190 are, as in FIG. 7A, signals 25a ... 25n; outputs from the circuit are also similar: signals 26a ... 26n through the use of transfer gates 200a ... 202n with respect to the output signals and 203a ... 206n with respect to the input signals. In operation, the teaching computer 9 (FIG. 1) opens transfer gates in a manner which connects a particular input connection to a particular output connection, including one of the DACs 170a ... 170n in the connection. For example, if input signals 25a, 25b and 25c again represent respectively a left diagonal, a right diagonal and a horizontal while output signal 26a again represents a capital letter "A", the teaching computer 9 assigns DACs as follows. When an input pattern representing the letter "A" is applied to the sensors 10, the connections 25a, 25b and 25c may well be expected to have positive signals. The teaching computer 9 assigns DAC 170a to the output 26a by triggering the gate 203a in FIG. 12 via its transfer gate 50c (shown in FIGS. 5A and 5B but not shown in FIG. 12 for clarity). Similarly, the DAC 170a, has its output connection 64c (FIG. 6A), through which current is fed to the voter 75a, connected by triggering the transfer gate 200a, using the teaching computer 9 to trigger the transfer gate 200a through its gate signal 50c. Thus, an input signal (such as the signal 25a) is assigned to a DAC (such as the DAC 170a) by triggering an appropriate transfer gate (such as the gate 203a); the DAC is then connected to a summing junction by triggering another transfer gate (such as the gate 200a). In like manner, the input connection 25b can be assigned to DAC 170b by triggering the transfer gate 204b and to the output connection 26a by triggering the gate 200b.

Essentially, the pool of DACs 170a . . . 170n can be assigned to any input signal 25a . . . 25n and to any output connection 26a . . . 26n. Punish or reward signals for each DAC 170a . . . 170n (not shown in FIG. 12 but implemented by addressing the particular DAC by its punish/reward buses 76 in FIG. 6A) are activated by the teaching computer 9 during "lessons" to alter the binary number in the DAC's counter 67, as previously discussed; the computer—which has assigned a particular DAC to an input and output connection—is also programmed to activate punish/reward signals of the particular DAC, as was discussed previously. Note that the computer 9 becomes a necessary part of the self-organizing circuit 190 since the appropriate transfer gates 200a . . . 260n are triggered by it; in other embodiments, the transfer gates 200a . . . 206n can be latched after triggering to allow the circuit 190 to operate independent from the computer 9 during the recognition mode.

OTHER WEIGHT MODIFICATION METHODS

Figure 13:
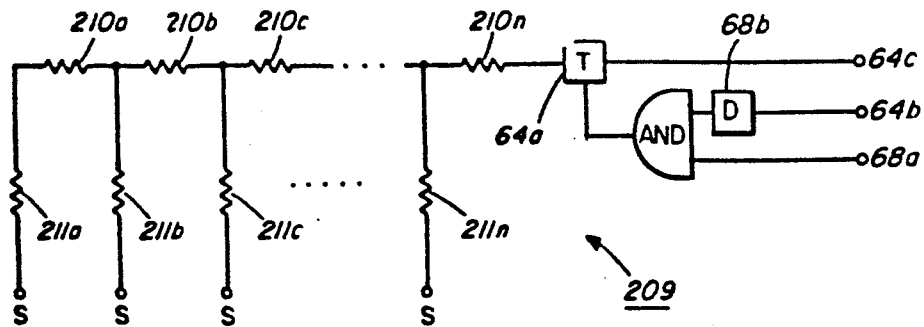
FIG. 13 is a diagrammatic representation of a modification of the circuit in FIG. 6A.

The analog methods discussed so far are based on the assumption that a digital-to-analog converter is the primary element by which currents are fed to voters such as 75a . . . 75n. The DACs are used primarily to elucidate the function of the self-learning circuits such as the circuit 21 and are not necessary components of a self-learning circuit. What is necessary is a mechanism by which the current to a summing junction can be modified by various learning experiences; the DAC is simply one way this task can be accomplished. In other self-organizing circuits, the "weighting" of weighting elements can themselves be modified rather than modifying a binary number stored in the counter of a DAC. FIG. 13 shows a circuit 209 that includes a ladder network of weighting elements 211a . . . 211n similar to that shown in FIG. 6A; each of the weighting elements 211a . . . 211n is connected to a supply source, again labeled S. As in the DAC 60 in FIG. 6A, a transfer gate 64a is activated by an input signal 64b and a clock signal 68a when the circuit 209 in FIG. 13 replaces a DAC 70a . . . 74n in FIG. 7A. The clock signal 68a "enables" the circuit 209 i.e., causes electric flow through the weighting element network 210a . . . 211n. It will be noted that other weighting element arrays than ladder networks are also usable. Moreover, the weighting elements can take a number of forms depending on the analogous medium (e.g., pressure, voltage) which the elements weight. Henceforth, an electrical medium will be discussed for simplicity, but the arguments apply to other mediums as well.

LASER METHOD

During learning, the teaching computer 9 (FIG. 1) modifies the weight of the elements 210a . . . 211n in various ways. One method used in solid state electronics today is to use "laser-trimming" whereby lasers (or electron beams) are guided by the teaching computer 9 to alter slightly the values of the weighting by physically removing element material from the electronic circuit. The elements 210a . . . 211n may also be modified by using the laser (or electron beam) to disconnect one or more elements 211a . . . 211n from its supply source S, much as the transfer gates 63a . . . 63n of FIG. 6A disconnected various weighting elements from their supply sources. Since the supply source S could be either positive or negative voltages, it is possible to have virtually any current (within limits) at output connection 64c (FIG. 13), either as a source of current to a summing junction or as a drain of current from a summing junction. The binary number stored in the binary up-down counter 67 of a DAC in the circuit 60 of FIG. 6A can be stored instead in the teaching computer 9 during the learning mode operation of the circuit 209. After completion of "lessons", the weighting elements 210a . . . 211n can provide virtually the same current to the output connection 64c as the DAC 60 in FIG. 6A would. The arrangement in FIG. 13 is particularly convenient for transferring the learned information of a DAC-based circuit, such as shown in FIG. 7A, to a much simpler circuit. For example, a master DAC-based self-organizing circuit can be laboriously taught to recognize various patterns 11. Once the weighting of the resistors 61a . . . 62n (FIG. 6A) are known, these resistor-weightings can be incorporated into the manufacturing process of identically functioning "clone" circuits which do not need to be individually taught (e.g., based on circuits such as circuit 209). These circuits would not be self-organizing circuit themselves, but they would operate in recognition mode identically to the DAC-based circuit from which they were derived: the output currents of circuit 209 would be identical to those of a DAC 70a . . . 74n in FIG. 7A. In addition, a master circuit which has been "taught" can have counter contents of its DACs transferred into other identical circuits. Learning is initialized by transferring laborious teaching but would still allow continued learning or repair later on. A disadvantage of a living organism is that each one must be individually taught to organize its brain neurons properly. This is not true of self-organizing electrical circuits since a master circuit can do the learning and its "knowledge" can be transferred to other "clone" circuits, as described above. Thus in self-organizing electrical circuits, each need not be individually taught.

OTHER METHODS

Other methods of altering the weighting element values of the circuit 209 are also possible. Chemical means for modifying weighting elements include plating techniques in which the weight of an individual element 210a . . . 211n is modified by plating or diffusing more material onto the element during learning mode operation. Depending on polarity, metal associated with the elements 210a . . . 211n can also be removed electro-chemically. Optical means for modifying the current output of a circuit such as the circuit 60 in FIG. 60A (other than laser trimming as previously discussed) include ultraviolet radiation which bleeds charge from optically-triggered transfer gates 63a . . . 63n in FIG. 6A or gates 200a . . . 206n in FIG. 12. Similar methods are presently used in erasing the memories of programmable read-only memories (PROMs).

Electrostatic methods of altering the elements 210a... 211n in FIG. 13 may use local static charges to attract conductive particles to particular regions, much as xerography uses these same kinds of electric charges for copying processes. Electromagnetic means may be used to alter the current output of a circuit similar to the circuit 60. The transfer gates 63a... 63n can be switched by the polarity of a magnetic material that is detected by a magnetically sensitive switch; the polarity of the magnetic material may be altered during learning by external magnetic fields applied to the material much as the magnetic polarity of the tape in a tape recorder is changed by the recording head. In all these methods, the teaching computer 9 controls either the alteration of the weighting element 210a... 211n in FIG. 13 in a circuit 209 or controls the state of transfer gates 63a... 63n in circuits similar to the circuit 60. Other methods of altering the elements 210a... 211n or of controlling the state of transfer gates 63a... 63n under control of the teaching computer 9 are also possible to those skilled in the art. Circuits such as the circuit 60 in FIG. 6A may well be considered a "hybrid" self-organizing circuit: it stores its learned information in a binary number of the counter 67 of its DACs 70a... 74n (FIG. 7A); yet the information is summed in analog fashion since the summing junctions 75a... 75n act on analog currents provided by the DACs. Both digital and analog circuits are combined in a self-organizing circuit 21 shown in FIG. 7A. However, the self-organizing circuit in which an alterable weighting element array such as the circuit 209 (FIG. 13) replaces DACs in either the circuit 21 (FIG. 7A) or the circuit 190 (FIG. 12) is an analog circuit: it uses only electrical currents as input to voting circuits to provide the recognition of input patterns 11. Except for the transfer gates such as gate 64a, there are no binary states—states which are usually associated with digital circuits.

DIGITAL SELF-ORGANIZING CIRCUITS

In addition to analog self-organizing circuits and hybrid self-organizing circuits, there are digital self-organizing circuits. A digital self-organizing circuit has functional similarity to the hybrid circuit 21 in FIG. 7A. However, instead of DACs which output current that is subsequently added in voters 75a... 75n, the digital circuit simply has registers (similar to the up-down counters of the DACs 70a... 74n) which have their binary numbers digitally added together to obtain a criterion upon which to output a signal at connections 26a... 26n. In a digital circuit, no digital-to-analog converters (DACs) are needed and no voters are needed to sum the currents of these DACs. The self-organizing circuit marked 228 in FIG. 14 uses only digital information to effect the self-organizing aspects of circuit 1 in FIG. 1, and is one form of purely digital circuit that may be employed in accordance with the present teachings. The circuit 228 is similar in many ways to the circuit 21 of FIG. 7A: the inputs 25a... 25n in FIG. 14 are connected to columns of registers 220a... 223n such that an input signal 25a is connected to all registers in column 220a... 223a; an input signal 25b is connected to all registers in column 220b... 223b, and so forth. In the circuit 228, the DACs 70a... 74n of FIG. 7A are replaced by the registers 220a... 223n, while keeping the input connections 25a... 25n and the punish/reward connections 76a... 76n to function as they did in circuit 21 of FIG. 7A. As noted earlier, threshold registers (not shown) which perform the function of DACs 74a... 74n may be required in certain digital self-organizing circuits. The registers 220a... 223n hold the value of the binary number which represents the "path-weighting" between the inputs 25a... 25n and the outputs 26a... 26n; these registers are simply up-down counters like the counters 67 in FIG. 6. The outputs 66a... 66n of the circuit 60 (FIG. 6A) become the data buses labeled 227a... 227n of each row of the registers 220a... 226n in FIG. 14. The data buses 227a... 227n are a set of parallel connections, each line of which represents a different bit of the binary number stored in the registers 220a... 223n. The data buses 227a... 227n are connected to arithmetic logic units (ALUs) 224a... 224n. Also connected as input to the ALUs 224a... 224n are temporary storage registers 225a... 225n. The function of each ALU 224a... 224n is to add together the binary numbers applied as input to it from respective registers 220a... 223n and from temporary storage registers 225a... 225n; the output is the binary sum of the numbers and is stored in output registers 226a... 226n. While a "binary-weighted" sum is performed by most ALUs, this need not be the case; binary bits may be "linearly" summed, for example in certain self-organizing circuits based on charge coupled devices. The output signals at 26a... 26n in FIG. 14 represent the sign bit of the registers 226a... 226n. A positive binary number stored in the registers 226a... 226n will cause an output signal at 26a... 26n; a negative binary number stored in the registers 226a... 226n will not cause an output. The digital self-organizing circuit 228 requires timing signals going to each column of the register bits 220a... 223n to insure that the ALUs 224a... 224n operate properly, as will now be explained.

SEQUENTIAL SUMMING

Let it be assumed, as before, that signals 25a... 25c in FIG. 14 exist and represent respectively a left diagonal, a right diagonal and a horizontal; these signals are assumed for simplicity sufficient to cause an output signal at the connection 26a in FIG. 14, signifying that the letter "A" was recognized. The signal 25a applied as input to the register 220a enables the binary word stored in the register to be fed to the ALu 224a only when the clock signal labeled C1 is also present. The external computer 9 (FIG. 1) sequences clock signals C1 through Cn such that the contents of each register 220a... 220n are sent sequentially via the data bus 227a to the ALU 224a. In operation, first the clock signal C1 is switched on; if a signal 25a is present, then the contents of the register 220a are transmitted to the data bus 227a. Initially the temporary storage registers 225a... 225n are cleared (set equal to zero binary value) by the first clock pulse signal C1; hence the ALU 224a sums the contents of the register 220a and binary zero to give an output to the register 226a equal to the contents of the register 220a. A clock signal CL1 causes the ALU 224a to perform a binary sum of the data on bus 227a and the contents of register 225a, allowing the summation to be fed and stored in the register 226a; then a summation clock signal CL2 transfers the contents of the register 226a to the temporary storage register 225a. When clock pulse C2 is active, the contents of register 220b (the binary path weighting number associated with a right diagonal) are transmitted to the data bus 227a. The ALU 224a adds the contents of register 220b to that in the temporary storage register 225a; the result is fed to the register 226a (and also stored by the register 226a) at the initiation of a clock signal labeled CL1. At clock signal CL2, the binary number stored in the register 226a is transferred to the register 225a for temporary storage of the binary number stored in the register 226a. The process continues with each of the registers in the row (i.e., registers 220c . . . 220n) as each clock signal C3 . . . Cn is triggered in sequence. Between each of the register clock signals C1 . . . Cn, the two ALU clock signals CL1 and CL2 are sequentially triggered to allow each register of the respective row to be summed by the ALU 224a. After the clock signal Cn is sequentially triggered, all the registers 220a . . . 220n which had inputs at connections 25a . . . 25n will have had their contents transferred to the ALU 224a. The register 225a adds the previous total of binary numbers (as stored in the register 226a) to the newest register contents. The net effect is that by the time clock signal Cn has been triggered, the contents of each register which has an input signal 25a . . . 25n (in this simple example, registers 225a, 225b and 225c) is summed by the ALU 224a in FIG. 14, the sum being left in the register 226a. If the sum is positive, the sign bit of register 226a will be triggered, giving an output at the connection 26a in FIG. 14; if the sum is negative, the sign bit will not be triggered and no output will appear at the connection 26a. For this example, presumably the contents of the registers 220a, 220b and 220c is large giving a positive total and causing the proper response: that the letter "A" has been recognized and an output signal at the connection 26a has been generated. The learning mode for the digital self-organizing circuit 228 is similar to that for the self-organizing circuit 21 discussed earlier. A register represents a path "weighted" by its contents. Paths (i.e., registers 220a . . . 223n) are rewarded or punished via buses 76a . . . 76n in FIG. 14 according to their cumulative Boolean function by increasing the value of the binary number stored in that particular register—just as the up-down counters 67 in the DACs 70a . . . 73n in FIG. 77A were rewarded or punished. In general, bias or threshold devices are not usually required in a digital self-organizing circuit such as the circuit 228 since the registers 220a . . . 223n can have either positive or negative binary numbers without increasing the cost of the register; in analog devices, DACs which can output either positive or negative currents to a voting circuit are more expensive than positive-only or negative-only DACs. However, a "threshold" register 220n . . . 223n is used in certain digital self-organizing circuits to improve the efficiency of the learning process. Oft-rewarded "paths" will have high positive binary numbers stored in their respective registers 220a . . . 223n, tending to cause an output signal at the connections 26a . . . 26n in FIG. 14. Oft-punished "paths" will have high negative binary numbers stored in their respective registers 220a . . . 223n, tending to prevent an output at the connections 26a . . . 26n. The former mimic the excitory synapses of neurons in living organisms, the latter mimic inhibitory synapses of neurons. As learning proceeds under the direction of the computer 9 in FIG. 1, output signals transmitted to the next level circuit tend to include only oft-rewarded input signals 25a . . . 25n and to exclude oft-punished input signals 25a . . . 25n.

REDUCING INTERCONNECTIONS

Figure 16:
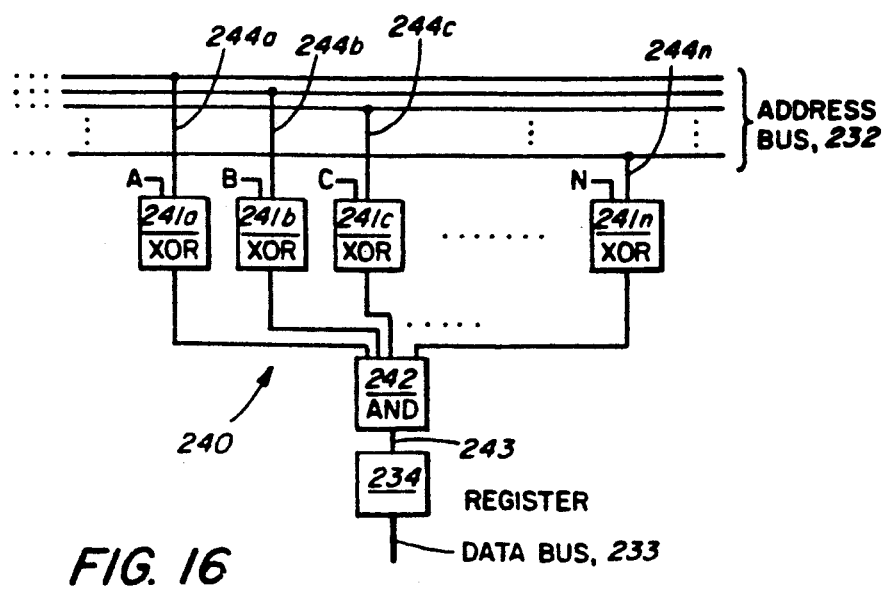
FIG. 16 shows diagrammatically a simple decoding mask circuit.

While the circuit 228 is a plausible method of producing a digital self organizing level circuit, it tends to be very inefficient in the use of components. Not all the registers of any row (e.g., 220a . . . 220n) are used to give any particular output signal 26a . . . 26n. Thus some registers 220a . . . 223n are wasted just as some of the DACs 70a . . . 73n of the circuit 21 (FIG. 7A) are wasted. The circuit numbered 230 in FIG. 15 is the digital equivalent of the "DAC pool" scheme discussed in connection with the hybrid circuit 190 of FIG. 12. Instead of using transfer gates to direct the proper input signal 25a . . . 25n to a particular DAC 170a . . . 170n and then direct its current to the proper summing junction 75a . . . 75n (as in the circuit 190 FIG. 12), each register 234a . . . 237n in FIG. 15 is addressed via respective address buses 232a . . . 232n to determine the input with which it is associated; then the contents of the identified registers are transmitted on data buses 233a . . . 233n to be transferred to the respective ALU 224a . . . 224n. In the circuit 230, which is a digital equivalent of a level circuit such as one of the circuits 21A . . . 21N in FIG. 2, the input signals 25a . . . 25n are fed into a coder 231. The input address coder 231, via bus 231a to the computer 9 in FIG. 1, converts each input signal 25a . . . 25n in FIG. 15 to a binary number consistent with the "address" of an appropriate register 234a . . . 237n; the "address" is a binary code which can be interpreted by the registers because each register 234a . . . 237n has its own unique address code. The registers 234a . . . 237n have circuits such as the circuit labeled 240 in FIG. 16 which can compare their address to the binary address sent out on address buses 232a . . . 232n. The circuit 240 is a compare circuit, the input address bus labeled 232, but representing individual signals 232a . . . 232n, has connections 244a . . . 244n to XOR-gates 241a . . . 241n; each of the address wires of bus 232 is connected to one of the XOR-gates 241a . . . 241n. An XOR-gate performs an "exclusive OR" function: the output is active if either both inputs are active or both inputs are inactive. Also connected to each XOR-gate are signals labeled A, B, C, . . . N which represent the unique address code for that particular register. The signals A . . . N have values of one or the other of two binary states; binary combinations of these signals represents a binary number specifying the address of the register. If all the address signals at the bus 232 exactly match the signals A . . . N on a bit-by-bit basis, each of the XOR-gates 241a . . . 241n will trigger, in turn causing the multi-input AND-gate shown at 242 to trigger to provide an output signal at connection 243. If any of the address signals (either active or inactive) does not match the address code A . . . N, then not all the XOR-gates 241a . . . 241n will trigger, and the AND-gate 242 will not fire giving an inactive signal at the connection 243. The multi-input AND-gate 242 must have all input signals to it triggered, else it will have no active output. Other compare methods are possible in this application; circuit 240 is simply one possible method. The net effect of the simple compare circuit 240 is that an address signal sent on the bus 232 can be applied as input to all the registers 234a . . . 237n in FIG. 15, but only the one addressed will recognize the code by having an output at the connection 243. The signal 243, in turn, causes the register 234 to output to the data bus labeled 233 in FIG. 16 (but representing any of the data buses 233a . . . 233n in FIG. 15), the value of the binary number stored in that register. In operation of the circuit 230 in the context of FIG. 1, the learning computer 9 necessarily becomes an integral part of the self-organizing circuit 1. It is the computer 9 which is programmed to interpret an input signal 25a . . . 25n as being associated with particular outputs 26a ... 26n and specifies to the coder 2321 via input port 231a which of the registers 234a ... 237n is to be addressed. For example, let it be assumed that signals 25a, 25b and 25c represent (as before) a left diagonal, a right diagonal and a horizontal and that the signal 26a (FIG. 15) represents a recognized capital letter "A". During the learning mode, the register 234a may be assigned by the computer 9 to represent an input signal 25a, 24b to represent the signal 25b and 234c to represent the signal 25c. (It will be noted here that punish/reward buses and clocking lines have not been shown for clarity in FIG. 15. Altering the binary number stored in registers 234a ... 237n can be accomplished in a manner similar to that described in reference to FIG. 14, as would clocking functions performed on the ALUs 224a ... 224n and the registers 226a ... 226n and 225a ... 225n). Whenever a signal 25a in FIG. 15 is applied as input to the circuit 230, the computer 9 knows (via its own internal memory and programs) that the address of the register 234a (among others) is to be applied as output onto address buses 232a ... 232n. On receiving the proper address from the address bus 232a, the decoding circuit of the register 234a will cause the value of its stored binary number to be transmitted to the ALU 224a via the data bus 233a. To get an output representing the letter "A" at the connection 26a in FIG. 15, other signals such as 25b and 25c are also applied as input simultaneously to the circuit 230. Each of these signals are sequentially coded by the input address coder 231 in FIG. 15 and the computer 9 in FIG. 1 such that the contents of the appropriate registers (in this case, the registers 234b and 234c) are sent to the ALU 224a to be summed in the manner described previously. If the sum is large enough (i.e., has a positive sign bit), the signal 26a will trigger specifying that the letter "A" was recognized. This signal can be used for altering the values of the binary numbers in the registers 234a ... 237n during the learning mode or it can be used simply as an indication of a recognized pattern 11.

PARALLEL SUMMING

In a more elaborate implementation of circuit 230, the address codes (labeled A ... N in FIG. 16) of each register may also be specified by the computer 9. Thus several different registers of the pool 234a ... 237n can have the same address code. For example, if the signal 26b in FIG. 15 were to represent a letter "V", both the register 234a and the register 235a are assigned the same address code (signals A ... N in FIG. 16). A signal 25a representing a left diagonal is coded by the coder 231 (FIG. 15) to specify the address of both of the registers 234a and 234a. The summing function in the ALUs 224a and 224b then proceeds simultaneously rather than sequentially, that is, rather than first addressing one register (say the register 234a) and then the others (in this case register 235a). Ideally, the computer 9 has a specific address for each of the input signals 25a ... 25n; then the registers 234a ... 237n need only recognize the address of the particular input signal 25a ... 25n which was assigned to that particular register. The sequential coding of each input signal 25a ... 25n may be accomplished using the computer 9 (FIG. 1) via the bus 231a in FIG. 15, or it may be accomplished by a specialized sequencing circuit (not shown, but whose operations are similar to those of circuit 250 of FIG. 17, to be discussed shortly). The digital self-organizing circuit 230 has advantages over the circuit 228 in that much fewer registers (234a ... 237n in FIG. 15) are required.

As discussed earlier (with regard to the hybrid circuits 21 in FIG. 7A), most of the registers 220a ... 223n of the circuit 228 would not be expected to have useful information stored (i.e., large positive or negative binary numbers having large influences on the output summations of the ALUs 224a ... 224n). In the circuit 230, however, only those input signals 25a ... 25n which have large influences over the outcome of the output signals 26a ... 26n are assigned to registers by the computer 9. Not only are fewer registers 234a ... 237n required in a circuit such as the circuit 230, but the time required to obtain an output is less: the circuit 228 must add sequentially by ALUs 224a ... 224n all registers in each row (whether they have useful information or not), while the circuit 230 need only sequentially add the registers which have useful information. (Hereinafter the label 224 designates any one of the ALUs 224a ... 224n, the label 225 designates any of the registers 225a ... 225n and the label 226 designates any one of the registers 226a ... 226n) In digital implementations of self-organizing circuits such as the circuit 228 and the circuit 230, an ALU summing circuit (composed of the ALU 224, and the registers 225 and 226 along with appropriate clocking signals) is used for each output signal 26a ... 26n. By having many of these ALU summing circuits in parallel, the time required to determine an output signal 26a ... 26n is proportionally shortened. The time needed is only that to sequentially add the binary number contained in each row of registers (say, register 234a ... 234n) to the temporary total stored in, say, the register 225a. One ALU "add" cycle is needed for each of the registers in the row. In self-organizing circuits wherein the time required to determine an output is not critical, the ALU summing circuit can be multiplexed: an ALU circuit may accept binary number information from several rows of registers. As each ALU circuit is multiplexed to handle more rows of registers, the speed of output determination is necessarily reduced, but the number of ALUs (a relatively expensive circuit) required is also reduced. In addition, a strict "pool" of registers can be utilized whereby any register can take the place of any other; in circuit 230, a register in one row (say, register 234a) could not replace that of another row (say, register 237a).

SINGLE LOGIC UNIT IMPLEMENTATION

Ultimately, only one ALU summing circuit is required, as shown in the circuit designated 250 in FIG. 17. As in other self-organizing circuits, the input signals to the circuit 250 are again labeled 25a ... 25n and the output signals are labeled 26a ... 26n. Also, punish/reward connections and clocking connections are not shown for clarity; they operate in a manner similar to that described previously for other hybrid or digital self-organizing circuit. When any signal at input connections 25a ... 25n in FIG. 17 are recognized by a coder/sequencer 252, it begins its operation: it will cycle through each of the input signals 25a ... 25n present for each of the output signals 26a ... 26n. The sequencer 252 transmits on bus 232 the "combined address" of a register in the register pool 251a ... 251n. The combined address is composed of both the input signal address (representing the input signal 25a ... 25n) and the output signal address (representing the output signal 26a ... 26n).

During the learning mode, various registers 251a ... 251n in the pool are assigned to an input signal and an output signal by the proper coding of the combined address code (such as the signals labeled A . . . N in FIG. 16) by the computer 9. Thus each register 251*a* . . . 251*n* is specified by an input-output address code. When the sequencer 252 outputs a particular combined address a register of the pool 251*a* . . . 251*n* (whose address code matches the combined address) will output its contents onto a data bus 227 to be sent to ALU 224, to be summed with the contents of other registers associated with that particular output signal. A clock signal CL3 (i.e., an active signal by sequencer 252 when all input signals present have been cycled for a particular output) clears the register 225 so that the ALU may begin a new binary number summation for the next output signal 26*a* . . . 26*n*. When the sign bit of a register 226 is active, an output signal is sent via connections 255 to a latch array 252. The latch array 253 ensures that the output signal sent to connections 26*a* . . . 26*n* in FIG. 17 remain as outputs during the entire cycle of the sequencer 252; the sequencer 252 sends the output address via an output address bus 254*c* to the latch array 253. Thus, the proper output result at the connection 255 is latched to the proper output of the set 26*a* . . . 26*n* for the time in which a clock signal 68*a* is active.

In operation, the signals 25*a* . . . 25*n* in FIG. 17 are applied as active input signals to the sequencer 252. For example, if the sensors 10 in FIG. 1 are presented a pattern 11 representing the letter "A", the active inputs to the circuits 250 may represent components of the latter "A". Active signals on connections 25*a*, 25*b* and 25*c* may represent a left diagonal, a right diagonal and a horizontal respectively; for simplicity let it be assumed that only these three active signals are required to recognize the letter "a" pattern presented to the sensors 10. The three input signals 25*a* . . . 25*c* represent the set of signals among the entire set of signals 25*a* . . . 25*n* which are active during this particular cycle of operation of the circuit 250. The sequencer 252 will initially send out to the address bus 232 the combined address of the active input signal 25*a* and the address of the output signal 26*a*. Let it be further assumed that the computer 9 had previously assigned the register 251*a* with this address code. A compare circuit such as circuit 240 (FIG. 16) decodes the address and causes the contents of the register 251*a* to be applied as output to the data bus 233. The sequencer 252 will also send a "clear" signal (labeled CL3 in FIG. 17) via connection 254*a* to the register 225 at the beginning of the cycle. Prior to a summation by the ALU 224, in this example, then, the contents of the register 251*a* are added into the cleared register 225 (i.e., zero binary number) to give a sub-total first into the register 226 and then into the register 225. Next the sequencer 252 sends the address of the active input signal 25*b* in FIG. 17 and output signal 26*a* to the register pool 251*a* . . . 251*n*; assuming that register 251*b* has been assigned this combined code, its contents will be transmitted to the ALU 224 to be summed with the subtotal contained in register 225 into the register 226 in the manner described previously. Lastly, the address of the active input 25*c* and the output 26*a* in FIG. 17 are transmitted to the register pool; if the register 251*c* has been assigned this combined address code, its contents will in turn be summed by the ALU 224 into the subtotal held in the registers 225 and 226. If the sign bit of the register 226 is positive, an active signal is transmitted over the connection 255 to the latch array 253. The sequencer 252 has also transmitted to the latch 253 the output address-in this case the address for the output signal 26*a*. The latch array 253, given an active signal from the connection 255 and the output address for the signal 26*a*, will apply an active output signal onto the connection 26*a* and latch it there, i.e., continue to transmit the signal 26*a* during further operation of the circuit 250. Having completed the summation operations of the first output signal 26*a*, the sequencer 252 begins a summation operation for the second signal 26*b*. First a clock signal is sent to the register 225, clearing its contents to start a new summation cycle by the ALU 224. Next addresses for, in turn, active input signals 25*a*, 25*b* and 25*c* (each combined with the output address for signal 26*b*) are transmitted to the register pool via the address bus 232. Registers other than 251*a*, 251*b* and 251*c* will have been previously assigned these address codes and will sequentially respond by transmitting their contents to the ALU 224 for summation. If the sum is positive, the signal 26*b* in FIG. 17 will be latched by an active signal sent from the sequencer 252 via connection 254*c*. Each output connection 26*a* . . . 26*n* (FIG. 17), in turn, generates its own summation cycle. The cycle includes clearing the register 225 and then adding the contents of each input signal register 25*a* . . . 25*n* which has been assigned to that output signal connection. Thus, only one ALU summing circuit is required to do summations of register contents.

SOFTWARE IMPLEMENTATION

A more complicated circuit 250, the input signals 25*a* . . . 25*n* need not be individual wires each representing an input component of feature. Instead the active input signals 25*a* . . . 25*n* may be represented by a binary code of a particular input component or feature. This binary code forms part of the combined address. Similarly, the output pattern identifications 26*a* . . . 26*n* may be a binary representation of the actual signals. The sequencer 252 sends the address of the output signal to connections 26*a* . . . 26*n* whenever connection 255 is activated. This form of circuit 250 necessarily operates in serial manner: each active input signal 25*a* . . . 25*n* address is transmitted to the circuit 250, one after the other, and each output signal 26*a* . . . 26*n* address is sequentially transmitted from the circuit 250. The serial operation functions quite well, though slowly, and can be used when time is not critical. However, it has another important advantage. The digital encoding of the features allows relatively few connections 25*a* . . . 25*n* and 26*a* . . . 26*n* to connect as input/output ports between the circuits 21A . . . 21N in FIG. 2. Instead of requiring, say, one hundred input and output connections for a typical hybrid circuit 21, a circuit 250 whose input and output signals were digitally encoded requires only six connections for the same number of input components 25*a* . . . 25*n* and output identifications 26*a* . . . 26*n*. Earlier, in relation to FIGS. 8, 9, 10, 11, 18 and 19, preprocessor circuits were discussed for the self-organizing circuits such as circuit 21 in FIG. 7. Preprocessor circuits for a serially sequencing digital circuit such as circuit 250 described above, may take a somewhat different form. For example, an array of pixels in such a preprocessor circuit may have signals (such as signal 121 in FIG. 8) digitally coded to transmit the address of the pixel 123 which was activated. Sequencing circuits operate on these address signals such that the array of pixels 123 which is scanned: each pixel in turn is processed by the preprocessing circuits such as circuits 125*a* . . . 125*d*. AND and OR combinations of the neighboring pixels may be performed serially similar to the manner in which circuits like circuit 250 perform serial summations of input signals 25a ... 25n, except AND or OR operations are performed instead of summation operations. Thus, the entire functioning of self-organizing circuit 1 in FIG. 1 including the preprocessor circuits may be accomplished in serial manner rather than the parallel manner. In some situations, where time-varying information (such as audio information from an acoustic source) is at too high a frequency for recognition by the self-organizing circuit. It may be digitally decomposed into its constituent frequencies using standard time-to-frequency conversion techniques such as fast Fourier transforms. In this case, analog filters such as filter 270a ... 270n in FIG. 18 are not required; only an analog-to digital (A/D converter) and the appropriate digital filters are required. The output of the digital filters may be transmitted in parallel or serially to the self-organizing circuit 101 in order to recognize patterns in the time-varying signal. Between a completely serial circuit 250 and a completely parallel circuit, lie many intermediate variations. Serial circuits, whose operations must be done one after the other, are necessarily slower than parallel circuits whose operations need not be done sequentially. However, serial circuits have other advantages, such as the digital encoding of addresses to reduce I/O ports (as was discussed above). Other circuits, such as the circuit 230, have elements of both serial and parallel circuits. In circuit 230, each output connection 26a ... 26n has a signal which functions in parallel with other output connections signals; although each input signal 25a ... 25n is serially processed by the coder 231 to give proper summation at the ALUs 224a ... 224n. The invention disclosed here is meant to incorporate other such variations between purely serial circuits like circuit 250 and purely parallel circuits like circuit 21, FIG. 7A. The foregoing explanation emphasizes use of the present inventive concepts in the field of pattern recognition. It will be appreciated, however, that the sensors 10 can be part of a thing to be controlled which can further include a microprocessor, associated RAMs, ROMs, and PROMs; indeed, the self-organizing circuits 1 of FIG. 1 could also be so included. The sensors 10 might, in this circumstance, be a television camera (see the Birk et al U.S. Pat. No. 4,146,924). The teaching process discussed above would then be applied, as before, through the computer 9—but with a sizable input from a human operator working through the computer.

These and still further modifications of the present invention will occur to persons skilled in the art and all such modifications are deemed to be within the scope of the invention as defined by the appended claims.

What is claimed is:

1. A self-organizing circuit, having a plurality of sub-circuits or levels which are connected to receive messages from some other sub-circuit or level and are operable to deliver messages to some other sub-circuit or level, having voting in each sub-circuit or level by weighting relative amounts of positive and negative influence thereto regarding whether or not to pass along information to the further sub-circuits or levels, comprising:

error correcting means acting on each sub-circuit or level of said self-organizing circuit which serves to correct errors by modifying the strength of connections between said sub-circuits or levels occasioned by inaccurate analysis of the input by said self-organizing circuit and for effecting analysis of a first pattern of constituent elements and at a later time to apply said error correcting means to effect analysis of a second pattern of constituent elements without modifying the strength of at least a portion of said connections made during said first application of error correction means;

burst function means for amplifying the influence of sub-circuits or levels which fire in short bursts and for attenuating the influence of sub-circuits or levels which fire randomly wherein the learning patterns of said self-organizing circuit are made more stable.

2. A self-organizing circuit, having a plurality of sub-circuits or levels which are connected to receive messages from some other sub-circuit or level and are operable to deliver messages to some other sub-circuit or level, having voting in influence thereto regarding whether or not to pass along information to the further sub-circuits or levels, comprising:

error correcting means acting on each sub-circuit or level of said self-organizing circuit which serves to correct errors by modifying the strength of connections between said sub-circuits or levels occasioned by inaccurate analysis of the input by said self-organizing circuit and for effecting analysis of a first pattern of constituent elements and at a later time to apply said error correcting means to effect analysis of a second pattern of constituent elements without modifying the strength of at least a portion of said connections made during said first application of error correction means;

bias function means for selectively biasing said sub-circuits or levels to ensure consistent firing of said sub-circuits in response to minimum input strength.

3. The self-organizing circuit of claim 2 wherein said bias function further comprises a bias of sufficient strength on said sub-circuits such that input from a plurality of other sub-circuits is required in order to have the biased sub-circuit fire.

4. The self-organizing circuit of claim 3 wherein said bias function means causes the biased sub-circuit to behave as an AND circuit.

5. The self-organizing circuit of claim 3 wherein said bias functions means causes the biased sub-circuit to behave as an NAND circuit.

6. The self-organizing circuit of claim 2 wherein said bias function means further comprises a bias strength of sufficient strength on said sub-circuits such that input from a single sub-circuit is sufficient to cause the biased sub-circuit to fire.

7. The self-organizing circuit of claim 6 wherein said bias function means causes the biased sub-circuit to behave as an OR circuit.

8. The self-organizing circuit of claim 6 wherein said bias function means causes the biased sub-circuit to behave as an NOR circuit.

9. A self-organizing circuit, having a plurality of sub-circuits or levels which are connected to receive messages from some other sub-circuit or level and are operable to deliver messages to some other sub-circuit or level, having voting in each sub-circuit or level by weighting relative amounts of positive and negative influence thereto regarding whether or not to pass along information to the further sub-circuits or levels, comprising: error correcting means acting on each sub-circuit or level of said self-organizing circuit which serves to correct errors by modifying the strength of connections between said sub-circuits or levels occasioned by inaccurate analysis of the input by said self-organizing circuit and for effecting analysis of a first pattern of constituent elements and at a later time to apply said error correcting means to effect analysis of a second pattern of constituent elements without modifying the strength of at least a portion of said connections made during said first application of error correction means; clipping means for preventing sub-circuits from firing if said sub-circuits are influenced by more than a selected number of other sub-circuits.

10. The self-organizing circuit of claim 9 wherein said clipping means further comprises sufficient clipping strength influence on said sub-circuits which will cause said sub-circuits to change when said sub-circuits receive the input from a single other sub-circuit and said sub-circuits will not change upon receiving the inputs from more than one other sub-circuit.

11. The self-organizing circuit of claim 10 wherein said clipping means causes said sub-circuits to behave as XOR circuit.will fire under influence from a single other sub-circuit.

12. The self-organizing circuit of claim 9 wherein said clipping means further comprises sufficient clipping strength influence on said sub-circuits which will cause said sub-circuits to change when said sub-circuits receive the input from a plurality of other sub-circuits and said sub-circuits will not change upon receiving the inputs from more than the said plurality of other sub-circuits.

13. The self-organizing circuit of claim 12 wherein said clipping means causes said sub-circuits to behave as XNOR circuit.

14. A self-organizing circuit, having a plurality of sub-circuits or levels which are connected to receive messages from some other sub-circuit or level and are operable to deliver messages to some other sub-circuit or level, having voting in each sub-circuit or level by weighting relative amounts of positive and negative influence thereto regarding whether or not to pass along information to the further sub-circuits or levels, comprising: error correcting means acting on each sub-circuit or level of said self-organizing circuit which serves to correct errors by modifying the strength of connections between said sub-circuits or levels occasioned by inaccurate analysis of the input by said self-organizing circuit and for effecting analysis of a first pattern of constituent elements and at a later time to apply said error correcting means to effect analysis of a second pattern of constituent elements without modifying the strength of at least a portion of said connections made during said first application of error correction means; share means for influencing said sub-circuits wherein feedback causes slower changing sub-circuits to change more quickly and feedback causes faster changing sub-circuits to change more slowly.

15. The self-organizing circuit of claim 14 wherein said share means causes said sub-circuits to behave as an AND circuit.

16. The self-organizing circuit of claim 14 wherein said share means causes said sub-circuits to behave as an NAND circuit.

* * * * *